US 012228865B2

United States Patent
Tanaami et al.

(10) Patent No.: US 12,228,865 B2
(45) Date of Patent: Feb. 18, 2025

(54) IMAGE FORMING APPARATUS

(71) Applicant: CANON KABUSHIKI KAISHA, Tokyo (JP)

(72) Inventors: Ryuji Tanaami, Yokohama (JP); Keita Nakajima, Suntou-gun (JP); Koji Miwa, Susono (JP); Yuji Mitsui, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/982,601

(22) Filed: Nov. 8, 2022

(65) Prior Publication Data

US 2023/0069503 A1  Mar. 2, 2023

Related U.S. Application Data

(60) Division of application No. 17/029,165, filed on Sep. 23, 2020, now Pat. No. 11,543,759, which is a
(Continued)

(30) Foreign Application Priority Data

Jun. 2, 2010 (JP) .................................. 2010-126812
Apr. 15, 2011 (JP) .................................. 2011-091240
May 23, 2011 (JP) .................................. 2011-114806

(51) Int. Cl.
*G03G 15/04* (2006.01)
*B41J 11/46* (2006.01)
(Continued)

(52) U.S. Cl.
CPC ... *G03G 15/04036* (2013.01); *G03G 21/1633* (2013.01); *G03G 21/1666* (2013.01);
(Continued)

(58) Field of Classification Search
CPC ......... G03G 15/04036; G03G 21/1633; G03G 21/1666; G03G 21/1853; G03G 15/00;
(Continued)

(56) References Cited

U.S. PATENT DOCUMENTS 6,434,350 B2 * 8/2002 Kikuchi ............. H04N 1/00551
399/125
7,110,014 B2 * 9/2006 Mizutani ............ G03G 15/0896
347/157

(Continued)

FOREIGN PATENT DOCUMENTS

JP         05-035003 A     2/1993
JP     2000181329 A   *   6/2000
(Continued)

OTHER PUBLICATIONS

Office Action in Japanese Patent Application No. 2011-114806, dated Mar. 3, 2015.
(Continued)

*Primary Examiner* — Stephanie E Bloss
*Assistant Examiner* — Kevin C Butler
(74) *Attorney, Agent, or Firm* — Venable LLP

(57) ABSTRACT

The present invention provides an image forming apparatus including: a first moving member pressed and moved by an openable/closable member when the openable/closable member is opened, and switching a cartridge from a state where the cartridge is positioned in an image forming position to a state where the positioning is released; and a second moving member pressed and moved by the openable/closable member when the openable/closable member is opened, and moving the exposure member from an exposure position to a retracted position, wherein when the positioning of the cartridge is released, a reaction force applied from the first moving member to the openable/closable member
(Continued)

reaches a first peak, when the exposure member is moved to the retracted position, a reaction force applied from the second moving member to the openable/closable member reaches a second peak, and timing of the first peak is different from timing of the second peak.

7 Claims, 36 Drawing Sheets

Related U.S. Application Data division of application No. 16/294,005, filed on Mar. 6, 2019, now Pat. No. 10,824,088, which is a division of application No. 15/810,567, filed on Nov. 13, 2017, now Pat. No. 10,274,859, which is a division of application No. 15/198,391, filed on Jun. 30, 2016, now Pat. No. 9,846,384, which is a division of application No. 14/276,293, filed on May 13, 2014, now Pat. No. 9,720,345, which is a continuation of application No. 13/115,237, filed on May 25, 2011, now Pat. No. 8,768,202.

(51) Int. Cl.
| | |
|---|---|
| G03B 27/52 | (2006.01) |
| G03G 15/00 | (2006.01) |
| G03G 15/08 | (2006.01) |
| G03G 21/16 | (2006.01) |
| G03G 21/18 | (2006.01) |

(52) U.S. Cl.
CPC ........... *G03G 21/1853* (2013.01); *B41J 11/46* (2013.01); *G03B 27/523* (2013.01); *G03B 27/528* (2013.01); *G03G 15/00* (2013.01); *G03G 15/04* (2013.01); *G03G 15/0865* (2013.01); *G03G 15/0868* (2013.01); *G03G 15/0872* (2013.01); *G03G 2215/0668* (2013.01); *G03G 2215/0692* (2013.01)

(58) Field of Classification Search
CPC ............... G03G 15/04; G03G 15/0865; G03G 15/0868; G03G 15/0872; G03G 2215/0668; G03G 2215/0692; B41J 11/46; G03B 27/523; G03B 27/528
USPC .......................................................... 399/205
See application file for complete search history.

(56) References Cited

U.S. PATENT DOCUMENTS

| | | | | |
|---|---|---|---|---|
| 7,302,221 B2* | 11/2007 | Shyu | ................. | H04N 1/00519 399/125 |
| 7,388,593 B2* | 6/2008 | Fukuda | .................... | B41J 2/447 399/125 |
| 7,656,421 B2* | 2/2010 | Itabashi | ........... | G03G 15/04054 399/125 |
| 7,715,753 B2* | 5/2010 | Hisada | ............. | G03G 15/04054 399/125 |
| 7,720,411 B2* | 5/2010 | Itabashi | ............. | G03G 21/1671 399/113 |
| 7,822,362 B2* | 10/2010 | Watanabe | .......... | G03G 21/1628 399/125 |
| 7,826,769 B2* | 11/2010 | Yamaguchi | ........ | G03G 21/1666 399/125 |
| 7,840,159 B2* | 11/2010 | Nakashima | .......... | G03G 15/326 399/117 |
| 7,853,176 B2* | 12/2010 | Itabashi | ............. | G03G 21/1817 399/125 |
| 7,957,666 B2* | 6/2011 | Sato | .................. | G03G 15/6552 399/125 |
| 7,962,061 B2* | 6/2011 | Sato | .................. | G03G 15/6552 399/125 |
| 7,991,325 B2* | 8/2011 | Yamaguchi | .......... | G03G 15/011 399/125 |
| 8,040,368 B2* | 10/2011 | Yokoi | ............. | G03G 15/04054 347/225 |
| 8,068,762 B2* | 11/2011 | Yamaguchi | ...... | G03G 15/04054 399/110 |
| 8,078,085 B2* | 12/2011 | Okabe | ................ | G03G 21/1853 399/177 |
| 8,170,447 B2* | 5/2012 | Kubo | ................ | G03G 15/0813 399/118 |
| 8,208,834 B2* | 6/2012 | Yamaguchi | ........ | G03G 21/1628 399/125 |
| 8,238,764 B2* | 8/2012 | Funahashi | .......... | G03G 15/0863 399/13 |
| 8,311,437 B2* | 11/2012 | Sato | .................... | G03G 21/1652 399/88 |
| 8,427,519 B2* | 4/2013 | Umezawa | ........ | G03G 15/04045 347/245 |
| 8,428,489 B2* | 4/2013 | Sameshima | ........ | G03G 21/1676 399/119 |
| 8,594,532 B2* | 11/2013 | Cook | ........................ | E05F 5/02 399/125 |
| 8,611,784 B2* | 12/2013 | Uchida | .............. | G03G 21/1628 399/125 |
| 8,717,398 B2* | 5/2014 | Yokoi | ................ | G03G 21/1619 347/257 |
| 8,755,718 B2* | 6/2014 | Ushiozu | .......... | G03G 21/1647 399/177 |
| 8,768,203 B2* | 7/2014 | Hamada | ............. | G03G 21/1666 399/110 |
| 9,008,547 B2* | 4/2015 | Takano | ............. | G03G 21/1666 399/118 |
| 2001/0021321 A1* | 9/2001 | Kikuchi | ............. | H04N 1/00551 399/125 |
| 2008/0219696 A1 | 9/2008 | Itabashi | | |
| 2008/0219697 A1* | 9/2008 | Itabashi | ............. | G03G 21/1817 399/114 |
| 2008/0304860 A1 | 12/2008 | Hisada | | |
| 2009/0052960 A1* | 2/2009 | Tanaka | ............... | G03G 21/0011 399/358 |
| 2009/0129812 A1 | 5/2009 | Kawanami et al. | | |
| 2009/0142092 A1 | 6/2009 | Sato | | |
| 2009/0190953 A1 | 7/2009 | Okabe | | |
| 2009/0202272 A1 | 8/2009 | Nakashima | | |
| 2009/0220250 A1 | 9/2009 | Funahashi | | |
| 2011/0131310 A1* | 6/2011 | Ooba | ...................... | G06F 3/121 709/246 |
| 2011/0255905 A1 | 10/2011 | Yokoi | | |
| 2011/0299873 A1* | 12/2011 | Ushiozu | ............. | G03G 21/1647 399/90 |
| 2011/0299882 A1* | 12/2011 | Tanaami | ............. | G03G 15/326 399/110 |
| 2012/0114373 A1 | 5/2012 | Hamada et al. | | |
| 2013/0315625 A1* | 11/2013 | Fujita | ............. | G03G 21/1666 399/125 |
| 2014/0241753 A1* | 8/2014 | Ushiozu | ............. | G03G 21/1666 399/110 |

FOREIGN PATENT DOCUMENTS

| | | | | |
|---|---|---|---|---|
| JP | 2000293085 A | * | 10/2000 | |
| JP | 2001109358 A | * | 4/2001 | |
| JP | 2001209220 A | * | 8/2001 | |
| JP | 2004163579 A | * | 6/2004 | |
| JP | 2008216331 A | * | 9/2008 | |
| JP | 2008224821 A | * | 9/2008 | ......... G03G 21/1817 |
| JP | 2008-286968 A2 | | 11/2008 | |
| JP | 2009-128506 | | 6/2009 | |
| JP | 2010-076130 A | | 4/2010 | |
| JP | 2011114806 A | * | 6/2011 | ............. G06F 3/121 |
| JP | 2012226002 A | * | 11/2012 | ......... G03G 21/1647 |

(56) References Cited

OTHER PUBLICATIONS

Jun. 28, 2016 Office Action in Japanese Patent Application No. 2015-222261.
Jun. 13, 2017 Office Action in Japanese Patent Application No. 2016-163554.

* cited by examiner

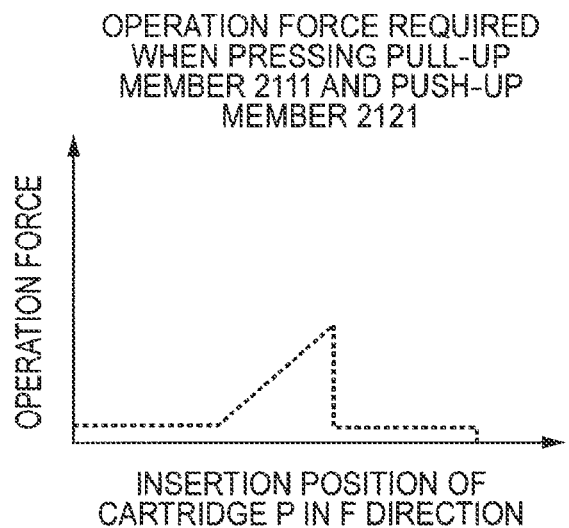

FIG. 28A

OPERATION FORCE REQUIRED WHEN PRESSING PULL-UP MEMBER 2111 AND PUSH-UP MEMBER 2121

OPERATION FORCE

INSERTION POSITION OF CARTRIDGE P IN F DIRECTION

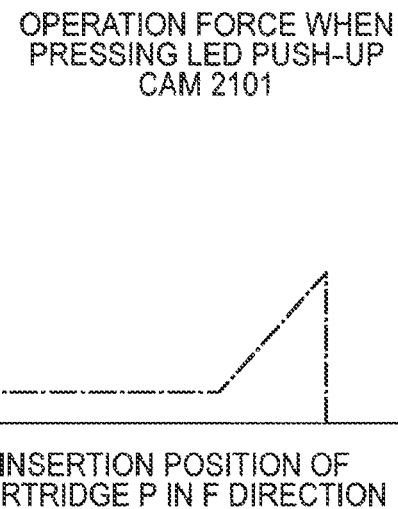

FIG. 28B

OPERATION FORCE WHEN PRESSING LED PUSH-UP CAM 2101

OPERATION FORCE

INSERTION POSITION OF CARTRIDGE P IN F DIRECTION

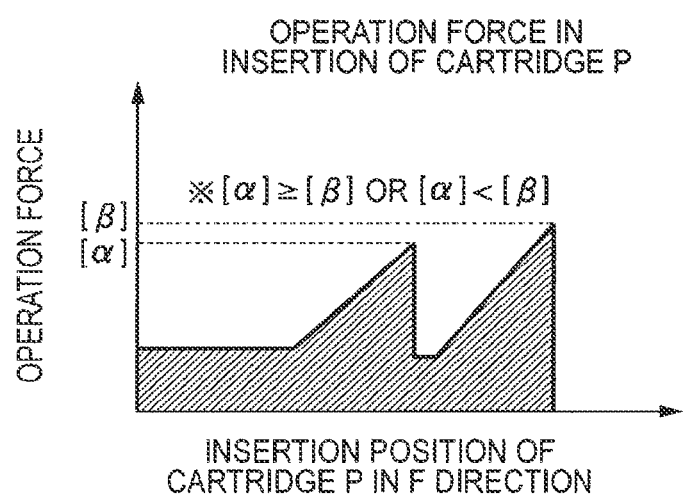

FIG. 28C

OPERATION FORCE IN INSERTION OF CARTRIDGE P

OPERATION FORCE

※ [α] ≥ [β] OR [α] < [β]

[β]
[α]

INSERTION POSITION OF CARTRIDGE P IN F DIRECTION

IMAGE FORMING APPARATUS

BACKGROUND OF THE INVENTION

Field of the Invention

The present invention relates to an electrophotographic image forming apparatus that forms an image on a recording medium in a state where a process cartridge including an electrophotographic photosensitive drum and a process unit that acts on the drum is removably mounted to a main body of the electrophotographic image forming apparatus.

An electrophotographic image forming apparatus forms an image on a recording medium using an electrophotographic image forming process. The electrophotographic image forming apparatus includes, for example, an electrophotographic copier, an electrophotographic printer (for example, a laser beam printer or an LED printer), a facsimile apparatus, and a word processor. The recording medium includes, for example, paper or an OHT sheet on which an image is formed by the electrophotographic image forming apparatus.

A process cartridge contributes to an image forming process for forming an image on a recording medium in a state where the cartridge is removably mounted to a main body of an electrophotographic image forming apparatus. The main body is a component of the electrophotographic image forming apparatus except the cartridge. The process cartridge includes at least one of a charging unit, a developing unit, and a cleaning unit as process units, and an electrophotographic photosensitive drum on which an electrostatic latent image is formed, integrated into a cartridge, and is removably mounted to the main body. The process unit acts on the electrophotographic photosensitive drum. Thus, the process cartridge also includes a cartridge including a developing unit as a process unit and an electrophotographic photosensitive drum integrated into the cartridge, and removably mounted to the main body. The process cartridge further includes a cartridge including a charging unit, a developing unit or a cleaning unit as a process unit and an electrophotographic photosensitive drum integrated into the cartridge, and removably mounted to the main body. The process cartridge can be mounted to and removed from the main body by a user. This facilitates maintenance of the main body.

Description of the Related Art

In an image forming apparatus disclosed in Japanese Patent Application Laid-Open No. H05-035003, an exposure unit is pressed against a part of an exterior component of a cartridge including a photosensitive drum in conjunction with an opening/closing operation of an exterior cover. This can maintain a certain distance between the exposure unit and the cartridge.

SUMMARY OF THE INVENTION

Japanese Patent Application Laid-Open No. H05-035003 adopts a method of pressing an exposure unit against a cartridge using a spring, and maintaining a certain distance between an exposure unit and a cartridge. However, timing of cartridge pressing is the same as timing of exposure unit pressing, and thus a large force is required for closing a cover, and reducing an opening/closing force is desired in terms of usability.

Thus, in the present invention, timing of cartridge pressing is shifted from timing of exposure unit pressing to reduce a force required for pressing.

The present invention provides image forming apparatus in which a cartridge that supports a photosensitive member is mounted to an image forming position, and which forms a latent image on the photosensitive member by exposure to form an image, including: an exposure member that includes a light emitting element arranged in an array, and exposes the photosensitive member of the cartridge located in the image forming position in an exposure position; an openable and closable member that can be opened or closed with respect to a main body of the apparatus, and can mount the cartridge to the main body of the apparatus in a state of being opened with respect to the main body of the apparatus; a first moving member that is pressed and moved by the openable and closable member when the openable and closable member is opened, and switches the cartridge from a state where the cartridge is positioned in the image forming position to a state where the positioning is released; and a second moving member that is pressed and moved by the openable and closable member when the openable and closable member is opened, and moves the exposure member from the exposure position in an arrangement direction of the cartridge and the exposure member and thus moves the exposure member to a retracted position retracted from the exposure position, wherein, while the openable and closable member is being opened, when the first moving member switches the cartridge to the state where the positioning is released, a reaction force applied from the first moving member to the openable and closable member reaches a first peak, and when the second moving member moves the exposure member to the retracted position, a reaction force applied from the second moving member to the openable and closable member reaches a second peak, and timing of the first peak is different from timing of the second peak.

The present invention provides an image forming apparatus in which a cartridge that supports a photosensitive member is mounted to an image forming position, and which forms a latent image on the photosensitive member by exposure to form an image, including: an exposure member that includes a light emitting element arranged in an array, and exposes the photosensitive member of the cartridge located in the image forming position in an exposure position; an openable and closable member that can be opened or closed with respect to a main body of the apparatus, and can mount the cartridge to the main body of the apparatus in a state of being opened with respect to the main body of the apparatus; a first moving member that is pressed and moved by the openable and closable member when the openable and closable member is closed, and positions the cartridge in the image forming position; and a second moving member that is pressed and moved by the openable and closable member when the openable and closable member is closed, and moves the exposure member in an arrangement direction of the cartridge and the exposure member and moves the exposure member to the exposure position, wherein, while the openable and closable member is being closed, when the first moving member positions the cartridge in the image forming position, a reaction force applied from the first moving member to the openable and closable member reaches a first peak, and when the second moving member moves the exposure member to the exposure position, a reaction force applied from the second moving member to the openable and closable member reaches a second peak, and timing of the first peak is different from timing of the second peak.

The present invention provides an image forming apparatus in which a cartridge that supports a photosensitive member is mounted to an image forming position, and which forms a latent image on the photosensitive member by exposure to form an image, including: an exposure member that includes a plurality of light emitting elements arranged in an array, and exposes the photosensitive member of the cartridge located in the image forming position by the plurality of light emitting elements in an exposure position; a first moving member that is urged to move the cartridge in a direction different from an insertion direction of the cartridge into the main body of the apparatus when the cartridge is mounted to the main body of the apparatus; and a second moving member that is pressed by the cartridge to urge the exposure member and moved to a positioning position to position the exposure member in the exposure position when the cartridge is mounted to the main body of the apparatus, wherein the cartridge is moved by the first moving member and moved toward the image forming position, while the cartridge is being inserted into the main body of the apparatus, when the cartridge presses the first moving member against a force of urging the first moving member, a reaction force applied from the first moving member to the cartridge reaches a first peak, and when the cartridge presses the second moving member and moves the second moving member to the positioning position, a reaction force applied from the second moving member to the cartridge reaches a second peak, and timing of the first peak is different from timing of the second peak.

The present invention provides an image forming apparatus in which a cartridge that supports a photosensitive member is mounted to an image forming position, and which forms a latent image on the photosensitive member by exposure to form an image, including: an exposure member that includes a plurality of light emitting elements arranged in an array, and exposes the photosensitive member of the cartridge located in the image forming position by the plurality of light emitting elements in an exposure position; an openable and closable member that can be opened or closed with respect to the main body of the apparatus, and can mount the cartridge to the main body of the apparatus in a state of being opened with respect to the main body of the apparatus; a first moving member that is urged to move the cartridge toward the image forming position in a direction different from an insertion direction of the cartridge into the main body of the apparatus when the cartridge is inserted into the main body of the apparatus; and a second moving member that is pressed by the openable and closable member and urges the exposure member, the second moving member moved to a positioning position to position the exposure mechanism in the exposure position, wherein the cartridge to be inserted into the main body of the apparatus presses the first moving member against a force of urging the first moving member, and is moved toward the image forming position in the direction different from the insertion direction of the cartridge into the main body of the apparatus, and when the openable and closable member is closed, the openable and closable member presses the second moving member and moves the second moving member to the positioning position.

Further features of the present invention will become apparent from the following description of exemplary embodiments with reference to the attached drawings.

BRIEF DESCRIPTION OF THE DRAWINGS

FIG. 28A is a graph illustrating an operation force required when the cartridge presses a pull-up member and a push-up member in insertion of the cartridge.

FIG. 28B is a graph illustrating an operation force when the cartridge presses an LED push-up cam in insertion of the cartridge.

FIG. 28C is a graph illustrating an operation force in insertion of the cartridge.

DESCRIPTION OF THE EMBODIMENTS

Preferred embodiments of the present invention will now be described in detail in accordance with the accompanying drawings.

Embodiment 1

{General Configuration of Electrophotographic Image Forming Apparatus}

Figure 1A:
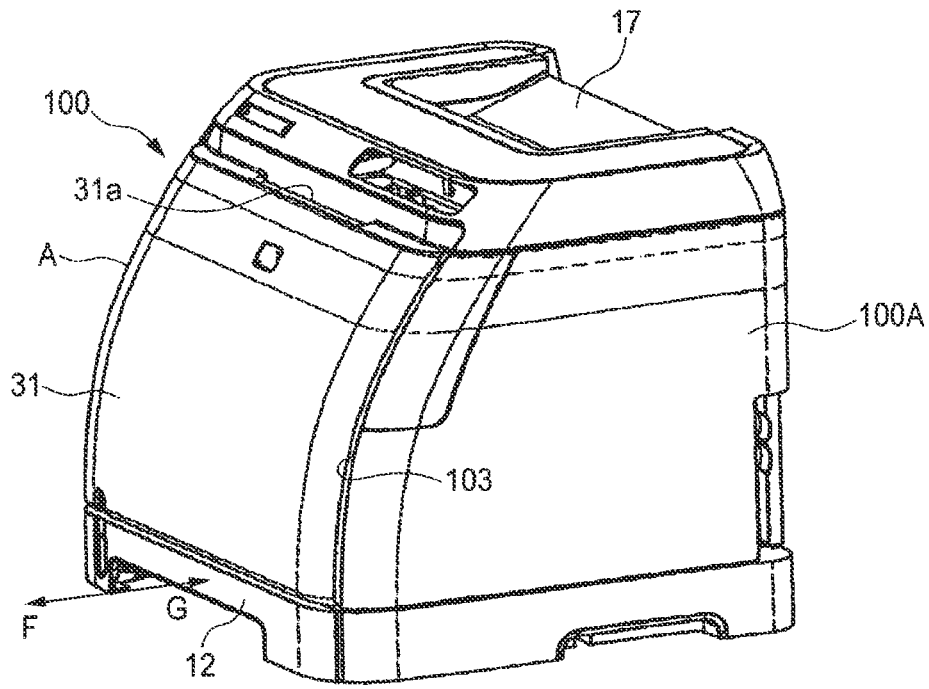
FIG. 1A is a perspective view of an electrophotographic image forming apparatus.
Figure 1B:
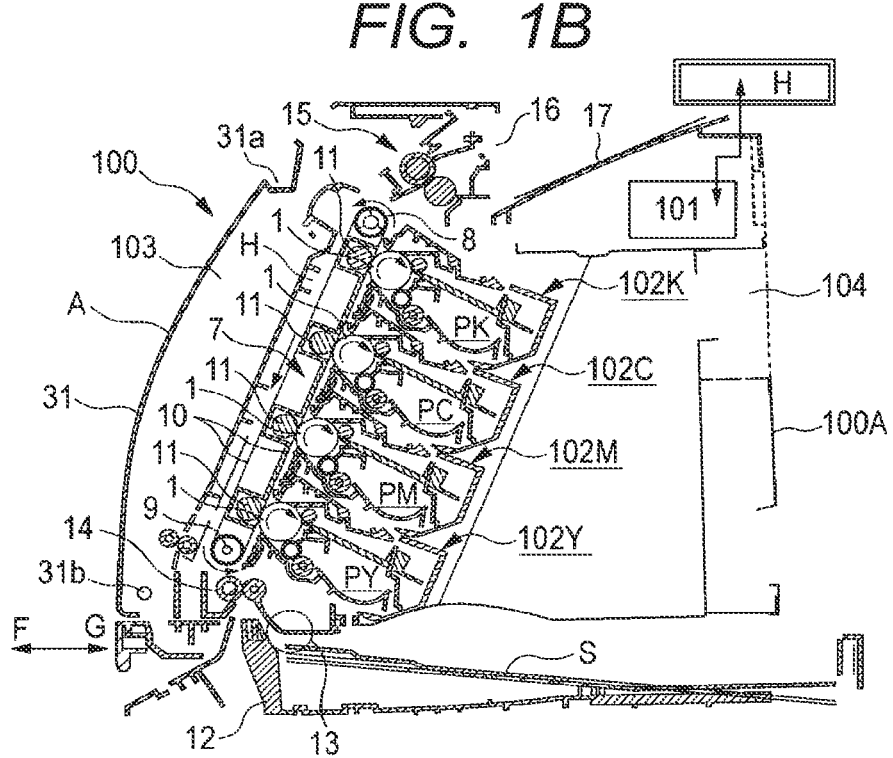
FIG. 1B is a vertical sectional left side view of the apparatus.
Figure 2A:
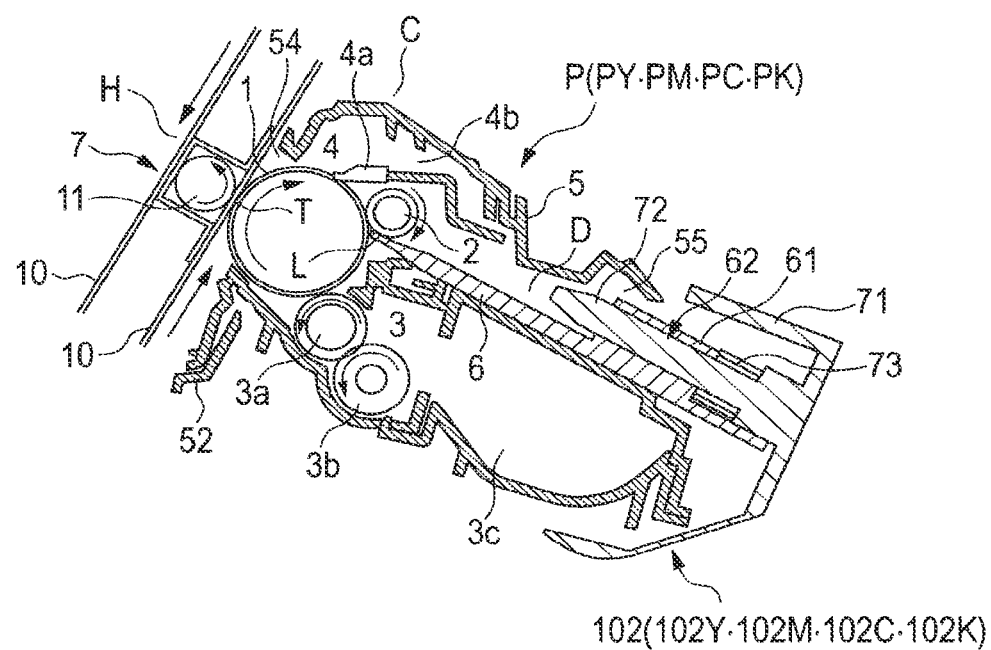
FIG. 2A is a partial enlarged view of FIG. 1B.
Figure 2B:
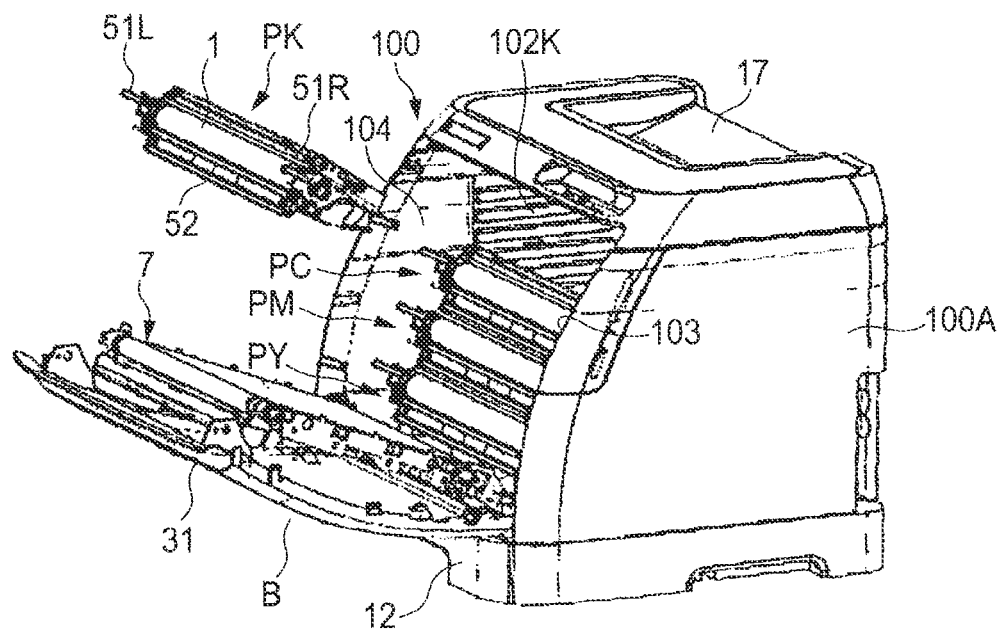
FIG. 2B is a perspective view of an apparatus in a state where a front door is opened and a top process cartridge is removed or mounted.

FIG. 1A is a perspective view of an electrophotographic image forming apparatus 100 according to this embodiment, and FIG. 1B is a vertical left side view of the apparatus 100. FIG. 2A is a partial enlarged view of FIG. 1B, and FIG. 2B is a perspective view of the apparatus 100 in a state where a front door is opened and a top process cartridge is removed or mounted. The apparatus 100 is an in-line color electrophotographic image forming apparatus that forms a color image on a recording medium in a state where four process cartridges each including an electrophotographic photosensitive drum are removably mounted to corresponding cartridge mounting portions in a main body. As an image exposure apparatus (exposure unit) that exposes an electrophotographic photosensitive drum, an LED unit (a light emitting member: an LED head array, an LED exposure apparatus) is used. More specifically, the apparatus 100 is a four-full-color LED printer using an electrophotographic process. The apparatus 100 forms a color image on a recording medium S based on electric image information (image signal) input from a host apparatus H such as a personal computer, an image leader or a counterpart facsimile apparatus to a control circuit portion 101.

In the description below, a front side (front face side) of the apparatus 100 is a side into and from which a feed cassette 12 on which recording mediums S are stacked and housed is inserted and removed. A rear side (back side) is a side opposite to the insertion and removal side. A lower side is a side on which the feed cassette 12 is provided. Front and rear directions are a direction from the rear side to the front side of the apparatus (front direction) and a direction opposite thereto (rear direction). Left and right are taken from the front side of the apparatus. Left and right directions are a direction from right to left (left direction), and a direction opposite thereto (right direction). Top and bottom are taken in a gravity direction. A main body (body) 100A is a component of the apparatus 100 except the process cartridge. A recording medium S includes, for example, paper, an OHT sheet, an envelope, a post card or a label (hereinafter referred to as a recording material) on which an image is formed by the apparatus 100.

In the body 100A, first to fourth cartridge mounting portions 102 (102Y, 102M, 102C and 102K) are provided in order from bottom to top in an oblique direction inclined rearward with respect to a vertical direction. The mounting portions 102 have the same configuration, and each includes a cartridge guide (cartridge holding member) 71 to which a process cartridge P is removably mounted. The guide 71 is secured and provided on a frame 104 forming a structure of the body 100A. An LED unit 6 is swingably provided inside the each guide 71. First to fourth process cartridges P (PY, PM, PC and PK) containing developers of different colors are removably mounted to the mounting portions 102. The first cartridge PY is located at a bottom, and the second cartridge PM is located above the first cartridge PY. The third cartridge PC is located above the second cartridge. Each cartridge P includes an electrophotographic photosensitive drum 1 and a developing unit 3 for image visualizing (developing) an electrostatic latent image formed on the drum 1 with a developer (toner) into a developer image (toner image). The cartridges P have the same electrophotographic process mechanism except containing developers of different colors. In the cartridge P in this embodiment, the drum 1, and a charging unit 2, a developing unit 3, and a cleaning unit 4 as process units that act on the drum 1 are integrated into the cartridge in a predetermined relative arrangement in a cartridge frame 5. The drum 1 is rotatably supported by the frame 5 via a bearing member (not shown). The cartridge P is an assembly with a rotation axis direction of the drum 1 in a longitudinal direction, one end side of the drum 1 in the rotation axis direction is a drive side, and the other end side is a non-drive side. The charging unit 2 is a unit that uniformly charges a peripheral surface of the drum 1 to predetermined polarity and potential, and a charging roller that is a contact charging member is used as the charging unit 2. The developing unit 3 includes a developing roller 3a as a developing member for applying a developer to the drum 1, a feed roller 3b for feeding the developer to the developing roller 3a, and a developer containing portion 3c that contains a powder developer (not shown). The cleaning unit 4 is a unit for removing a transfer residual developer from a drum surface after a developer image is transferred to the recording material S, and includes a cleaning blade 4a as a cleaning member, a waste developer containing portion 4b, and the like. The first cartridge PY contains a yellow (Y) developer in the containing portion 3c, and forms a yellow developer image on a surface of the drum 1. The second cartridge PM contains a magenta (M) developer in the containing portion 3c, and forms a magenta developer image on the surface of the drum 1. The third cartridge PC contains a cyan (C) developer in the containing portion 3c, and forms a cyan developer image on the surface of the drum 1. The fourth cartridge PK contains a black (K) developer in the containing portion 3c, and forms a black developer image on the surface of the drum 1.

Figure 17:
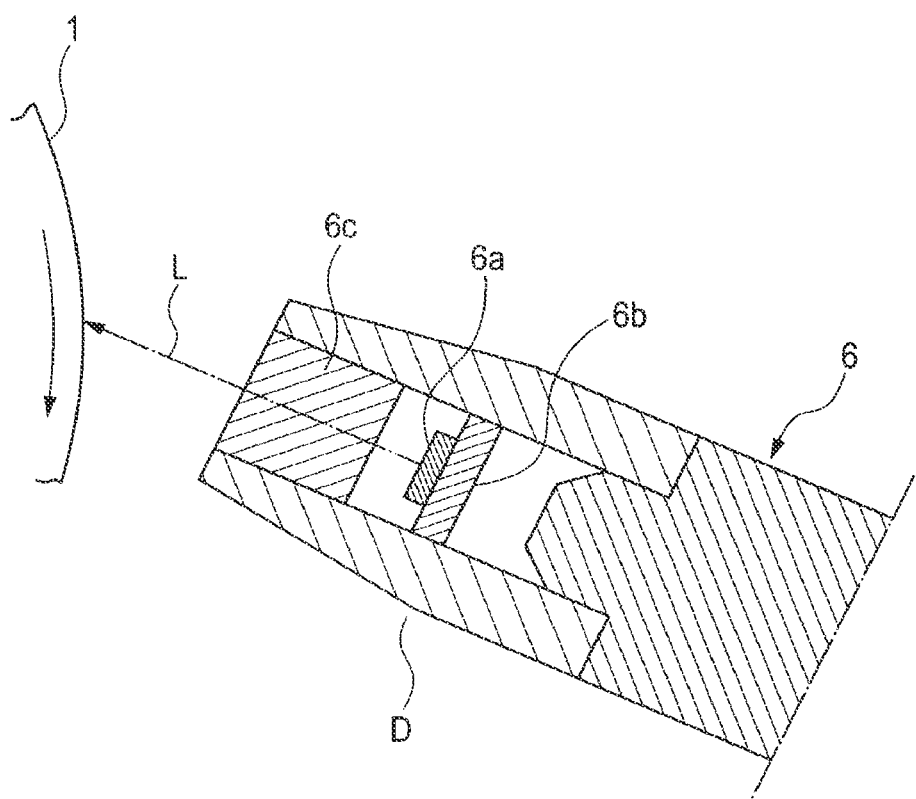
FIG. 17 is an enlarged cross sectional view on a tip side of an LED unit located in an exposure position.

In a state where each cartridge P is mounted to a corresponding mounting portion 102 and positioned in a predetermined image forming position C with respect to the body 100A, a drive output portion (not shown) of the body 100A is connected to a drive input portion 59 (FIG. 6B) of the cartridge P. The image forming position C of the cartridge P is a position for forming an image on the recording material S. A bias output portion (not shown) of the body 100A is connected to a bias input portion (not shown) of the cartridge P. An LED unit 6 is positioned in an exposure position D for exposing the drum 1 in a backward of the drum 1 with respect to each cartridge P positioned in the image forming position C. Positioning of the cartridge P and the unit 6 will be described later. FIG. 17 is an enlarged cross sectional view on a tip side of the unit 6 located in the exposure position D. The unit 6 is a light emitting member that is provided in a rotation axis direction (longitudinal direction) of the drum 1, and has a plurality of LEDs (light emitting diodes) 6a as light emitting elements that emit light according to image information for exposing the drum 1. The unit 6 includes an LED substrate 6b, and a SELFOC™ lens 6c. The lens 6c is a lens for converging a light emitted from the LED 6a and exposing the drum 1. The unit 6 is an exposure unit that selectively controls light emission of the plurality of LEDs 6a according to image information input from the control circuit portion 101, and performs main scanning exposure of the surface of the rotating drum 1 charged by the charging roller 2 to form an electrostatic latent image corresponding to the image information. In the apparatus 100 of this embodiment, the unit 6 outputs a light L (LY, LM, LC and LK) modulated according to image information of each of the colors of Y, M, C and K input from a host apparatus H to the control circuit portion 101 and performs scanning exposure of the drum 1 in the cartridge P of a corresponding color. The unit 6 as a light emitting member is positioned in the exposure position D with the cartridge P being positioned in the image forming position C. A plurality of units 6 are arranged in the longitudinal direction of the drum 1, and include a plurality of light emitting elements that expose according to the image information for exposing the drum 1.

A transfer unit 7 is provided on a front side of first to fourth mounting portions 102 (102Y, 102M, 102C and 102K) to which the cartridges P are removably mounted. The unit 7 includes a driving roller 8 and a driven roller 9 provided in upper and lower positions and parallel to each other, an endless conveyor belt 10 looping around the rollers 8 and 9, and four transfer rollers (transfer members) 11 corresponding to the drum 1 of each cartridge P. The belt 10 is driven by the driving roller 8, and circulated at a predetermined speed in a counterclockwise direction shown by arrow so as to face and be brought into contact with all the drums 1 of the cartridges P mounted to the mounting portions 102. With the unit 7 being positioned in a predetermined transfer position H in the body 100A, each roller 11 abuts against an inner surface of the belt so as to interpose the belt 10 between the roller 11 and the corresponding drum 1 of each cartridge P positioned in the image forming position C. In each cartridge P, a contact portion (nip portion) between the drum 1 and the belt 10 is a transfer portion T. The roller 11 is a transfer member for transferring, to the recording material S, a developer image formed on the drum 1 using the developing unit 3.

A cassette 12 is provided on a lower side of the body 100A. Sheet-like recording materials S are stacked in the cassette 12. The cassette 12 can be inserted or removed from the front side of the apparatus 100 (front loading). Arrows F and G show a drawing direction and an insertion direction of the cassette 12. For the recording materials S in the cassette 12, the feed roller 13 is driven to separate and feed one top recording material S forward in the body 100A in cooperation with a separation member (not shown). The recording material S is guided upward by a guide and registered by a pair of registration rollers 14 provided in a downward of the unit 7. A fixing apparatus 15 is provided in an upward of the unit 7. The fixing apparatus 15 fixes an unfixed developer image formed on the recording material S as a fixed image by applying heat and pressure. A discharge tray 17 that receives a recording material on which an image has been formed from a discharge port 16 is provided on an upper surface of the body 100A.

An operation for forming a full-color image is as described below. The drum 1 of each cartridge P is rotationally driven at a predetermined speed in a clockwise direction shown by arrow based on an image forming start signal. The belt 10 is also rotationally driven at a speed corresponding to the speed of the drum 1 in a counterclockwise direction shown by arrow (forward in drum rotation). The roller 13 is driven to separate and feed one recording material S from the cassette 12, and the recording material S is registered by the pair of rollers 14 and fed out to a surface of an upward belt portion of the belt 10 from the side of the driven roller 9 of the unit 7. The recording material S is electrostatically adsorbed by a belt surface and conveyed upward by movement of the belt 10. In each cartridge P, a predetermined charging bias is applied to the roller 2 at predetermined control timing to uniformly charge the surface of the drum 1 to predetermined polarity and potential. The unit 6 selectively controls light emission of the plurality of LEDs as light emitting elements according to image information input from the control circuit portion 101, and performs main scanning exposure of the surface of the drum 1 charged by the roller 2. Thus, an electrostatic latent image according to image information of corresponding color is formed on the surface of each drum 1. The formed latent image is developed as a developer image by the roller 3a. A predetermined development bias is applied to the roller 3a at predetermined control timing. By the above operation of the electrophotographic image forming process, a yellow developer image corresponding to a yellow component of a full-color image is formed on the drum 1 of the first cartridge PY. A magenta developer image corresponding to a magenta component of the full-color image is formed on the drum 1 of the second cartridge PM. A cyan developer image corresponding to a cyan component of the full-color image is formed on the drum 1 of the third cartridge PC. A black developer image corresponding to a black component of the full-color image is formed on the drum 1 of the fourth cartridge PK. Specifically, by the operation of the predetermined electrophotographic image forming process, the developer images corresponding to the color components of the full-color image are formed on the drums 1 of the cartridges P of the respective colors. The developer images are electrostatically adsorbed by the belt 10 and successively superimposed on and transferred to the surface of the recording material S successively passing through transfer portions T of the cartridges P. A transfer bias of predetermined potential with polarity opposite to charging polarity of the developer is applied from a power supply portion (not shown) to the roller 11. Thus, unfixed developer images of full-color including four colors: yellow, magenta, cyan and black superimposed are formed on the surface of the recording material S having fed out of the transfer portion T of the fourth cartridge PK. In each cartridge P, the developer remaining on the surface of the drum 1 after the transfer is removed by the cleaning unit 4. The recording material S fed out of the transfer portion T of the fourth cartridge PK is separated from the surface of the belt 10 by a curvature of the roller 8 and introduced into the fixing apparatus 15, and the unfixed developer image is undergoes fixing treatment on the recording material S. Then, the recording material S is fed out of the fixing apparatus 15 and discharged from the discharge port 16 onto the tray 17 as a full-color image formed material. The unit 7 transfers the image formed on the drum 1 to the recording material S fed from the lower cassette (feed unit) 12 in the body 100A and conveys the recording material S upward. After the developer image is fixed on the recording material S, the recording material S is discharged to the outside of the body 100A.

{Cartridge}

Figure 3A:
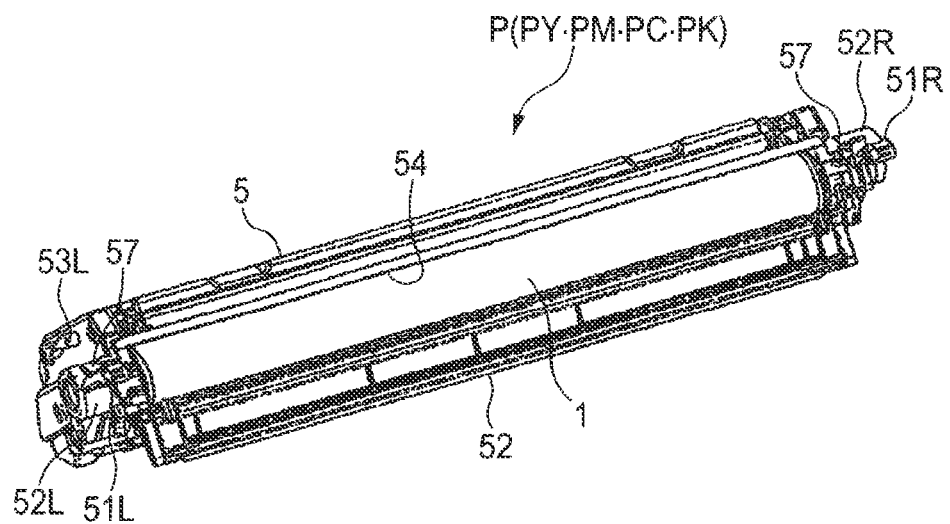
FIG. 3A is an appearance perspective view of a cartridge with a drum shutter being opened, seen from the front.
Figure 3B:
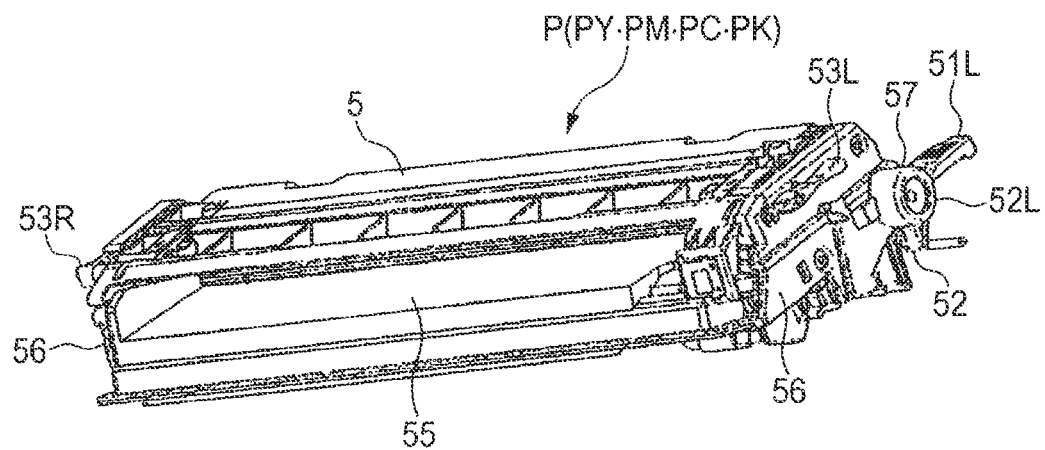
FIG. 3B is an appearance perspective view of the cartridge in FIG. 3A seen from the back.

FIG. 3A is an appearance perspective view of the cartridge P with a drum shutter 52 being opened, seen from the front. FIG. 3B is an appearance perspective view of the cartridge P seen from the back. On left and right sides of the frame 5, handles 51L and 51R provided to protrude on the front side of the cartridge, positioned portions 52L and 52R coaxial with the rotation axis of the drum 1, and insertion guide portions 53L and 53R are symmetrically provided. An exposing groove 55 into which the unit 6 fits is provided on a back side of the cartridge. The exposing groove 55 with a concave shape is provided in the cartridge P and forms a space through which the light for exposing the photosensitive drum 1 passes. The shutter 52 is a member for protecting the drum 1, and can be manually opened/closed with respect to the frame 5 by an opening/closing mechanism (not shown) in this embodiment. Specifically, the shutter 52 can be closed to a closed position (position shown by a dash-double-dot line in FIG. 4A) to hide a drum outer exposure opening window 54 on the front side of the cartridge, and opened to an opened position (position shown by a solid line in FIG. 3A) shifted downward from the window 54. When the cartridge P is mounted to the body 100A, the shutter 52 is opened. When the cartridge P is removed from the body 100A, the shutter 52 is closed to hide and protect the drum 1. The shutter 52 of each cartridge P is opened in a state where each cartridge P is mounted to a corresponding mounting portion 102. In a state where a front door (openable and closable member) 31 described later is closed to a closed position A with respect to the body 100A, the belt 10 of the unit 7 positioned in the transfer position H is brought into contact with a front outer exposure portion of the drum 1 of each cartridge P. The shutter 52 may be automatically opened/closed in conjunction with an opening/closing operation of the door 31. Specifically, when the cartridge P is inserted into the mounting portion 102 and the door 31 is closed to the closed position A, the shutter 52 is automatically moved from the closed position to the opened position by an interlocking member that interlocks with the closing operation of the door 31. When the door 31 is opened to an opened position B, the shutter 52 can be automatically moved from the opened position to the closed position.

{Cartridge Replacing Method}

As each cartridge P mounted to the apparatus 100 is used for image forming, the contained developer (toner) is consumed. Thus, for example, a unit (not shown) for detecting a remaining amount of developer in each cartridge P is provided, and the control circuit portion 101 compares a detected value of the remaining amount with a preset threshold for a life notice or a life warning of a cartridge. For a cartridge with the detected value of the remaining amount smaller than the threshold, a display portion (not shown) displays a life notice or a life warning of the cartridge. This promotes a user to prepare for a replacement cartridge, or promotes the user to replace the cartridge to maintain quality of an output image.

In the apparatus 100 of this embodiment, the cartridge P is replaced by a front access method for improving usability.

On the front side of the body 100A, an opening portion 103 is provided through which each cartridge P is inserted into and removed from the corresponding mounting portion 102. A front door (front cover: an exterior member of the apparatus 100) 31 is provided as an openable and closable member movable between the closed position A for closing the opening portion 103 and the opened position B (FIG. 2B) for opening the opening portion 103. In this embodiment, the door 31 is an operation member operated by the user when mounting the cartridge to the body 100A. In this embodiment, the door 31 is pivotable around a lower shaft (hinge shaft) 31b so as to be opened/closed with respect to the body 100A, and can be pivoted to a raised direction around the hinge shaft 31b and closed with respect to the opening portion 103 as shown in FIGS. 1A and 1B. The door 31 is closed to close the opening portion 103. The door 31 in the closed position A is held in the position by a latching mechanism or a toggle mechanism (not shown). The door 31 in the closed position A is pivoted around the shaft 31b by the user placing his/her fingers on the handle 31a to release the latch or against a toggle force so as to substantially horizontally lay the door 31 forward of the main body 100A. Thus, as shown in FIG. 2B, the door 31 can be moved to the opened position B. The door 31 moved to the opened position B is held in the position. In this embodiment, the unit 7 is opened/closed together with the door 31 with respect to the opening portion 103 in conjunction with the opening/closing operation of the door 31. Thus, the door 31 is moved to the opened position B, and thus the front side of each mounting portion 102 is opened, and the front side of the cartridge P mounted to each mounting portion 102 is exposed to the opening portion 103.

Figure 4A:
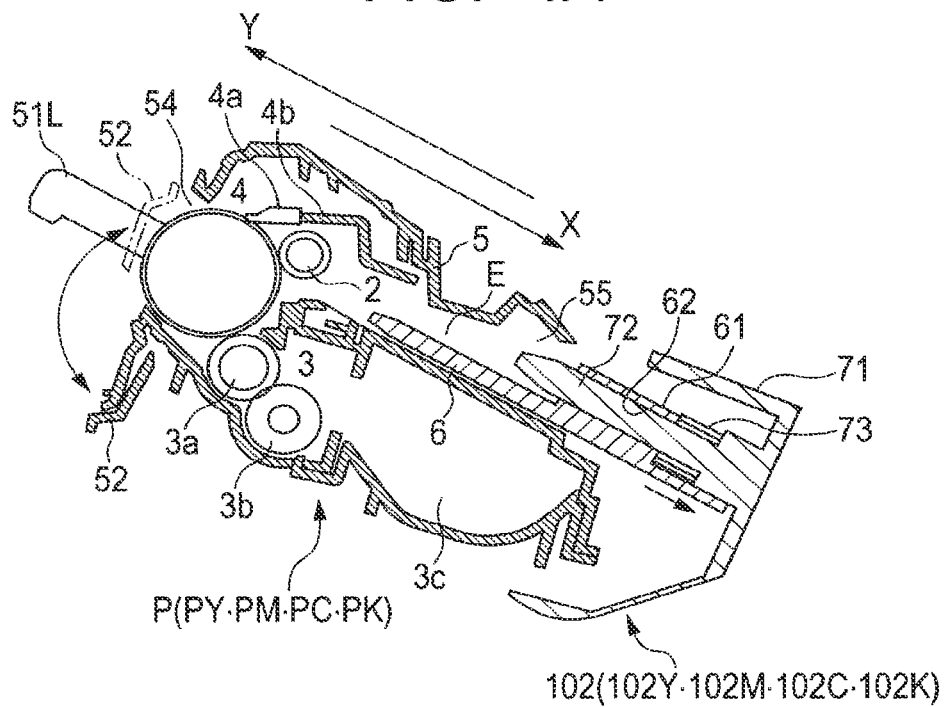
FIG. 4A illustrates mounting and removal of the cartridge.
Figure 5A:
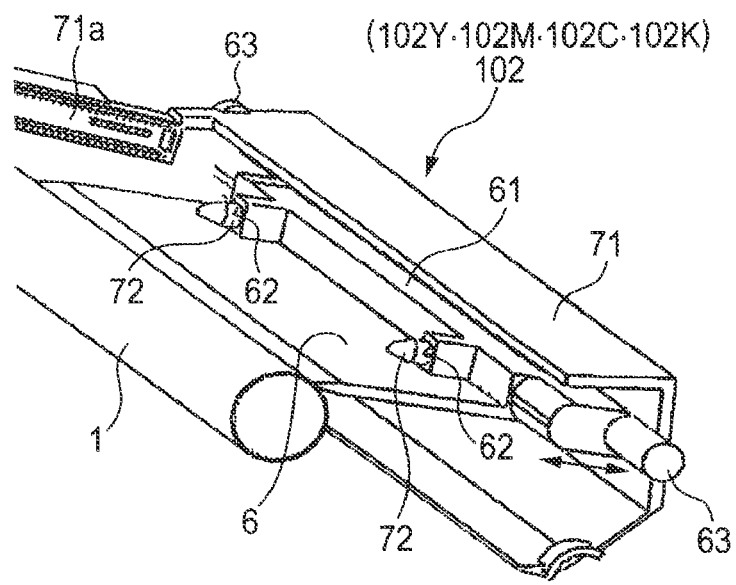
FIG. 5A illustrates a configuration of a cartridge guide.

The unit 7 is positioned in the predetermined transfer position H where the image can be transferred to the recording material S with respect to each cartridge P positioned in the image forming position C in a state where the door 31 is in the closed position A. When the door 31 in the closed position A is pivoted in the opening direction around the shaft 31b by releasing the latch or against the toggle force, a door switch (kill switch: not shown) is turned off, and a power supply circuit (not shown) of the apparatus 100 is held in an opened state. In an initial stage of opening pivot of the door 31, an interlocking mechanism (not shown) that interlocks with the opening operation of the door 31 releases connection between a drive input portion (not shown) of the unit 7 and a drive output portion (not shown) of the main body 100A. Connection between a drive input portion 59 (FIG. 6B) of the cartridge P and a drive output portion (not shown) of the main body 100A is also released. When the door 31 including the unit 7 is opened to the opened position B, the opening portion 103 of the body 100A is widely opened to provide accessibility to the mounting portion 102. The door 31 is opened to the opened position B to release positioning of the cartridge P with respect to the body 100A as described later. Also, the unit 6 is moved from the exposure position D (FIG. 2A) for the drum 1 to a retracted position E (FIG. 4A) and held in the retracted position E. Each cartridge P mounted to the mounting portion 102 is removed by holding the left and right handles 51L and 51R protruding from left and right sides of the cartridge P to the front side of the cartridge by left and right hands, and drawing the cartridge P forward from the mounting portion 102. Each cartridge P is drawn by sliding the left and right insertion guide portions 53L and 53R of the cartridge P in left and right guide groove portions 71a (FIG. 5A) in the guide 71. By drawing the cartridge P to move it, the unit 6 is drawn from the exposing groove 55, and the cartridge P is removed from the main body 100A. In FIG. 4A, arrow Y shows a removal direction of the cartridge P. The shutter 52 is manually closed before drawing or after removal of the cartridge P.

The cartridge P is mounted to the mounting portion 102 by holding the left and right handles 51L and 51R of the cartridge P to hold the cartridge P, and inserting a back side of the cartridge into the guide (body side guide) 71 of the mounting portion 102. This insertion is performed by respectively engaging the left and right insertion guide portions (cartridge side guides) 53L and 53R of the cartridge P with the left and right guide groove portions 71a of the guide 71 and sliding the guide portions 53L and 53R in the guide groove portions 71a. In FIG. 4A, arrow X is a mounting direction of the cartridge P. By insertion of the cartridge P, the unit 6 located in the retracted position E fits into the exposing groove 55. Then, when the cartridge P is sufficiently inserted, the left and right positioned portions 52L and 52R are received by the left and right positioning portions 105 (recess in FIG. 5B) of the frame 104 to prevent further insertion. The shutter 52 of the cartridge P is manually opened before or after the cartridge P is inserted into the body 100A.

After the cartridge P is replaced by a new one, the door 31 including the unit 7 is pivoted from the opened position B to the closed position A. By an operation of an interlocking member 80 (FIG. 6A) described later interlocking with the closing operation of the door 31, each cartridge P is positioned with respect to the frame 104. The positioning position is the image forming position C of the cartridge P. The unit 6 is moved from the retracted position E to the exposure position D and positioned with respect to the cartridge P positioned in the image forming position C. The unit 7 is positioned in the transfer position H with respect to the body 100A. Specifically, the belt 10 of the unit 7 is brought into contact with an exposed portion outside the front of the drum 1 of each cartridge P positioned in the image forming position C. The door 31 closed to the closed position A is held in the position by a latching mechanism or a toggle mechanism (not shown). In this state, the door switch is turned on, and the power supply circuit of the apparatus 100 is held in a closed state. The drive output portion of the main body is connected to the drive input portion 59 of the cartridge P. A bias output portion of the main body 100A is connected to a bias input portion of the cartridge P. The drive output portion of the main body is connected to the drive input portion of the unit 7. The bias output portion of the main body 100A is connected to the bias input portion of the unit 7. In this state, the apparatus 100 can perform an image forming operation.

{Positioning Configuration of Cartridge P and Unit 6}

Figure 4B:
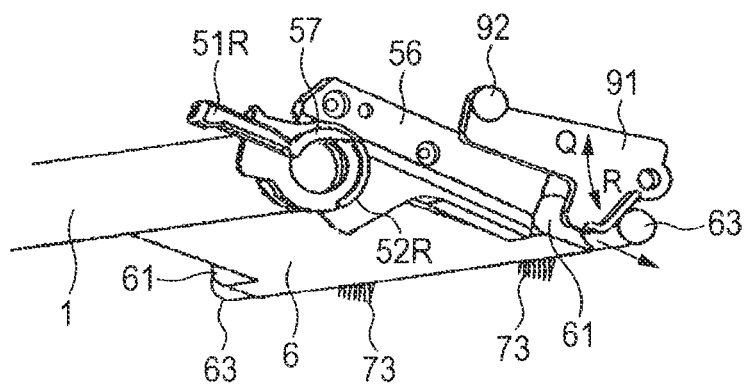
FIG. 4B illustrates positioning of an LED unit.
Figure 6A:
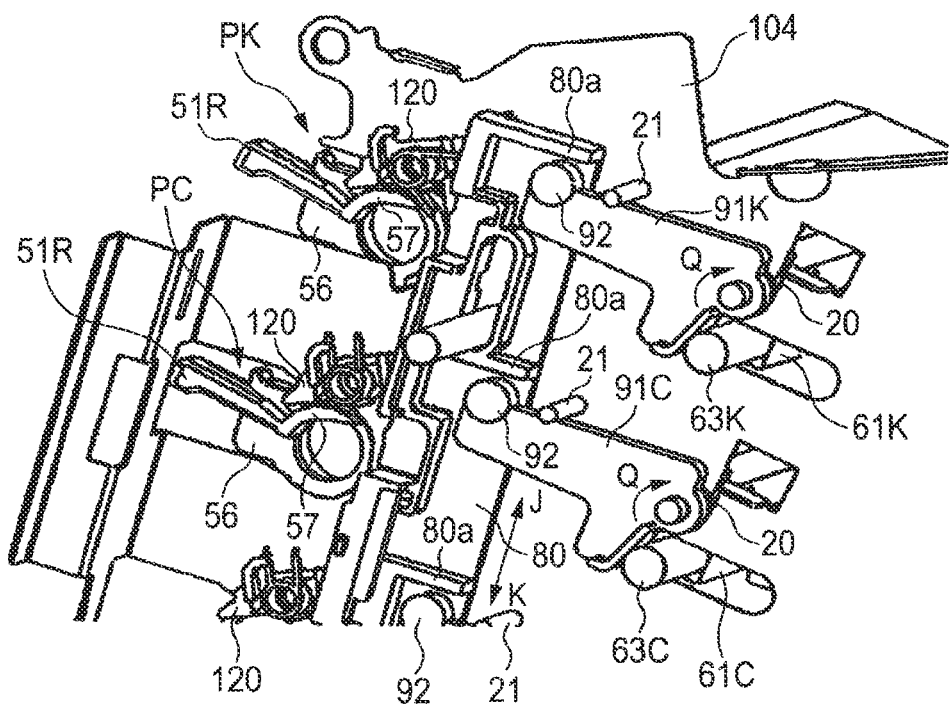
FIG. 6A illustrates an interlocking operation.
Figure 7:
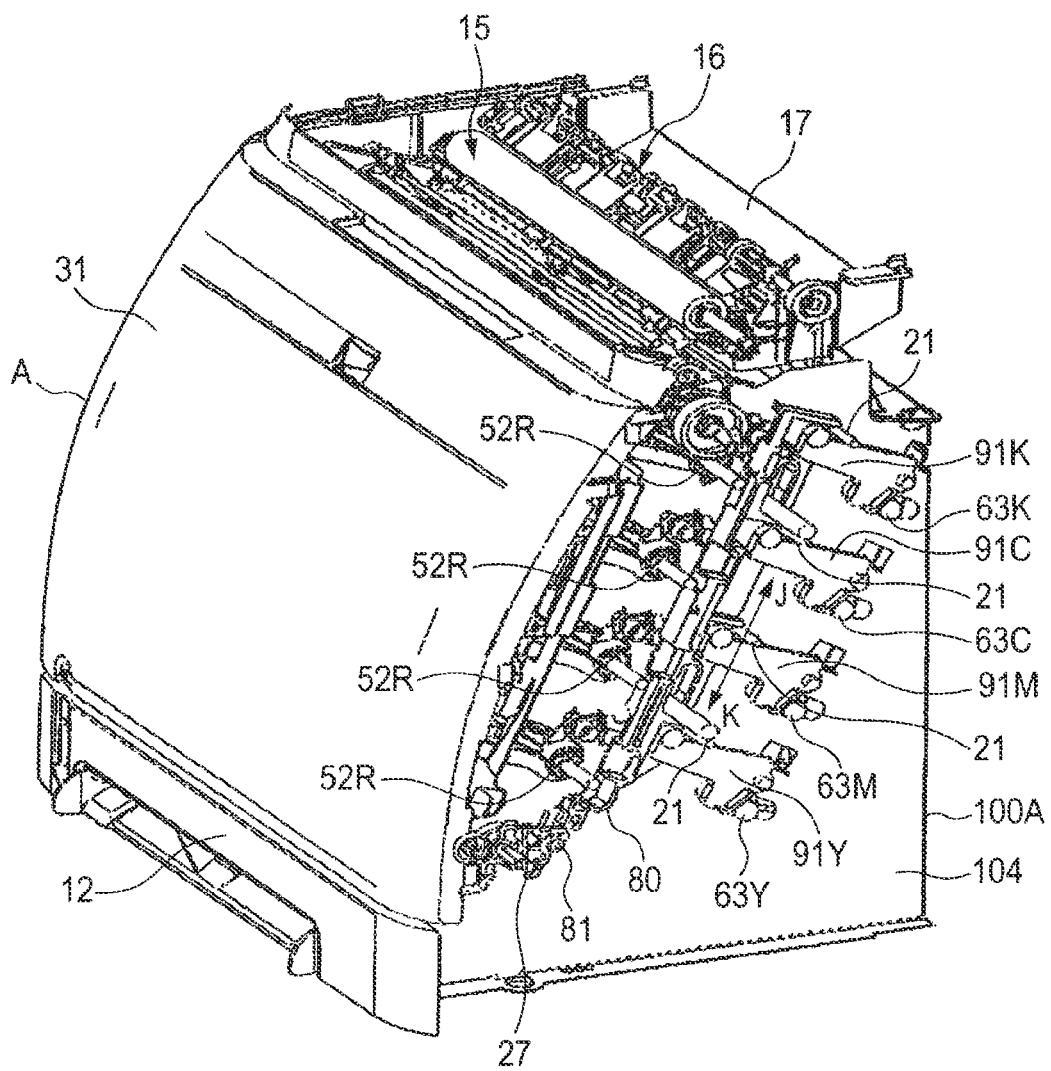
FIG. 7 illustrates an interlocking mechanism.

The unit 6 is supported by a support member (light emitting member support) 61. The guide 71 includes shaft portions 72 respectively protruding in a cartridge removal direction Y at left and right portions inside a rear plate. Guide holes 62 on left and right sides of the support 61 fit on the left and right shaft portions 72. Thus, the support 61 is supported by the guide 71 so as to be movable (swingable) along the shaft portion 72 in the cartridge insertion direction X and the cartridge removal direction Y opposite thereto in the guide 71. A coil spring (biasing member or elastic member) 73 is externally fitted to a base of the shaft portion 72 between the support 61 and the guide 71. The support 61 is moved by a predetermined amount in the cartridge removal direction Y by a biasing force (elastic force) of the spring 73 in a free state. With this configuration, the unit 6 is supported by the support 61 so as to be located in the exposure position D where the light emitting element emits light to expose the drum 1, and the retracted position E where the unit 6 is retracted from the exposure position D. In a state where the cartridge P is positioned in the image forming position C, the position in the cartridge removal direction X in the exposure position D of the unit 6 is determined as described below. Specifically, the position is determined by the support 61 abutting against a drum cover 56 that positions the drum 1 as shown in FIG. 4B by a biasing force of the spring 73. The direction perpendicular to the cartridge removal direction X of the unit 6 and the axial direction of the drum 1 are determined by engagement between the guide hole 62 and the shaft portion 72. The support 61 includes protrusions 63 (63Y, 63M, 63C and 63K) extending to the outside of the body frame 104 as shown in FIG. 7. The protrusion 63 is pressed in the cartridge insertion direction X by a rotatable lever 91 (91Y, 91M, 91C and 91K) against the biasing force of the spring 73. Thus, the support 61 is moved inward (rearward) of the body and retracted away from the drum cover 56. Specifically, the unit 6 is moved from the exposure position D to the retracted position E and held in the retracted position E. The lever 91 is away from the protrusion 63 in a state where the apparatus 100 can perform an image forming operation. At that time, as shown in FIG. 6A, the lever 91 is urged in the arrow direction (clockwise direction) by an elastic force of the spring (elastic member) 20 and abuts against the shaft 21 embedded in the frame 104. In this state, the support 61 is moved in the cartridge removal direction Y by a biasing force of the spring 73, and the support 61 abuts against the drum cover 56. Thus, the unit 6 is moved from the retracted position E to the exposure position D and positioned in the exposure position D (FIG. 4B).

The lever 91 is a light emitting member positioning member (light emitting member pressing member) for positioning (pressing) the support 61 so that the unit 6 is positioned in the exposure position D. The lever 91 is moved between a positioning position (pressing position for pressing) Q where the support 61 is pressed and positioned so that the unit 6 is positioned in the exposure position D and a retracted position R where the lever 91 is retracted from the positioning position Q. A rod (interlocking member) 80 slidable in an upward direction shown by arrow J and a downward direction shown by arrow K opposite to the upward direction is placed outside the frame 104. The rod 80 is vertically moved in conjunction with the opening/closing operation of the door 31 as described later. The vertical movement of the rod 80 performs pressing release and pressing of the protrusion 63 by the lever 91. Specifically, the unit 6 is moved between the exposure position D and the retracted position E.

Figure 5B:
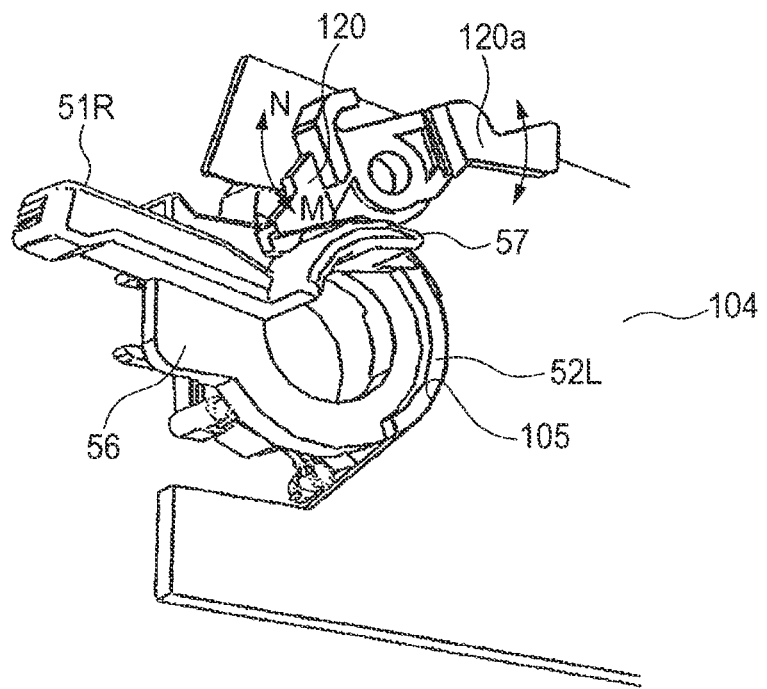
FIG. 5B illustrates positioning of the cartridge.
Figure 6B:
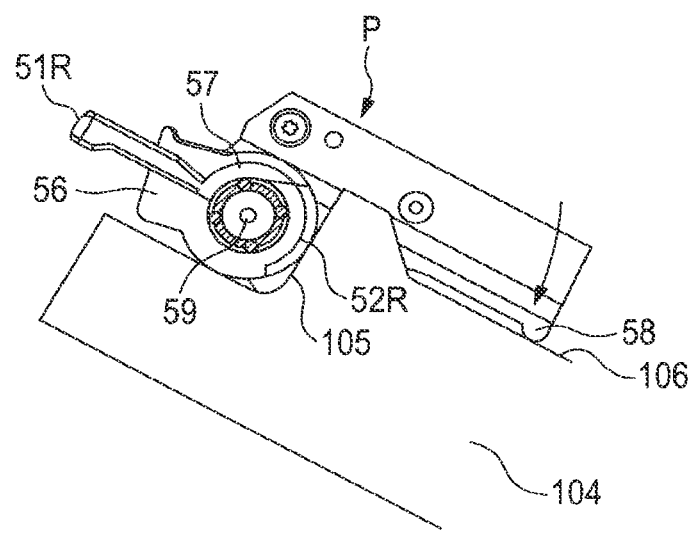
FIG. 6B illustrates positioning in a direction perpendicular to a removal direction of the cartridge.

Next, positioning of the cartridge P will be described. The position of the cartridge P in the insertion direction X is determined by the left and right positioned portions 52L and 52R being received by the left and right positioning portions 105 of the frame 104 as shown in FIG. 5B. The position of the cartridge P in the removal direction Y is determined by a projection 57 of the drum cover 56 being pressed by a biasing force of a pivotable cartridge pressing lever 120 placed on the frame 104. The lever 120 is a cartridge positioning member (cartridge pressing member for pressing the cartridge P in the image forming position C) for positioning the cartridge P in the image forming position C. By the pressing, the positioned portions 52L and 52R of the cartridge P are pressed against the positioning portion 105 and the cartridge P is positioned and held in the image forming position C. The direction perpendicular to the removal direction Y of the cartridge P is determined as shown in FIG. 6B. Specifically, the direction is determined in such a manner that the cartridge P is rotated around the drive input portion 59 by a rotation drive force input from the drive output portion (not shown) to the drive input portion 59 of the cartridge P, and the protrusion 58 of the cartridge P abuts against the abutment surface 106 of the frame 104.

Figure 8:
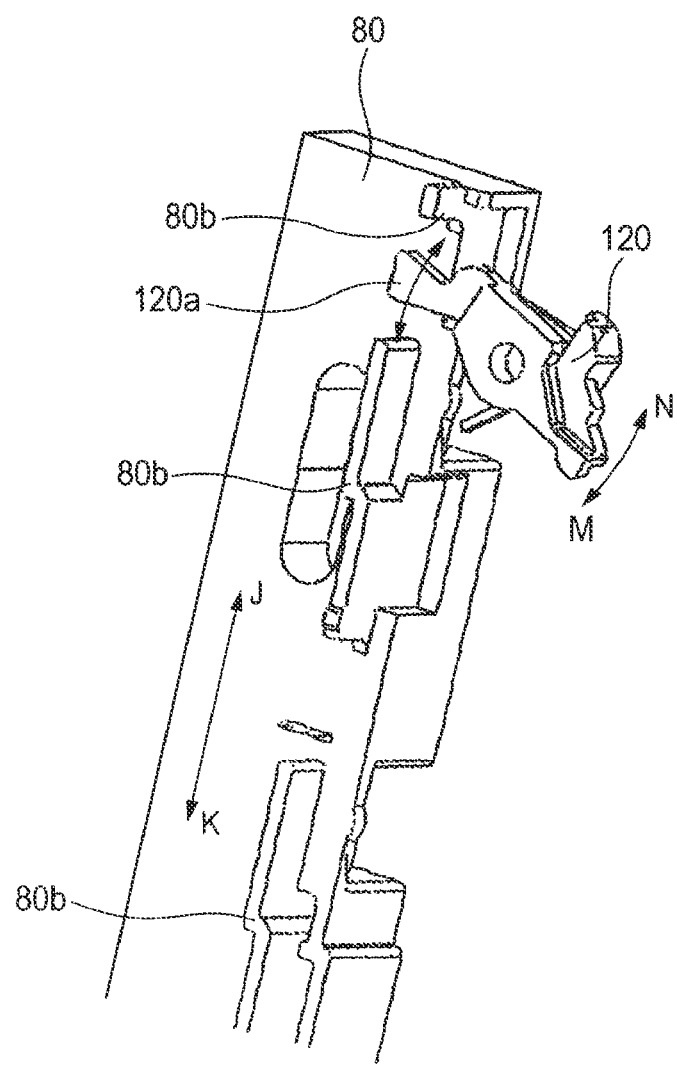
FIG. 8 illustrates an interlocking operation of a rod and a cartridge pressing lever.
Figure 9A:
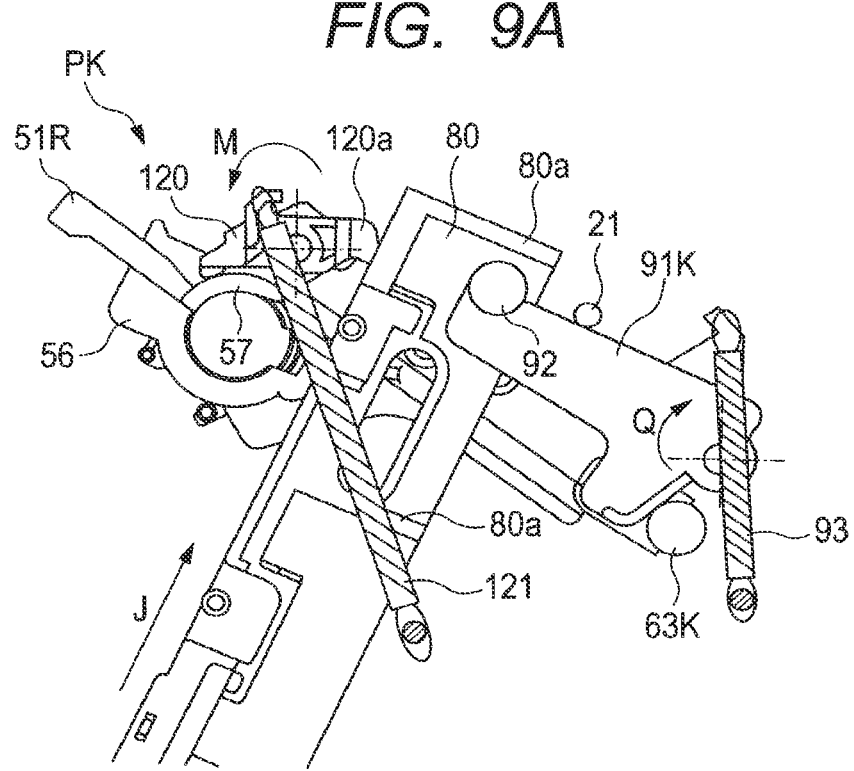
FIGS. 9A and 9B illustrate a toggle mechanism and an operation thereof.
Figure 9B:
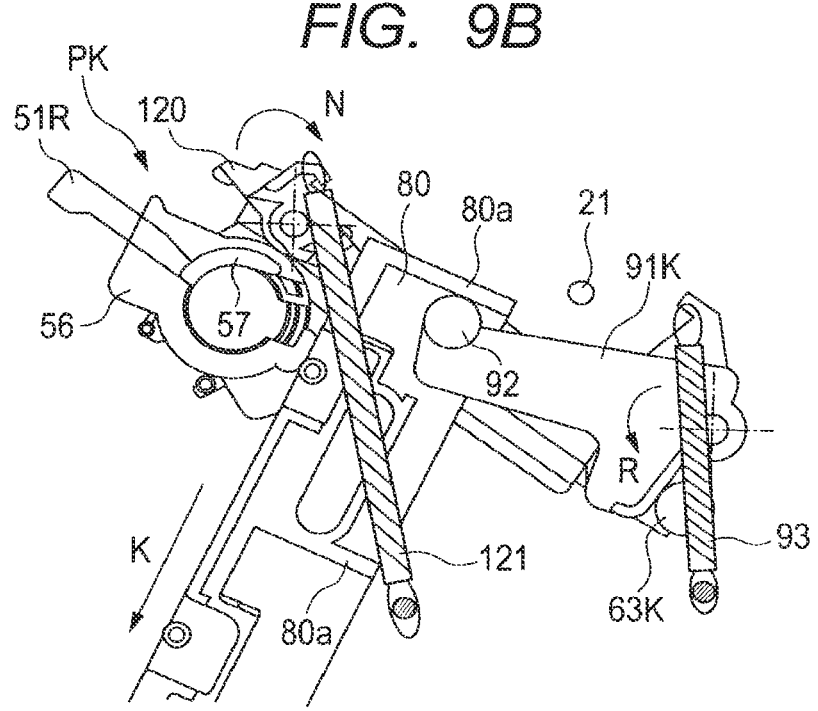

Pressing and pressing release of the cartridge P by the lever 120 are also performed in conjunction with sliding of the rod 80 like pressing and pressing release of the unit 6. As shown in FIG. 8, the rod 80 is slid downward shown by arrow K, and thus a cartridge pressing abutment portion 80b on a back surface (body inner surface) of the rod 80 abuts against an upper surface of the protrusion 120a of the lever 120. Thus, the lever 120 is pivoted in a direction away from the projection 57 of the cartridge P. Specifically, the lever 120 is moved from the positioning position (pressing position for pressing) M where the cartridge P is pressed and positioned in the image forming position C to the retracted position N where the cartridge P is retracted, and pressing of the positioned portions 52L and 52R of the cartridge P against the positioning portion 105 is released. On the other hand, the rod 80 is slid upward shown by arrow J, the abutment portion 80b of the rod 80 abuts against the lower surface of the protrusion 120a of the lever 120 to press the lever 120. Thus, the lever 120 is pivoted in the direction toward the projection 57 of the cartridge P, and the positioned portions 52L and 52R of the cartridge P are pressed against the positioning portion 105. Specifically, the lever 120 is moved from the retracted position N to the positioning position M where the cartridge P is pressed and positioned in the image forming position C, and the positioned portions 52L and 52R of the cartridge P are pressed against the positioning portion 105. As shown in FIG. 9A, the lever 91 is urged in the clockwise direction by a lever spring (elastic member) 93 (toggle mechanism), and the lever 120 is urged in the counterclockwise direction by a pressing lever spring (elastic member) 121 (toggle mechanism). When the levers are pivoted by a certain angle or more, as shown in FIG. 9B, the urging directions are changed by the toggle mechanisms.

Specifically, the lever 91 and the lever 120 are urged (pressed) by the toggle mechanisms 93 and 121.

Figure 10:
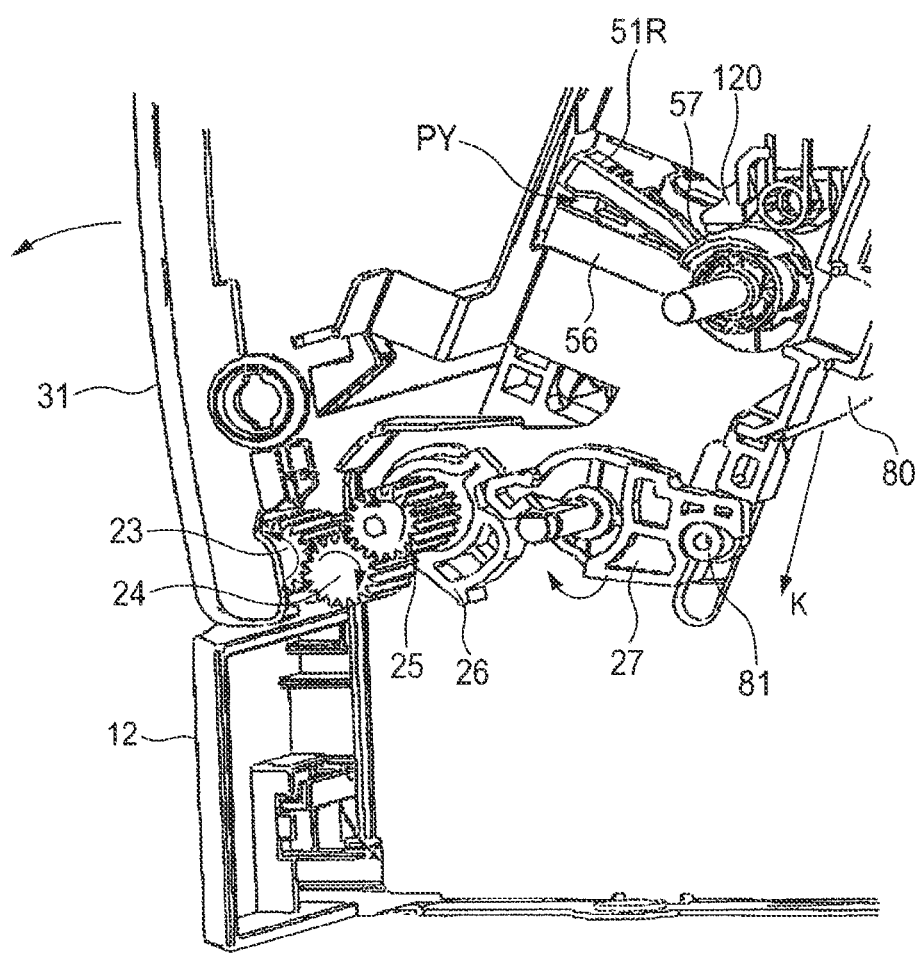
FIG. 10 illustrates an interlocking mechanism of a door and the rod.

An interlocking mechanism between the door 31 and the rod 80 will be described. As shown in FIG. 10, the door 31 includes a door gear 23 concentric with the lateral shaft 31b (FIG. 1B) as a center of opening/closing. The gear 23 is rotated around the lateral shaft 31b integrally with the door 31 along with the opening/closing operation of the door 31. An intermediate link gear 25 meshes with the door 31 via an idler gear 24. An intermediate link 26 is provided concentrically integrally with the gear 25. The link 26 engages a door link arm 27. The gear 24, the gear 25, the link 26 and the arm 27 are pivotally supported on the frame 104. In conjunction with the opening operation of the door 31 from the closed position A to the opened position B, the gear 23 is rotated in the counterclockwise direction shown by arrow, the gear 24 is rotated in the clockwise direction shown by arrow, the gear 25 and the link 26 are rotated in the counterclockwise direction shown by arrow, and the lever 27 is rotated in the clockwise direction shown by arrow. The arm 27 has a shape to press the protrusion 81 of the rod 80, and the rod 80 is slid downward shown by arrow K by an amount according to the rotation angle of the arm 27. In reverse, the rod 80 is slid upward in conjunction with the closing operation of the door 31.

Figure 11:
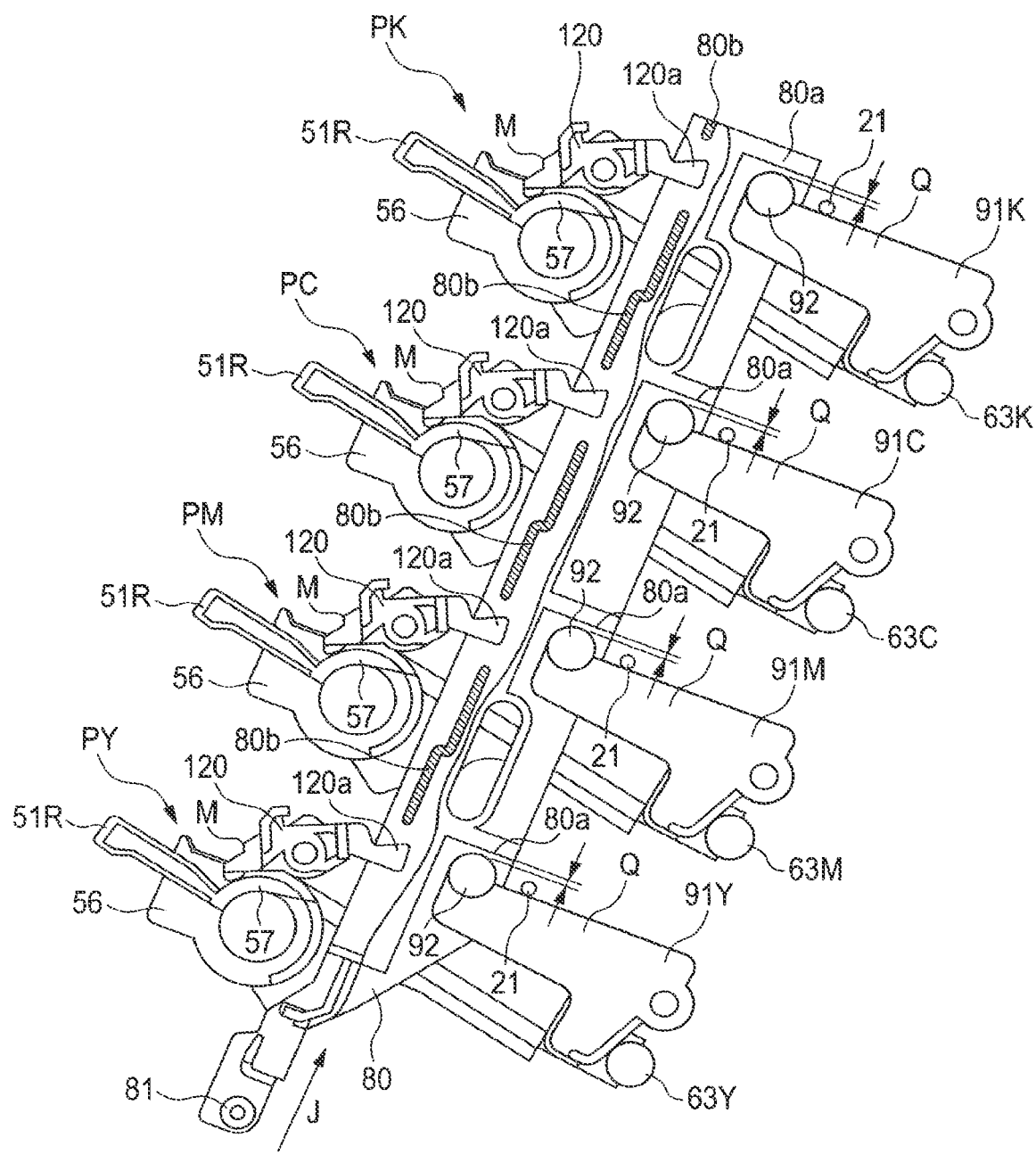
FIG. 11 illustrates a state of the rod and each lever when the door is closed.

The operation of releasing pressing of the cartridge P and the operation of retraction of the unit 6 in conjunction with the opening operation of the door 31 by the user and operation timings thereof will be described. The door 31 is closed in a printable state of the apparatus 100 (FIGS. 1A and 1B). In this state, as shown in FIG. 11, a protrusion 92 of the lever 91 is away from the pressure release abutment portion 80a, and the abutment portion 80b is away from the protrusion 120a of the lever 120. In this state, the cartridge P is pressed by the lever 120 and positioned and held in the image forming position C. The unit 6 is pressed against the cartridge P positioned in the image forming position C by the biasing force of the spring 73 and positioned in the exposure position D.

Figure 12A:
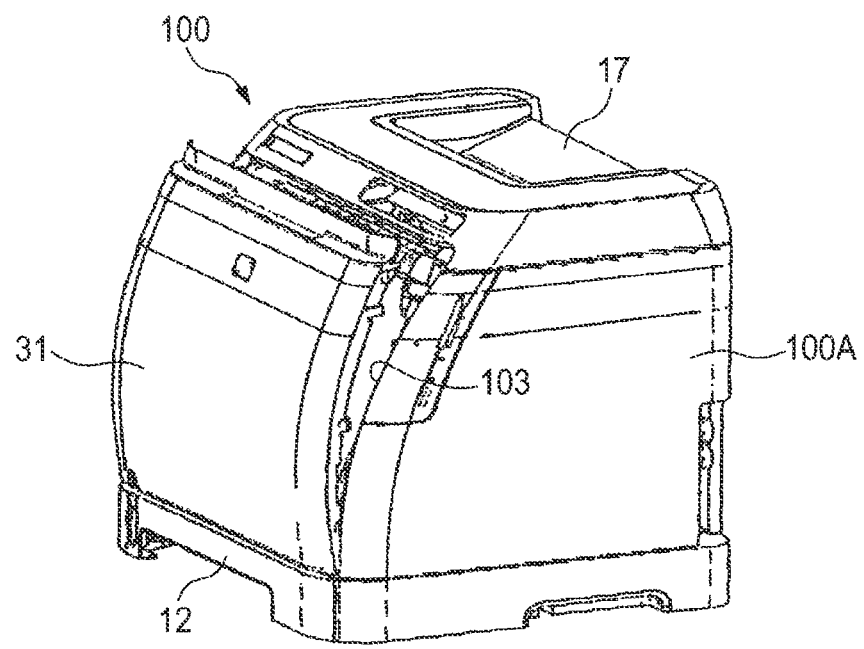
FIG. 12A is a perspective view of the apparatus in a half-open state with the door being slightly opened.
Figure 12B:
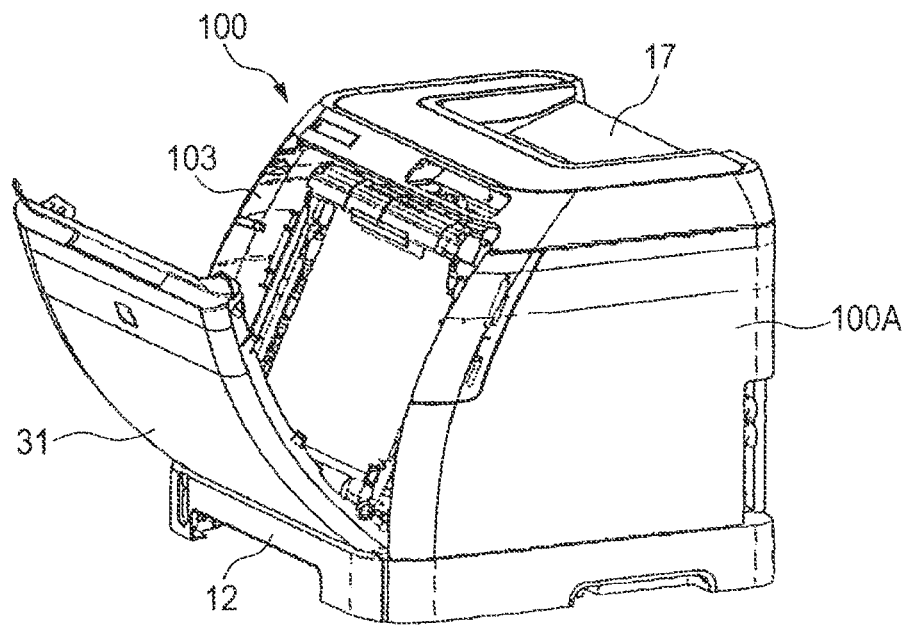
FIG. 12B is a perspective view of the apparatus in a half-open state with the door being further opened.
Figure 13:
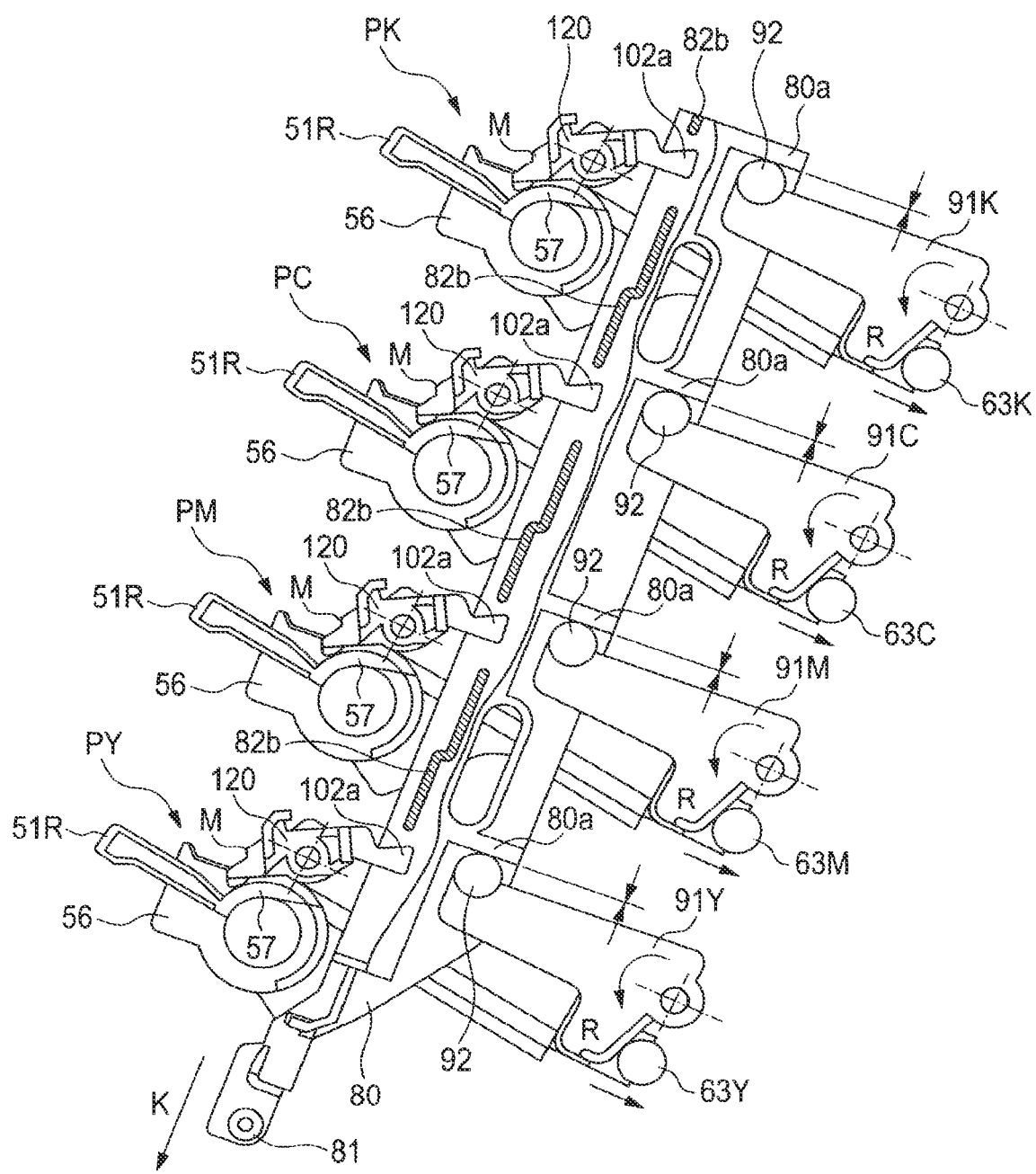
FIG. 13 illustrates a state of the rod and each lever when the door is slightly opened.
Figure 14:
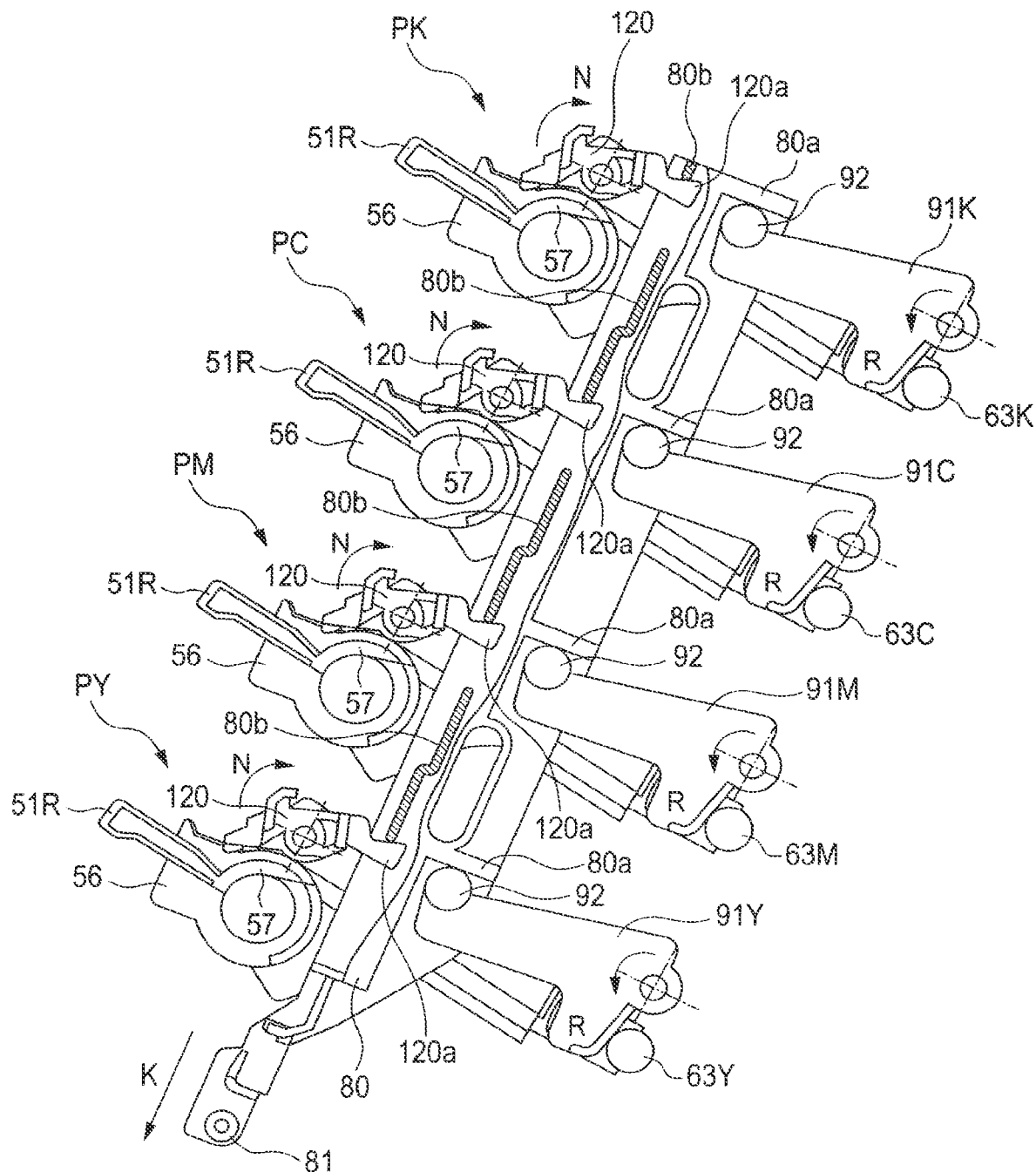
FIG. 14 illustrates a state of the rod and each lever when the door is further opened.
Figure 15:
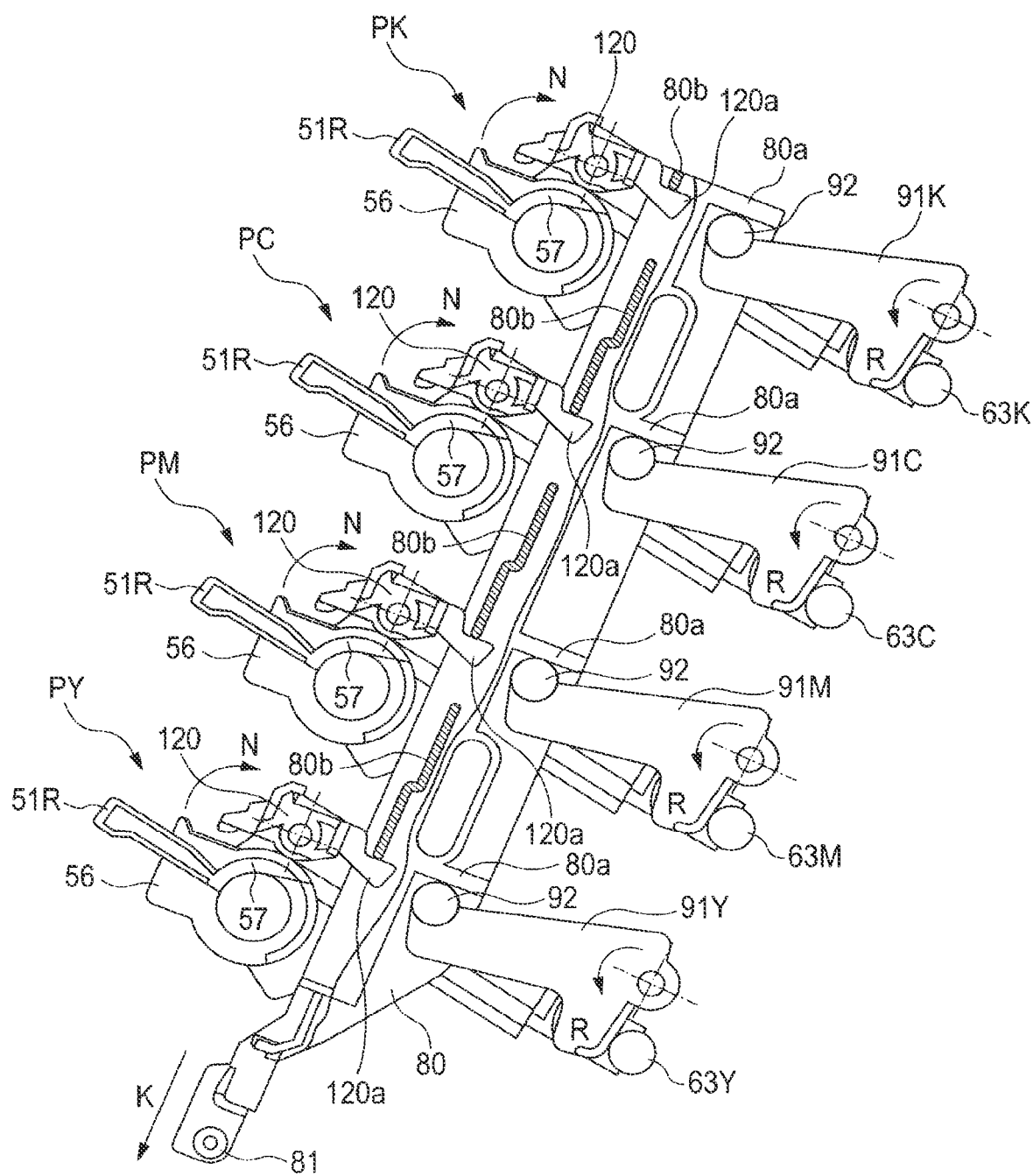
FIG. 15 illustrates a state of the rod and each lever when the door is opened to an open position.

When the user opens the door 31 for cartridge replacement or jam treatment, a latch (not shown) of the door 31 engaging a member (not shown) provided on the body 100A is released, and the door 31 can be turned to the opened position B. FIG. 12A illustrates a half-open state with the door 31 slightly opened, and FIG. 12B illustrates a half-open state with the door 31 further opened. When the door 31 is pivoted from the state in FIG. 12A, as described above, the rod 80 is slid downward shown by arrow K. When the door 31 is pivoted by a certain angle, as shown in FIG. 13, the abutment portion 80a of the rod 80 abuts against and presses the protrusion 92 of the lever 91, and the retraction operation of the unit 6 is completed. The unit 6 is held by the toggle mechanism 93 with pressing being released by the spring urging direction being changed from that in FIG. 9A to that in FIG. 9B. At this time, the lever 120 has not yet been pivoted as shown in FIG. 13. Specifically, the lever 120 is positioned in the positioning position M where the cartridge P is positioned in the image forming position C. Further, when the rod 80 is slid downward, as shown in FIG. 14, the abutment portion 80b abuts against and presses the protrusion 120a to release pressing of the cartridge P. When the rod 80 is further slid downward, as shown in FIG. 15, the lever 120 is retracted from a cartridge removal path. The lever 120 is held by the toggle mechanism 121 with pressing being released by the spring urging direction being changed from that in FIG. 9A to that in FIG. 9B. Specifically, the lever 120 is moved from the positioning position M to the retracted position N. The door 31 including the unit 7 is moved to the opened position B to widely open the opening portion 103, and each cartridge P is exposed from the opening portion 103 and can be removed to the outside of the body 100A.

An operation will be described when the door 31 including the unit 7 is closed after the cartridge replacement or the jam treatment is finished. With the door 31 being opened, the protrusion 92 of the lever 91 abuts against the abutment portion 80a of the rod 80, and the abutment portion 80b of the rod 80 abuts against the protrusion 120a of the lever 120 (FIG. 15). In this state, pressing of both the cartridge P and the unit 6 is released (positioning release). When the door 31 is closed, the rod 80 is slid upward shown by arrow J (FIG. 8) in conjunction with the closing operation as described above. When the door 31 is pivoted by a certain angle, the abutment portion 80b of the rod 80 is moved away from the protrusion 120a of the lever 120 from FIG. 14 to FIG. 13 and the cartridge pressing operation is completed. Specifically, the lever 120 is moved from the retracted position N to the positioning position M. At this time, the lever 91 has not yet been pivoted. Specifically, the lever 91 is positioned in the retracted position R. When the door 31 is closed and the rod 80 is further slid upward, the abutment portion 80a is moved away from the protrusion 92, and the unit 6 abuts against the cartridge cover 56. Specifically, the cartridge P is positioned in the image forming position C, and the unit 6 is pressed against the drum cover 57 of the cartridge P and positioned in the exposure position D. Then, the apparatus 100 enters a printable state with the door 31 being sufficiently closed.

In the above, the rod 80 is the interlocking member that moves the lever 120 from the retracted position N to the positioning position M in conjunction with the operation of the door 31 (operation member, exterior member) to mount the cartridge P to the body 100A. The rod 80 is also the interlocking member that then moves the lever 91 from the retracted position R to the positioning position Q so that the unit 6 is positioned from the retracted position E to the exposure position D. The rod 80 is the interlocking member that retracts the lever 91 from the positioning position Q to the retracted position R so that the unit 6 is retracted from the exposure position D to the retracted position E in conjunction with the operation of the door 31 to remove the cartridge P from the body 100A. The rod 80 is the interlocking member that then retracts the lever 120 from the positioning position M to the retracted position E.

In the configuration of this embodiment, when the door 31 is opened, a reaction force is applied from the lever 91 and the lever 120 of the toggle mechanism via the rod 80 to the door 31 in the retraction operation of the unit 6 from the exposure position D to the retracted position E and the positioning release operation of the cartridge P from the image forming position C. From the property of the toggle mechanism, the reaction force reaches a peak immediately before an urging direction of a spring (lever spring 93, pressing lever spring 121) of the toggle mechanism changes.

In this embodiment, when the door 31 is opened, the retraction operation of the unit 6 from the exposure position D to the retracted position E is first performed. Then, the pressing release operation of the cartridge P, that is, the positioning release operation of the cartridge P from the image forming position C is performed. When the door 31 is closed, the pressing operation of the cartridge P, that is, the positioning operation of the cartridge P in the image forming position C is performed. Then, the pressing operation of the unit 6 from the retracted position E to the exposure position D is performed. Thus, the pressing state and the pressing release state are switched using the toggle mechanism to change the pressing timings. This requires a smaller opening/closing force of the door 31 as compared to the case of simultaneous pressing. Specifically, the pressing timings are changed, and thus reactions force applied from the lever 91 and the lever 120 of the toggle mechanism via the rod 80 to the door 31 reach the peak at different timings. This reduces a maximum value of an operation force required for opening/closing the door 31 as compared to a case of simultaneously reaching the peak, thereby improving usability.

Figure 18:
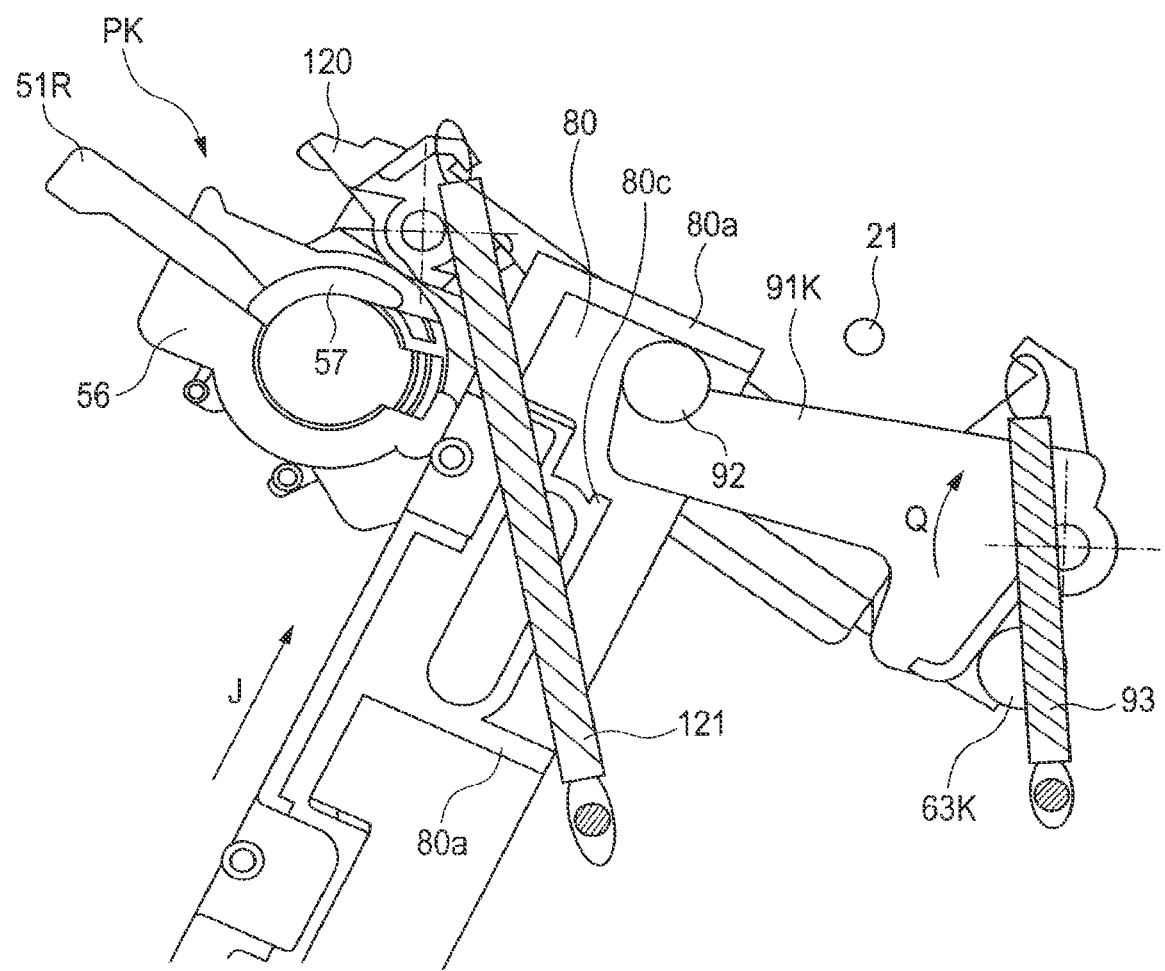
FIG. 18 illustrates a toggle mechanism and an operation thereof.

As shown in FIG. 6A, in this embodiment, when the door 31 is closed, the lever 91 is moved in the Q direction by the elastic force of the spring 20 and moved from the retracted position R to the positioning position Q. However, the lever 91 may be moved in the Q direction and moved from the retracted position R to the positioning position Q and held in the positioning position Q using the lever spring 93 (FIGS. 9A and 9B) as the toggle mechanism rather than the elastic force of the spring 20. In this case, as shown in FIG. 18, the rod 80 includes the abutment portion 80c that abuts against and presses the lever 91 in the J direction when the rod 80 is moved in the J direction. Then, the abutment portion 80c of the rod 80 may pivot the lever 91 in the Q direction from the state where the lever 91 is urged in the R direction by the lever spring 93 to the state where the lever 91 is urged in the Q direction by the lever spring 93.

In this configuration, when the door 31 is closed, the rod 80 is moved in the J direction and abuts against and presses the lever 120, and performs the positioning operation of the cartridge P in the image forming position C. Then, the abutment portion 80c of the rod 80 abuts against and presses the lever 91, and performs the pressing operation of the unit 6 from the retracted position E to the exposure position D.

When the door 31 is closed, as when the door 31 is opened, the reaction force is applied from the lever 91 and the lever 120 of the toggle mechanism via the rod 80 to the door 31, and the reaction force reaches the peak immediately before change of the urging direction of the spring (lever spring 93, press lever spring 121) of the toggle mechanism.

In contrast to this, in order to change the pressing timings of the lever 120 and the lever 91, the reactions force applied from the lever 91 and the lever 120 of the toggle mechanism via the rod 80 to the door 31 reaches the peak at different timings. This reduces a maximum value of an operation force required for opening/closing the door 31 as compared to the case of simultaneously reaching the peak, thereby improving usability.

Embodiment 2

Figure 16A:
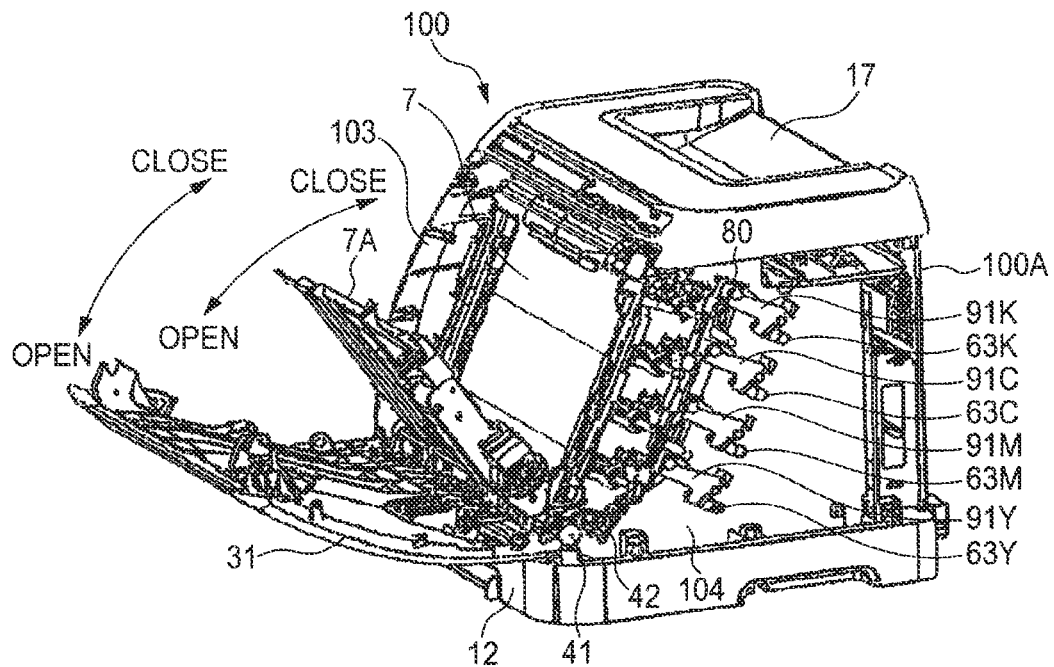
FIGS. 16A and 16B illustrate a configuration of the electrophotographic image forming apparatus.
Figure 16B:
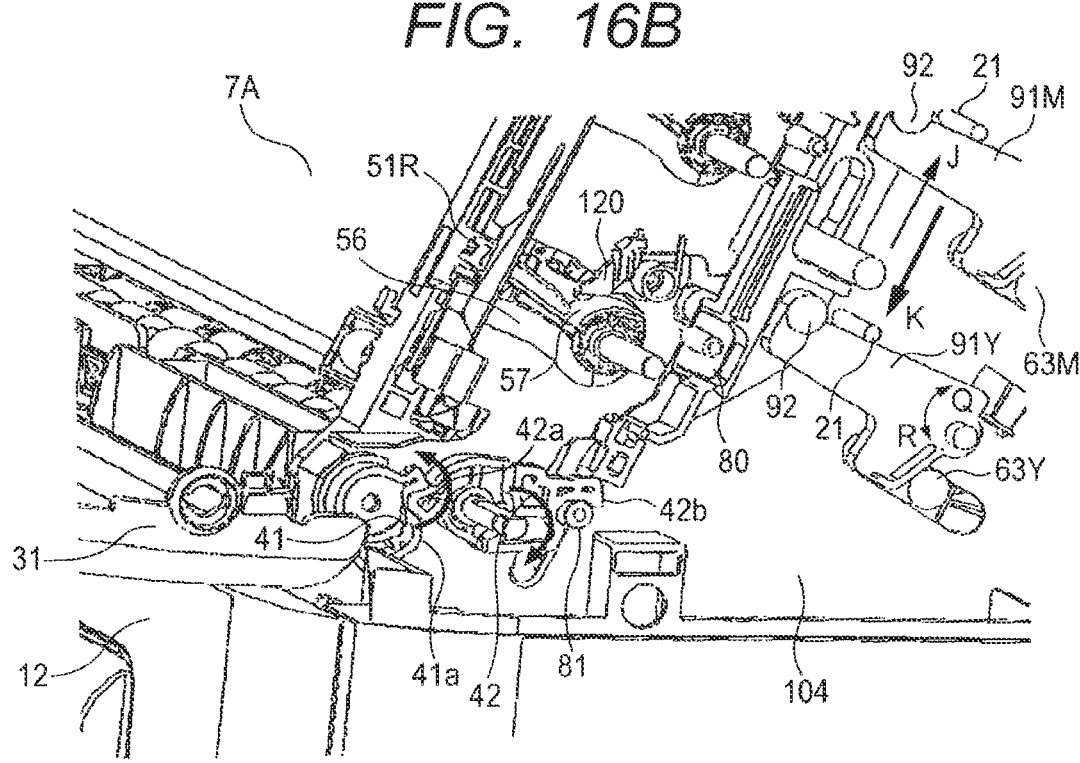

FIGS. 16A and 16B illustrate an image forming apparatus 100 of this embodiment. The apparatus 100 of this embodiment includes an inner cover 7A (double-sided unit) that also serves to perform double sided conveyance between a door 31 and a transfer unit 7 in the apparatus 100 of Embodiment 1 to enable execution of double-sided printing. The door 31, the inner cover 7A and the transfer unit 7 are individually pivotable around a lower hinge shaft portion (not shown) so as to be opened/closed with respect to a body 100A. A link lever 41 for transmitting pivot of the unit 7A to the rod 80 is placed on a rotation center of the unit 7A. The lever 41 is pivoted in a counterclockwise direction shown by arrow by opening pivot of the unit 7A. The lever 41 includes a protrusion 41a, and the protrusion 41a presses a protrusion 42a of an intermediate link 42 to pivot the link 42 in a clockwise direction shown by arrow, and a rod pressing portion 42b of the link 42 presses a rod protrusion 81. Thus, the rod 80 is slid downward shown by arrow K. By the closing pivot of the unit 7A, the lever 41, the link 42 and the rod 80 perform operations opposite to those in the opening pivot of the unit 7A. In this embodiment, the door 31, the inner cover 7A and the transfer unit 7 are operation members operated when the user mounts a cartridge to the body 100A. In this embodiment, by vertical sliding of the rod 80 with the opening/closing operation of the inner cover 7A in conjunction with the operation of the inner cover 7A, cartridge pressing and pressing release, LED unit pressing and retraction operation are performed as in Embodiment 1. In removal of the cartridge P, the door 31 is pivoted to be opened, and then the inner cover 7A is pivoted to be opened. By downward sliding of the rod 80 that interlocks with the inner cover 7A with the opening pivot, the retraction operation of the unit 6 and the pressing release of the cartridge P are performed. Then, the unit 7 is pivoted to be opened to remove the cartridge P from the opening portion 103. When the cartridge P is replaced by a new one, the unit 7 is pivoted to be closed, and then the inner cover 7A is pivoted to be closed. By upward sliding of the rod 80 that interlocks with the inner cover 7A with the closing/opening pivot, the pressing operation of the cartridge P and the pressing operation of the unit 6 are performed. The door 31 is finally closed.

In this embodiment, when the inner cover 7A is opened, the retraction operation (movement from an exposure position D to a retracted position E) of the unit 6 is first performed, and then the pressing release operation (positioning releasing from an image forming position C) of the cartridge P is performed. When the inner cover 7A is closed, the pressing operation (positioning in the image forming position C) of the cartridge P is first performed, and then the pressing operation (movement from the retracted position E to the exposure position D) of the unit 6 is performed. The pressing state and the pressing release state are switched by a toggle mechanism as in Embodiment 1, and pressing timings are changed (made different). This requires a smaller opening/closing force of the inner cover 7A as an operation member as compared to a case of simultaneous pressing.

Other Matters

The image forming apparatuses of Embodiments 1 and 2 are examples of an in-line color printer, but the same advantage can be obtained for a configuration of a black-and-white printer.

As a light emitting element of the light emitting member 6, for example, a field light emitting element such as a liquid crystal element, a semiconductor light emitting diode or an organic electroluminescence element (organic EL element) is used. The semiconductor light emitting diode is a semiconductor device that emits light in application of a voltage. The organic EL element is an electronic material made of an organic compound that shines in application of a voltage, and emits light by itself. For example, in the organic EL element, an organic molecule light emitting layer is interposed between two electrodes to apply a voltage. Thus, an electron injected from the electrodes and a hole are recombined to excite an organic molecule, and light is emitted when the excited organic molecule returns to a base state.

In the present invention, the operation members operated by the user when the cartridge P is mounted to the main body 100A are not limited to the front door 31 in Embodiment 1 and the double-sided unit 7A in Embodiment 2. For example, the operation member such as a lever may be used.

In Embodiments 1 and 2, the cartridge P is positioned in the image forming position C by pressing, but may be positioned by pulling the cartridge P. In Embodiments 1 and 2, the unit 6 as the light emitting member is positioned in the exposure position D by pressing the support 61, but may be positioned by pulling the support 61.

In Embodiments 1 and 2, the unit 6 is positioned in the exposure position D by the support 61 abutting against the drum cover 56. However, a positioning portion may be formed on the frame 104, and the unit 6 may be positioned in the exposure position D by the support 61 abutting against the positioning portion of the frame 104 like the cartridge P.

In such a positioning configuration, when the door 31 or the inner cover A is opened, the pressing release operation of the cartridge P, that is, the positioning release operation of the cartridge P from the image forming position C is first performed. Then, the retraction operation of the unit 6 from the exposure position D to the retracted position E is performed. Such a configuration may be allowed.

When the door 31 or the inner cover A is closed, the pressing operation of the unit 6 from the retracted position E to the exposure position D is first performed. Then, the pressing operation of the cartridge P, that is, the positioning operation of the cartridge P in the image forming position C is performed. Such a configuration may be allowed.

With such a configuration, as in the above-described embodiments, pressing timings of the cartridge P and the unit 6 are changed (made different), and thus reaction forces applied from the lever 91 and the lever 121 to the door 31 or the inner cover 7A reach the peak at different timings. This requires a smaller opening/closing force as compared to the case of simultaneous pressing.

In Embodiments 1 and 2, when the door 31 or the inner cover A is opened and closed, the pressing timings of the cartridge P and the unit 6 are changed (made different). However, the pressing timings of the cartridge P and the unit 6 may be changed (made different) either when the door 31 or the inner cover A is opened or when closed. This also requires a smaller opening/closing force of the door 31 as compared to the case of simultaneous pressing when the door 31 or the inner cover A is opened or closed.

The above descriptions are on Embodiments 1 and 2, and Embodiments 3, 4 and 5 will be now described.

For an image forming apparatus 200 described in Embodiments 3, 4 and 5, a method for mounting and removing a cartridge P is different from that for the image forming apparatus 100 of Embodiments 1 and 2. In Embodiments 3, 4 and 5, timings of cartridge pressing and exposure unit pressing are shifted to reduce a force required for pressing in the image forming apparatus 200.

Embodiment 3

<General Configuration of Image Forming Apparatus 200>

Figure 19:
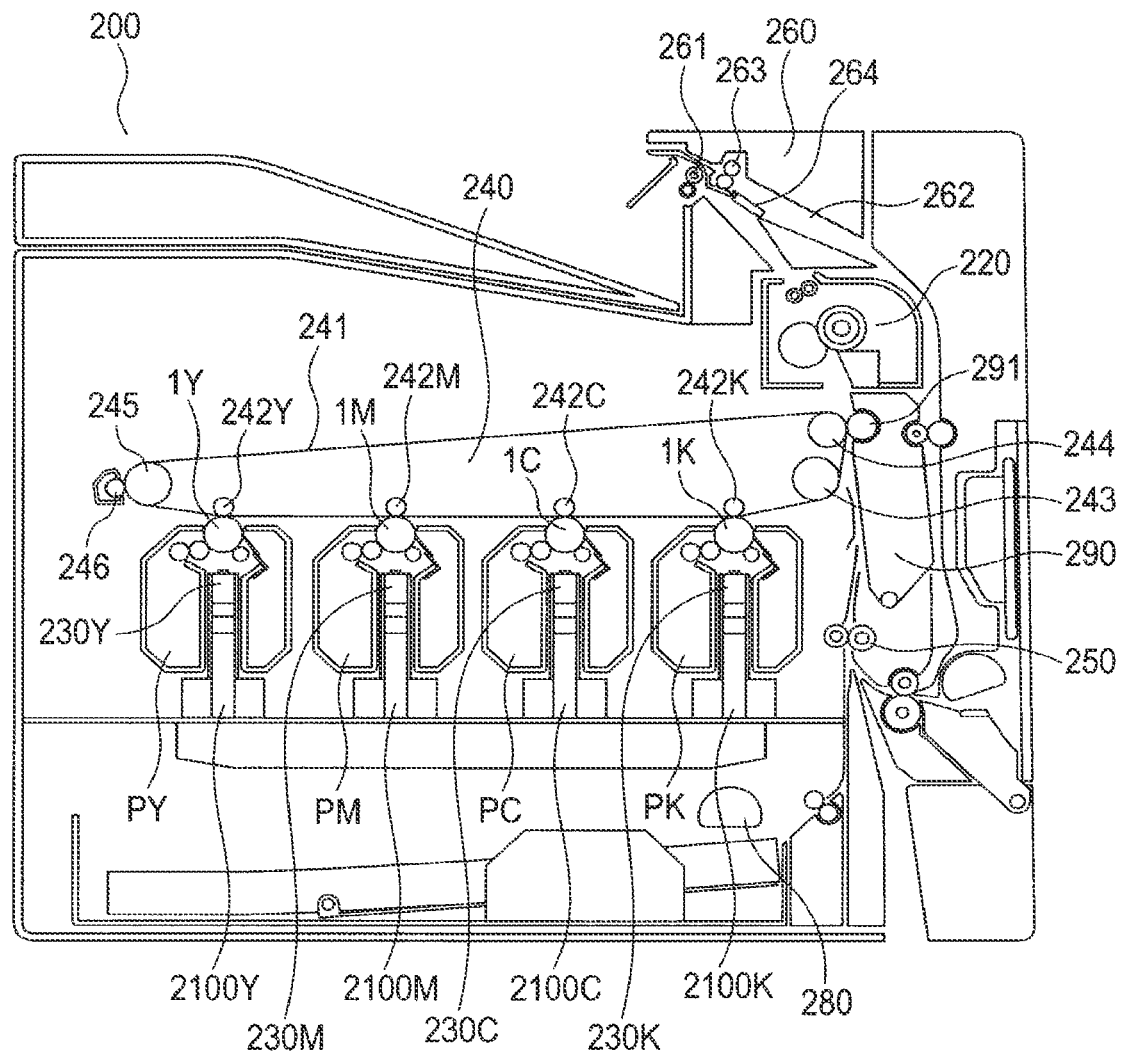
FIG. 19 is a schematic sectional view of a general configuration of the image forming apparatus.

A general configuration of the image forming apparatus 200 will be described. The image forming apparatus 200 of this embodiment is an electrophotographic color image forming apparatus. FIG. 19 is a schematic sectional view illustrating a general configuration of the image forming apparatus 200.

In the image forming apparatus 200, a feed unit 280 is placed at the bottom. The feed unit 280 contains sheets as recording materials. A registration roller unit 250 that registers and conveys the sheets is placed in an upper right of the feed unit 280. Four cartridges P (PY, PM, PC and PK) are placed above the feed unit 280. An LED unit 230 described later is placed between the cartridges P, and exposes a photosensitive drum 11. Above the cartridges P, an intermediate transfer unit 240 is placed to face the cartridges P. The intermediate transfer unit 240 includes an intermediate transfer belt 241. Inside the intermediate transfer belt 241, a primary transfer roller 242 (242Y, 242M, 242C and 242K), an intermediate transfer belt driving roller 243, a secondary transfer facing roller 244, a tension roller 245 and an intermediate transfer belt cleaning unit 246 are provided. A secondary transfer unit 290 is placed on a right side of the intermediate transfer unit 240, and a secondary transfer roller 291 is provided to face the secondary transfer facing roller 244. A fixing unit 220 is placed above the intermediate transfer unit 240 and the secondary transfer roller 291. A paper discharge unit 260 is placed in an upper left of the fixing unit 220. The paper discharge unit 260 includes a pair of paper discharge rollers 261 and a double-sided conveyor portion 262, a pair of reverse rollers 263 and a double-sided flapper 264 as a branch unit.

<Configuration of Cartridge>

Next, a configuration of a cartridge that includes members for image forming, can be mounted to and removed from the image forming apparatus 200, and performs image forming while being mounted to the image forming apparatus 200 will be described. The cartridges P (PY, PM, PC and PK) are process cartridges each including a photosensitive drum 1 (1Y, 1M, 1C and 1K) and a process unit that acts on the photosensitive drum. Four cartridges P (PY, PM, PC and PK)

can be mounted to and removed from the main body 200. The four cartridges P are different in forming toner images of different colors, and respectively contain toner of yellow (Y), magenta (M), cyan (C) and black (K). Since the four cartridges P have the same structure other than the above, one cartridge P will be described below as a representative. Members or the like included in the cartridge P will be also described as representatives.

Figure 20:
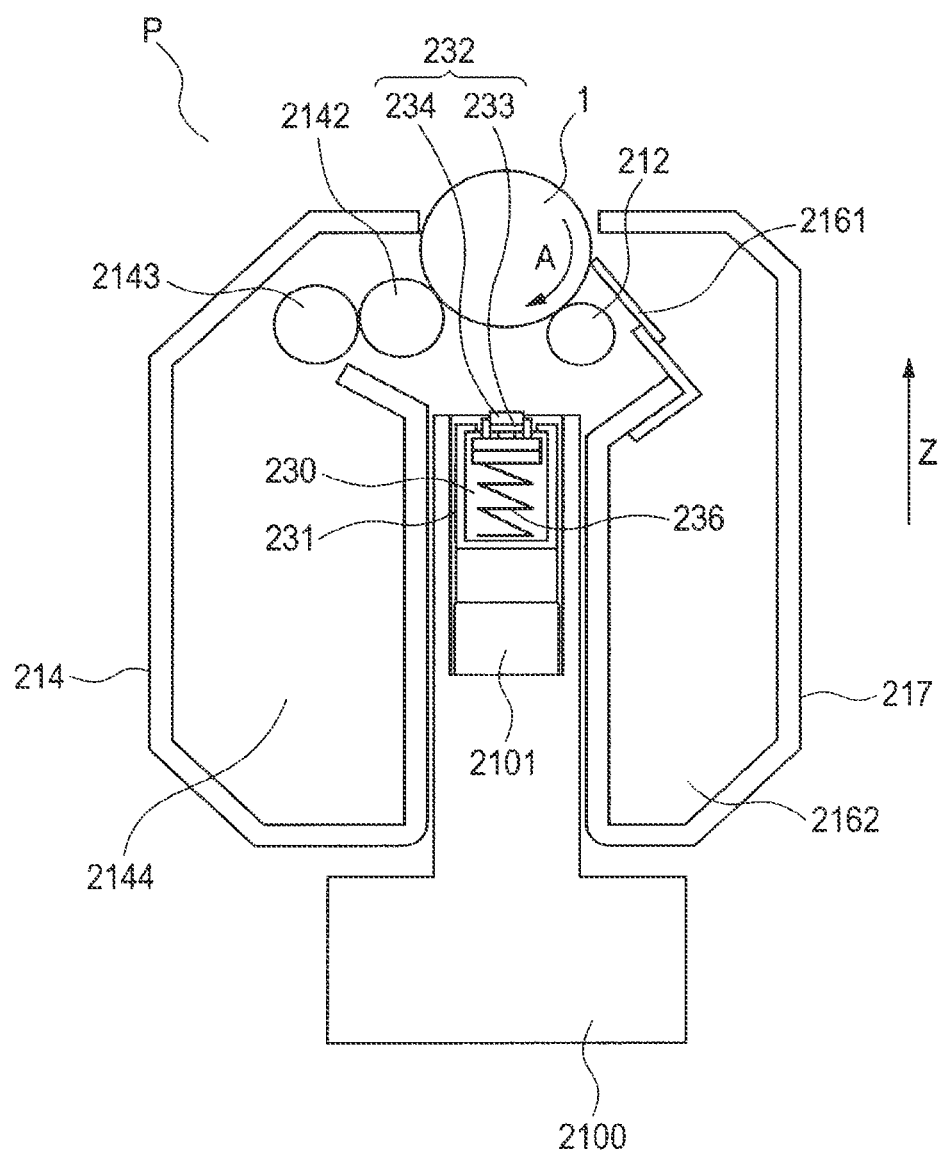
FIG. 20 is a schematic sectional view of the cartridge and therearound in the image forming apparatus.

FIG. 20 is a schematic sectional view of the cartridge P and therearound in the image forming apparatus 200. In the cartridge P, a cleaner unit 217 and a developing unit 214 are integrally configured.

The cleaner unit 217 includes a photosensitive drum 1, a charging roller 212, a cleaning blade 2161 and a waste toner container 2162. The photosensitive drum 1 is formed by applying an organic photoconductor layer (OPC) to an outer peripheral surface of an aluminum cylinder. The photosensitive drum 1 is rotatably supported by flanges at opposite ends in an axial direction, and is rotated by a drive force applied by a drive motor (not shown) in the main body 200.

A charging roller 212 is a conductive roller, and is abutted against the surface of the photosensitive drum 1. In abutment, a charging bias voltage is applied to uniformly charge the surface of the photosensitive drum 1. Transfer residual toner remaining on the surface of the photosensitive drum 1 after primary transfer is removed by a cleaning blade 2161. The removed toner is collected in the waste toner container 2162.

The developing unit 214 includes a developing roller 2142, a toner supply/recovery roller 2143 and a toner containing portion 2144. The developing roller 2142 that applies toner to an electrostatic latent image and develops the image as a toner image is placed adjacent to the photosensitive drum 1, rotated by the drive force of the drive motor (not shown) in the main body 200, and applies a development bias voltage to perform development of the photosensitive drum 1. The toner supplying/collecting roller 2143 supplies toner from the toner containing portion 2144 to the developing roller 2142, and collects toner that has not been used for development of the photosensitive drum 1.

<Configuration of LED Unit 230>

A configuration of an LED unit 230 (230Y, 230M, 230C and 230K) will be described.

The LED unit 230 is placed between the developing unit 214 and the cleaner unit 217 of each of the four cartridges P mounted to the main body 200, exposes the photosensitive drum 1 based on image information, and forms an electrostatic latent image on the photosensitive drum 1. Since the four LED units 230 (230Y, 230M, 230C and 230K) have the same structure, one LED unit 230 will be described as a representative. Members or the like included in the LED unit 230 will be also described as representatives.

The LED unit 230 includes an LED frame 231, an LED head 232 as an exposure member, a cartridge pressing member 235 (see FIG. 23) and a pressing spring 236.

The LED head 232 include an LED array 233 in which a plurality of LED light emitting elements are arranged in an array in a main scanning direction according to a predetermined pixel pitch, and a lens array 234 through which light from each LED light emitting element of the LED array 233 passes, integrated into a unit. The LED array 233 emits light based on image data to be formed, applies light to the rotating photosensitive drum 1, and exposes the photosensitive drum 1. The LED frame 231 includes the LED head 232, a cartridge pressing member 235 and a pressing spring 236.

The LED head 232 and the cartridge pressing member 235 are integrally formed and urged to abut against the cartridge P in the image forming position and thus positioned in the exposure position. Thus, the LED head 232 and the cartridge pressing member 235 are urged upward by the pressing spring 236, and supported by the LED frame 231 so as to be freely movable by a predetermined amount in the vertical direction (Z direction) and the axial direction of the photosensitive drum 1 with respect to the LED frame 231.

The LED unit 230 can be retracted from the cartridge so as not to interfere with the movement of the cartridge P when the cartridge P is mounted to or removed from the main body 200. Specifically, the LED unit 230 is supported by a cartridge guide 2100 movably in the vertical direction (Z direction) via an LED unit push-up cam 2101 (see FIG. 23).

<Image Forming Operation>

A color image forming operation of the image forming apparatus 200 of this embodiment will be described. The image forming operation is performed in a state where the cartridge P is mounted to the apparatus and located in the image forming position. As described above, the photosensitive drum 1 is driven and rotated in an A direction (FIG. 20). In this state, the surface of the photosensitive drum 1 is uniformly charged by the charging roller 212, and exposed by the LED unit 230, and thus an electrostatic latent image is formed on the surface. The developing roller 2142 applies toner to the electrostatic latent image to form a toner image on the surface of the photosensitive drum 1. A transfer bias is applied to the toner image in a position where the surface of the photosensitive drum 1 faces the primary transfer roller 242, and the toner image is transferred from the surface of the photosensitive drum 1 onto the intermediate transfer belt 241.

The toner images are transferred in a superimposed manner to the intermediate transfer belt 241 in positions facing the photosensitive drums (1Y, 1M, 1C and 1K), and the toner image as superimposed images including four color toner images are formed on the intermediate transfer belt 241. The toner images are collectively transferred from the intermediate transfer belt 241 onto a sheet fed from the feed unit 280 at the same timing in a position facing the secondary transfer roller 244.

The sheet to which the toner image has been transferred is conveyed to the fixing unit 220, where the toner image is fixed on the sheet by heating and pressurizing, and the sheet is discharged to the outside of the apparatus by the paper discharge unit 260. The image is formed on the sheet by the above-described operation.

<Mounting of Cartridge P to Main Body>

Figure 21:
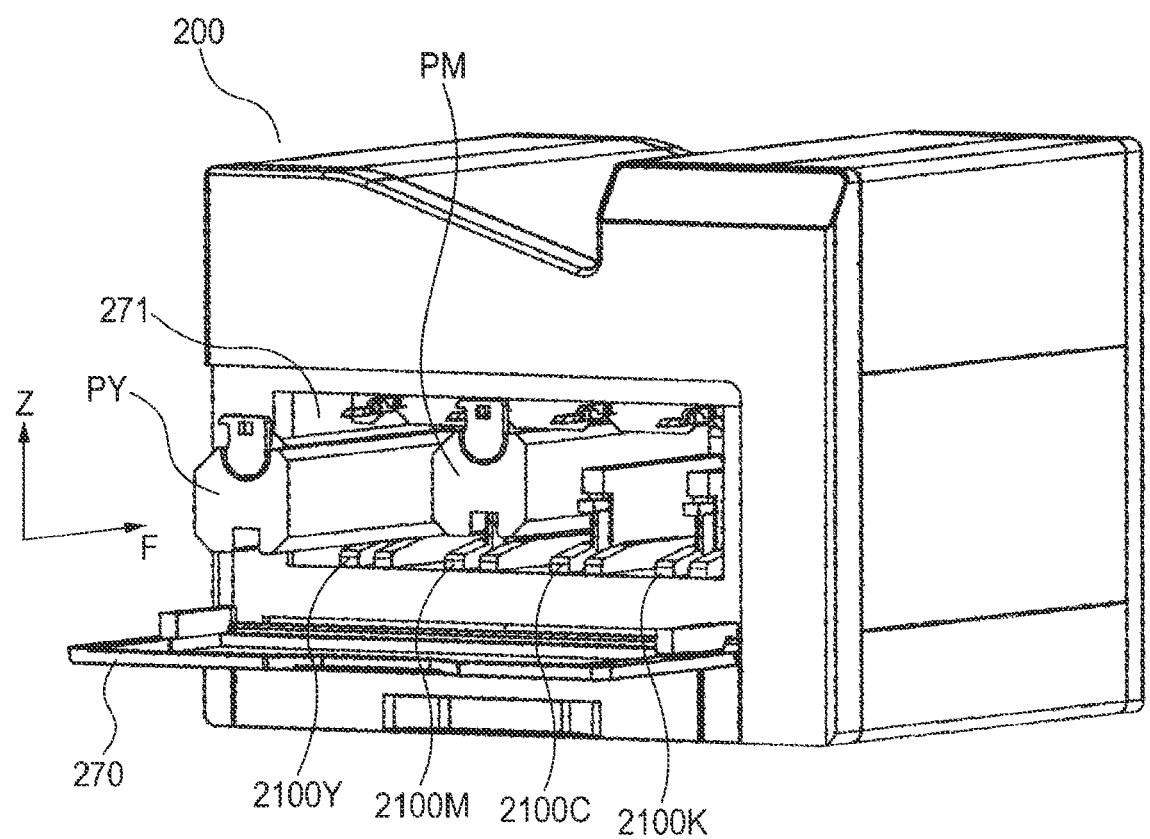
FIG. 21 is a perspective view of the image forming apparatus when the cartridge is mounted, seen obliquely from the front.

Mounting of the cartridge P to the image forming apparatus 200 will be described. FIG. 21 is a perspective view of the image forming apparatus 200 when the cartridge P is mounted, seen obliquely from the front. In this embodiment, the cartridge P is moved in the rotating axis direction of the photosensitive drum 1 and inserted into or drawn from the main body 200, and thus can be mounted to or removed from the main body 200. The configuration of mounting and removing the cartridge P is referred to as a so-called side-oriented configuration.

When the cartridge P is mounted to the image forming apparatus 200, the openable and closable member 270 is opened with respect to the main body 200 to expose the opening portion 271. Four cartridge guides 2100 (2100Y, 2100M, 2100C and 2100K) arranged in line in a direction perpendicular to the axis of the photosensitive drum 1 are exposed from the opening portion 271. The cartridge P is inserted in an F direction according to the cartridge guide 2100 so that the cartridge guide 2100 is interposed between the cleaner unit 217 and the developing unit 214, and thus can be mounted to the main body 200. FIG. 21 illustrates a state where the cartridge PM has been already mounted to the main body 200, and the cartridge PY is being inserted into the main body 200.

As described above, in the configuration in which the cartridge P is inserted into the main body 200 in the axial direction of the photosensitive drum 1, and thus mounted to and removed from the main body 200, the photosensitive drum 1 may rub against a member such as the intermediate transfer belt 241 close to the photosensitive drum 1 in the main body 200 and damage each other in mounting and removal of the cartridge P. Thus, the cartridge P is inserted in a state where the cartridge P is retracted in a predetermined distance from the intermediate transfer belt 241 or the like in the direction perpendicular to the axis of the photosensitive drum 1.

In this embodiment, the intermediate transfer belt 241 is placed above the photosensitive drum 1, and thus when the cartridge P is inserted, the cartridge P is first retracted below the intermediate transfer belt 241. Then, immediately before completion of the insertion of the cartridge P, the cartridge P is moved upward against the gravity, and reaches the image forming position where the photosensitive drum 1 is close to the intermediate transfer belt 241.

In the configuration in which the cartridge P is pushed upward against the gravity in insertion, and thus moved in the direction perpendicular to the axis of the photosensitive drum 1, a larger pressing force is required than for moving the cartridge P in other directions.

As described above, in this embodiment, the LED unit 230 is moved upward, and the LED head 232 is pressed toward the cartridge P to position the LED head 232 in the exposure position. Thus, if the timing of pushing the cartridge P upward is always the same as the timing of moving the LED unit 230 upward, reaction forces applied to the user in mounting the cartridge P simultaneously reach the peak, thereby increasing a load on the user.

Thus, in this embodiment, the timings of the reaction forces applied to the user in mounting the cartridge P are shifted.

A configuration for moving the cartridge P upward and positioning the cartridge P in the main body 200 will be described in detail.

Figure 22:
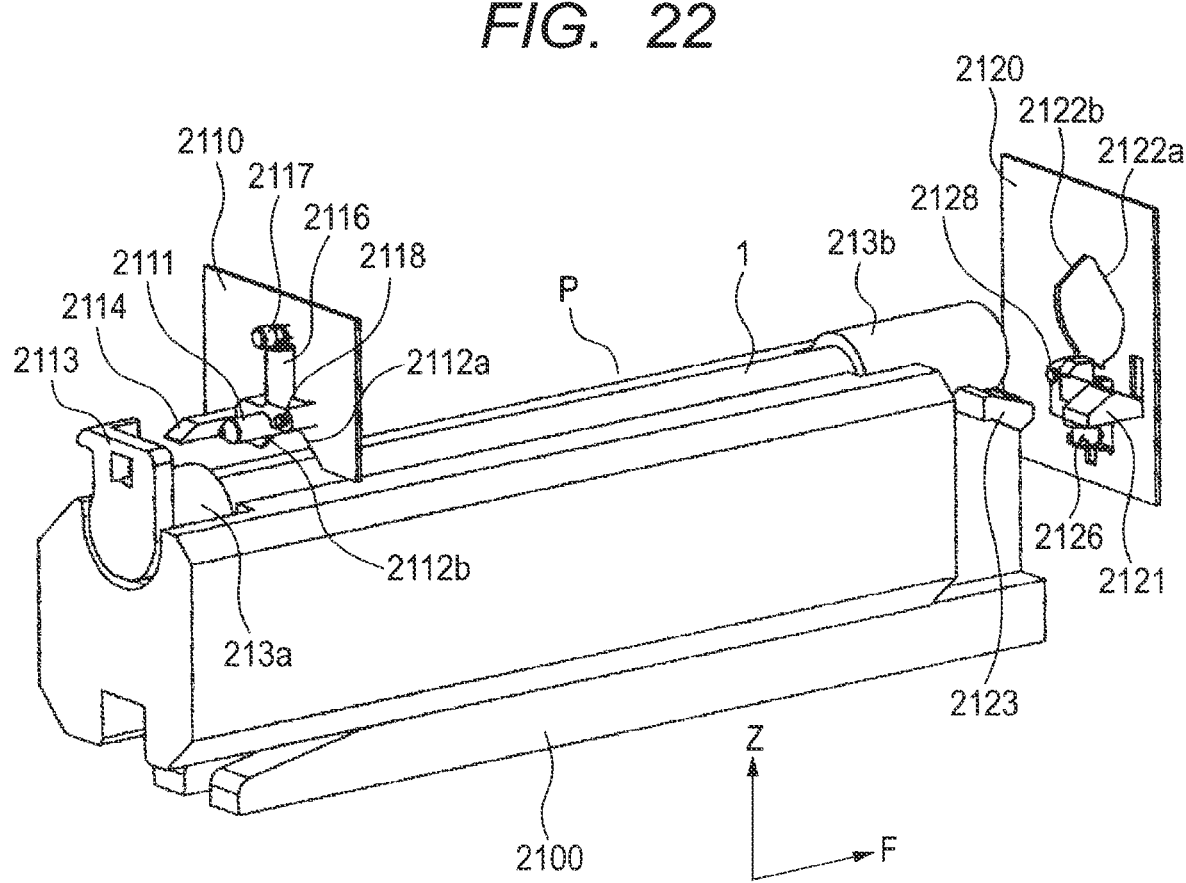
FIG. 22 is a schematic perspective view of the cartridge and therearound in the image forming apparatus.

FIG. 22 is a schematic perspective view of the cartridge P and therearound in the image forming apparatus 200. The cartridge P is shown being inserted. In the apparatus, the front plate 2110 and the rear plate 2120 are placed at opposite ends in the axial direction (F direction) of the photosensitive drum 1 with the cartridge P being mounted to the apparatus. At opposite ends in the axial direction of the photosensitive drum 1 of the cartridge P, positioned portions 213a and 213b are provided for positioning the photosensitive drum 1 in the main body 200.

The front plate 2110 includes a pull-up member 2111 as a first moving member that is pushed down by a pulled-up portion 2113 of the cartridge P and then pulls up the pulled-up portion 2113 immediately before completion of insertion of the cartridge P. The pull-up member 2111 is provided rotatably around a shaft 2118, and urged upward (Z direction) by a pull-up spring 2116 hung on a hanging portion 2117 on the front plate 2110. The front plate 2110 has abutment portions 2112a and 2112b.

The rear plate 2120 includes a push-up member 2121 as a first moving member that is pushed down by a pushed-up portion 2123 of the cartridge P and then pushes up the pushed-up portion 2123 immediately before completion of insertion of the cartridge P. The push-up member 2121 is provided rotatably around a shaft 2128, and urged upward (Z direction) by a push-up spring 2126. The rear plate 2120 has abutment portions 2122a and 2122b.

The cartridge P is moved upward by the pull-up member 2111 and the push-up member 2121 in insertion into the main body 200.

A configuration will be described of mounting the cartridge P to the main body 200 and positioning the cartridge P in the image forming position, and positioning the LED unit 230 and the LED head 232 on the cartridge P.

Figure 23:
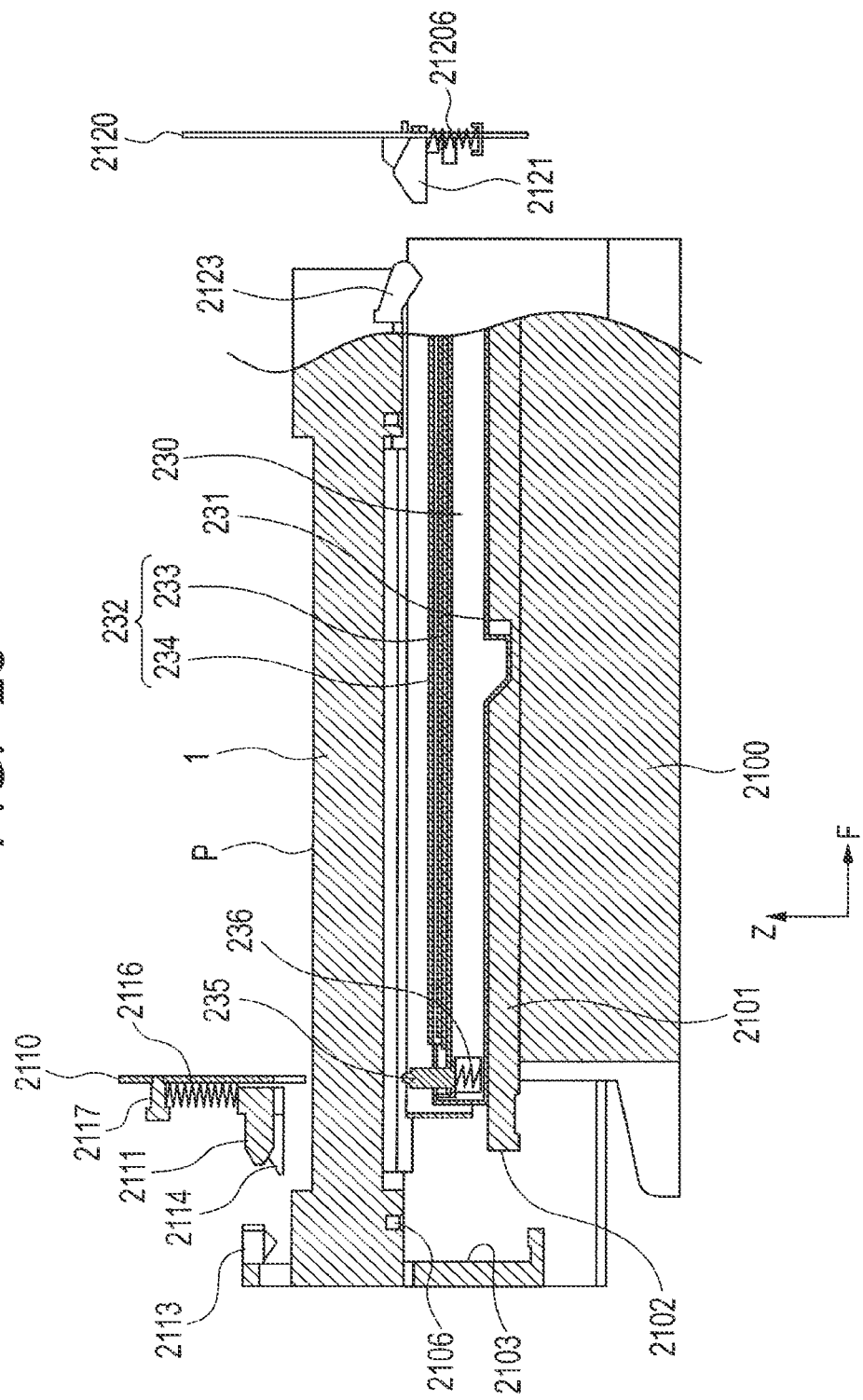
FIG. 23 is a partial sectional view of the image forming apparatus when the cartridge is mounted or removed.

FIG. 23 is a partial sectional view of the image forming apparatus 200 in mounting and removing the cartridge P. This section includes the axis of the photosensitive drum 1 and is parallel to the Z direction.

In this state, the LED unit 230 including the LED head 232 is located in a retracted position retracted downward with respect to the photosensitive drum 1 of the cartridge P.

Figure 24:
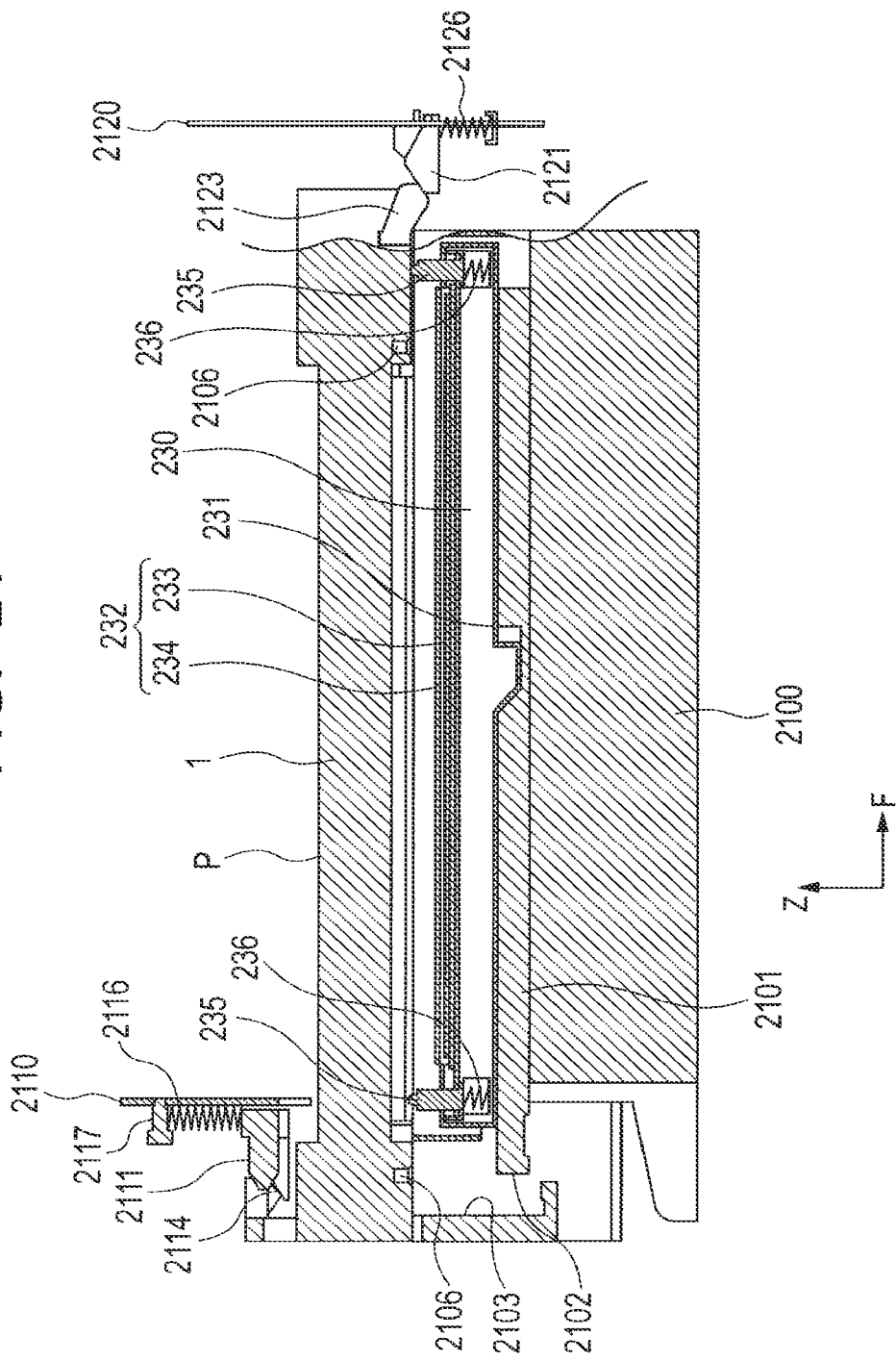
FIG. 24 is a partial sectional view of the image forming apparatus when the cartridge is mounted or removed.

In this state, the cartridge P is inserted into the main body 200 in the axial direction (F direction) of the photosensitive drum 1. As shown in FIG. 24, the pulled-up portion 2113 of the cartridge P first abuts against the pull-up member 2111 to rotate the pull-up member 2111 downward around the shaft 2118 (FIG. 22). At the same time, the pushed-up portion 2123 of the cartridge P abuts against the push-up member 2121 to rotate the push-up member 2121 downward around the shaft 2128 (FIG. 22).

Figure 25:
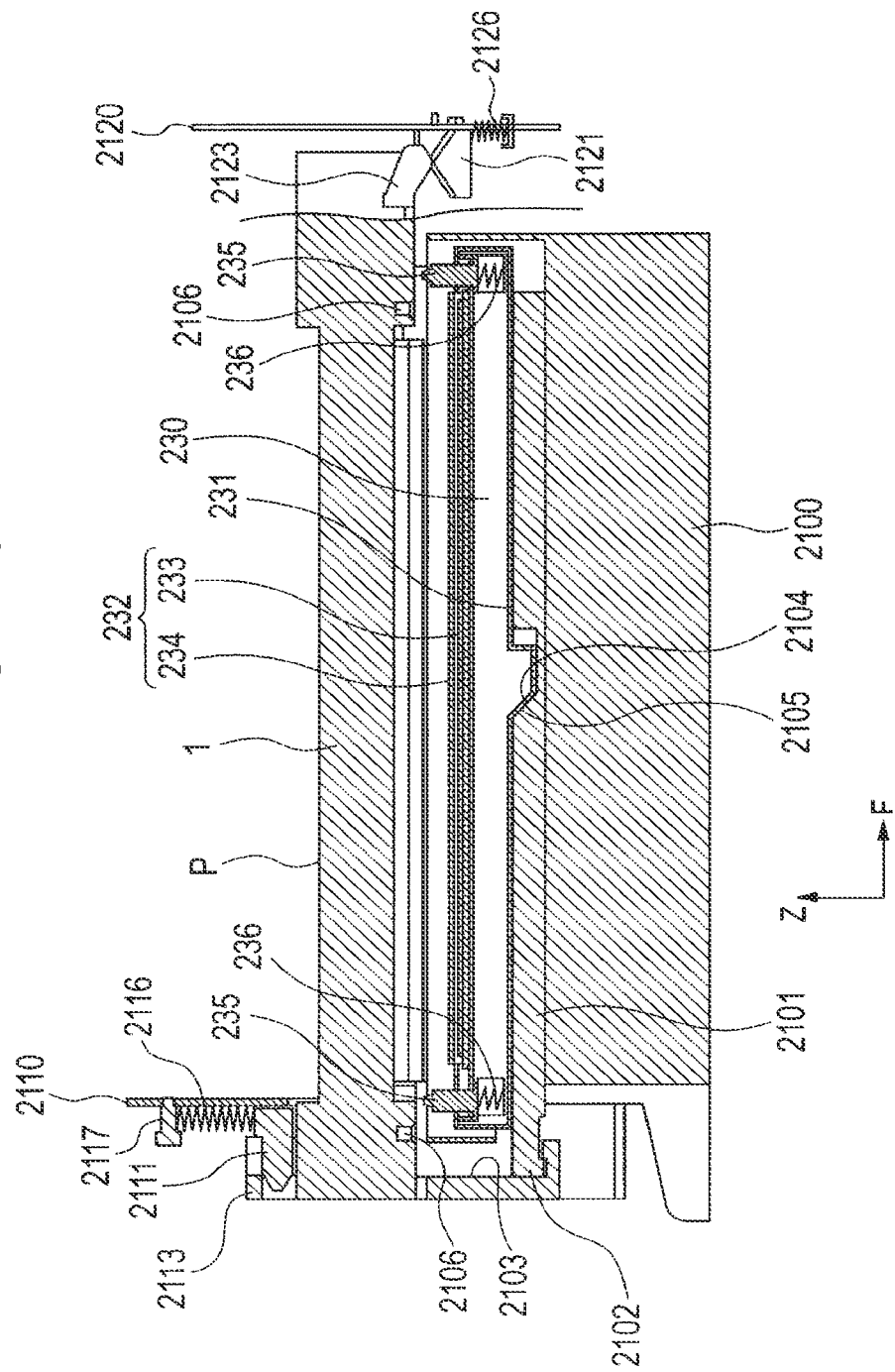
FIG. 25 is a partial sectional view of the image forming apparatus when the cartridge is mounted or removed.

When the cartridge P is further inserted in the F direction, as shown in FIG. 25, the pulled-up portion 2113 rides on a pull-up surface 2114 of the pull-up member 2111. At the same time, the pushed-up portion 2123 also rides on the push-up member 2121. As such, the cartridge P presses the pull-up member 2111 and the push-up member 2121, and rides thereon. Thus, biasing forces of the pull-up spring 2116 of the pull-up member 2111 and the push-up spring 2126 of the push-up member 2121 move the cartridge P upward by a predetermined amount.

Further, at this time, a cam abutment surface 2103 provided on the cartridge P abuts against a cartridge abutment surface 2102 provided in an LED unit push-up cam 2101 as a second moving member.

Figure 26:
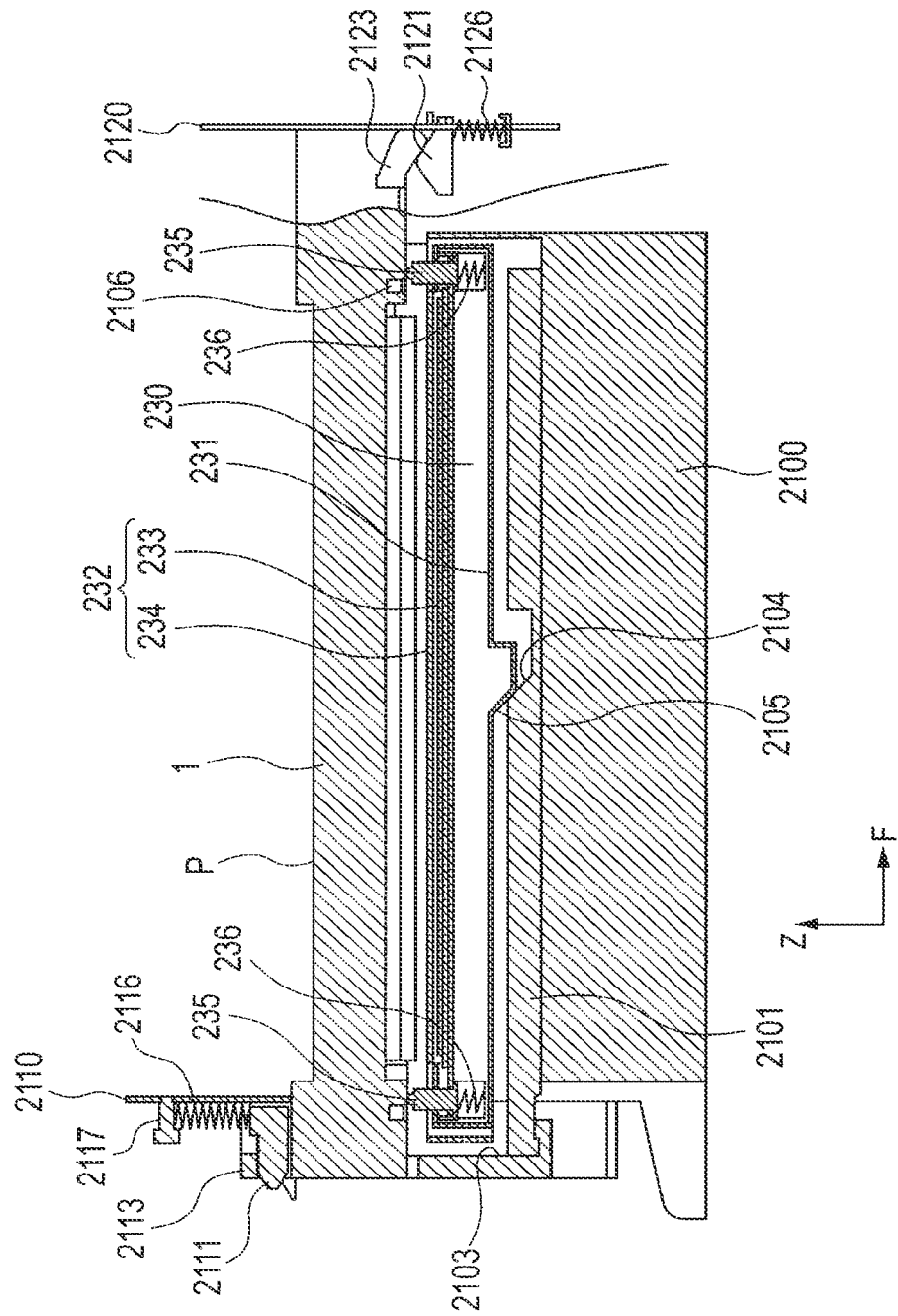
FIG. 26 is a partial sectional view of the image forming apparatus when the cartridge is mounted or removed.

When the cartridge P is further inserted in the F direction in this state, as shown in FIG. 26, the LED unit push-up cam 2101 is pressed by the cartridge P and moved in the F direction. The cam surface 2104 for pushing up the LED unit 230 of the LED unit push-up cam 2101 abuts against the cam surface 2105 of the LED unit 230, and the LED unit 230 is pushed up upward (Z direction) toward the photosensitive drum 1.

The LED unit 230 is pushed up, and thus the cartridge push-up member 235 urged upward by the pressing spring 236 of the LED unit 230 abuts against the cartridge P to press the cartridge P. This further moves the cartridge P upward.

Figure 27:
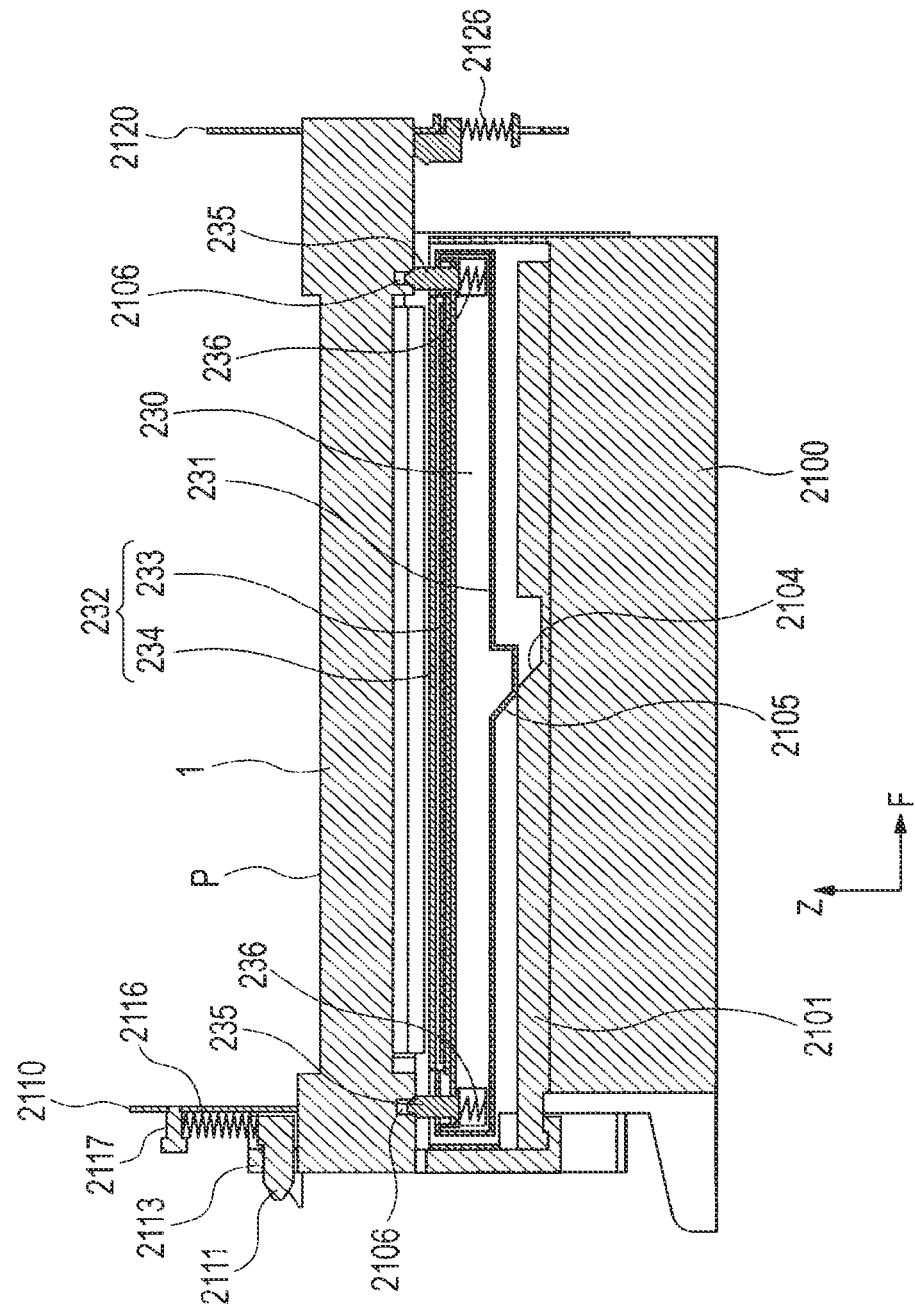
FIG. 27 is a partial sectional view of the image forming apparatus when the cartridge is mounted.

As shown in FIG. 27, the positioned portions 213a and 213b abut against the abutment portions 2112a and 2112b of the front plate 2110 and the abutment portions 2122a and 2122b of the rear plate 2120. This determines the position of the cartridge P in the vertical direction (Z direction) and the direction vertically perpendicular to the cartridge insertion direction (F direction).

At the same time, a part of the cartridge P abuts against the rear plate 2120 in the cartridge insertion direction (F direction) to determine the position in the cartridge insertion direction (F direction).

As described above, the cartridge P reaches the image forming position and is positioned. The cartridge pressing member 235 fits in the fitting hole 2106 of the cartridge P to position the LED head 232 of the LED unit 230 in the main scanning direction (F direction) and a sub scanning direction (direction perpendicular to the F and Z directions) of the cartridge P. As such, the LED head 232 reaches the exposure position and is positioned.

A resultant force of pressing forces of the pull-up member 2111, the push-up member 2121 and the cartridge pressing member 235 of the LED unit 230 causes a sufficient pressing force to position the cartridge P in the image forming position and transfer the toner image to the intermediate transfer belt 241.

In this embodiment, the cartridge P rides on the pull-up member 2111 and the push-up member 2121 to move the cartridge P upward by a predetermined amount. However, at this time, the cartridge P does not abut against the abutment portions 2112a and 2112b and the abutment portions 2122a and 2122b. This is for preventing the cartridge P from being brought into contact with and rubbing against the front plate 2110, the rear plate 2120, or the intermediate transfer unit 240 placed above the cartridge P when the cartridge P is then further inserted to move the LED unit 230 upward.

If an insertion distance of the cartridge P for moving the LED unit 230 upward is relatively short, the cartridge P may ride on the pull-up member 2111 and the push-up member 2121 so that the cartridge P abuts against the abutment portions 2112a and 2112b and the abutment portions 2122a and 2122b.

<Removal of Cartridge P from Main Body>

Next, drawing and removing the cartridge P from the main body 200 will be described. As shown in FIG. 27, with the cartridge P being completely inserted into the main body, an engaging portion 2107 of the cartridge P engages an engaging portion 2108 of the LED unit push-up cam 2101. Thus, when the cartridge P is drawn in a direction opposite to the F direction from the state shown in FIG. 27, the LED unit push-up cam 2101 is also moved in the direction opposite to the F direction. At this time, the cam surface 2105 slides on the cam surface 2104 of the LED unit push-up cam 2101 to move the LED unit 230 downward. Thus, the cartridge pressing member 235 is withdrawn from the fitting hole 2106 of the cartridge P, and the LED head 232 is moved from the exposure position to the retracted position. At the same time, the cartridge P is moved downward by a predetermined amount and retracted from the image forming position, and enters a state as shown in FIG. 25.

In this state, the engaging portion 2107 of the cartridge P is disengaged from the engaging portion 2108 of the LED unit push-up cam 2101. Thus, the cartridge P can be further drawn in the direction opposite to the F direction. When the cartridge P is further drawn in the direction opposite to the F direction, the cartridge P is withdrawn from the pull-up member 2111 and the push-up member 2121, moved downward by a predetermined amount, and can be removed from the main body.

<Operation Force in Insertion of Cartridge P into Main Body 200>

An operation force required for inserting the cartridge P into the main body 200, positioning the cartridge P in the image forming position, and positioning the LED head 232 in the exposure position will be described.

FIG. 28A is a graph illustrating an operation force required when the cartridge P presses the pull-up member 2111 and the push-up member 2121 in insertion of the cartridge P. The operation force increases between when the cartridge P presses the pull-up member 2111 and the push-up members 2121 and when the cartridge P pushes down and rides on the members. The operation force reaches a peak (maximum value) when the pull-up spring 2116 extends to the maximum and the push-up spring 2126 contracts to the minimum.

The operation force may be restated as a reaction force applied to the cartridge P when the cartridge P presses the pull-up member 2111 and the push-up member 2121 against the biasing forces of the pull-up spring 2116 and the push-up spring 2126. FIG. 28B is a graph illustrating an operation force when the cartridge P presses the LED push-up cam 2101 in insertion of the cartridge P. The operation force increases while the cam surface 2104 of the LED push-up cam 2101 pressed and moved by the cartridge P is pushing up the cam surface 2105 of the LED unit 230. The operation force reaches a peak (maximum value) when the pressing spring 236 of the LED unit 230 contracts to the minimum.

The operation force may be restated as a reaction force applied to the cartridge P when the cartridge P presses the LED unit push-up cam 2101 against the biasing force of the pressing spring 236 of the LED unit 230.

As such, in insertion of the cartridge P, the operation force reaches the peak when the pull-up member 2111 and the push-up member 2121 are pressed and when the LED push-up cam 2101 is pressed.

FIG. 28C is a graph illustrating an operation force in insertion of the cartridge P. The operation force reaches [α] while the cartridge P is pressing the pull-up member 2111 and the push-up member 2121, and reaches [β] while the cam surface 2104 of the LED push-up cam 2101 pressed and moved by the cartridge P is pushing up the cam surface 2105 of the LED unit 230. As such, in this embodiment, the timing when the cartridge P presses the pull-up member 2111 and the push-up member 2121 is different from the timing when the cartridge P presses the LED push-up cam 2101 in insertion of the cartridge P. Thus, the timings of the peak of the operation force in insertion of the cartridge are shifted (made different).

Specifically, in this embodiment, the cartridge P is moved upward by the predetermined amount, and then the LED unit 230 is moved upward, and the cartridge P is moved upward in a plurality of separate times to reach the image forming position. Thus, as compared to a configuration in which the cartridge P is moved upward once at the same timing as upward movement of the LED unit 230 and moved to the image forming position, the maximum value of the operation force required in insertion of the cartridge can be reduced to improve usability.

Embodiment 4

Next, Embodiment 4 will be described. In Embodiment 3, the cartridge P is positioned in the image forming position in conjunction with the insertion of the cartridge P, and the LED unit 230 is pushed upward. In contrast to this, in this embodiment, a cartridge P is positioned in an image forming position in conjunction with insertion of the cartridge P, an LED unit 230 is moved in conjunction with a closing operation of an openable and closable member 270 for inserting the cartridge P, and an LED head 232 is moved to an exposure position.

In the description of this embodiment, the same components as in Embodiment 3 are denoted by the same reference numerals and descriptions thereof will be omitted, and different points will be described.

<Mounting of Cartridge P to Main Body>

A mounting operation when the cartridge P is mounted to an image forming apparatus 200 in this embodiment will be described.

Figure 29:
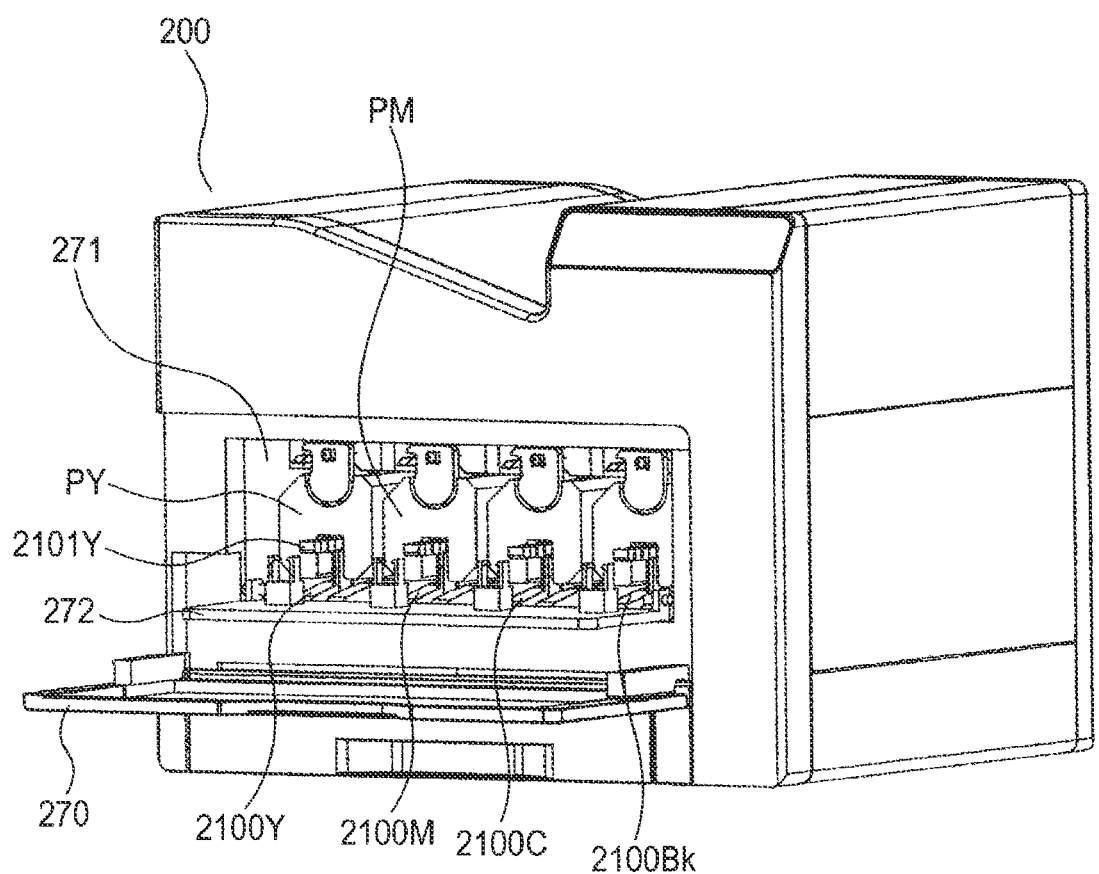
FIG. 29 is a perspective view of the image forming apparatus seen obliquely from the front.

FIG. 29 is a perspective view of the image forming apparatus 200 seen obliquely from the front. The image forming apparatus 200 includes an inner openable and closable member 272 openable and closable with respect to a main body inside an openable and closable member 270. The inner openable and closable member 272 is opened/closed in conjunction with the openable and closable member 270, and the openable and closable member 270 and the inner openable and closable member 272 are opened to open the opening portion 271. In replacement of the cartridge P, the openable and closable member 270 and the inner openable and closable member 272 are opened to open the opening portion 271. The opening portion 271 is opened to expose four cartridge guides 2100 arranged in parallel in the main body.

The cartridge P is inserted along the cartridge guides 2100 into the main body 200 in an axial direction (F direction) of a photosensitive drum 1. As in Embodiment 3, a pulled-up portion 2113 of the cartridge P abuts against a pull-up member 2111 to rotate the pull-up member 2111 downward around a shaft 2118. At the same time, a pushed-up portion 2123 of the cartridge P abuts against a push-up member 2121 to rotate the push-up member 2121 downward around a shaft 2128.

Figure 30:
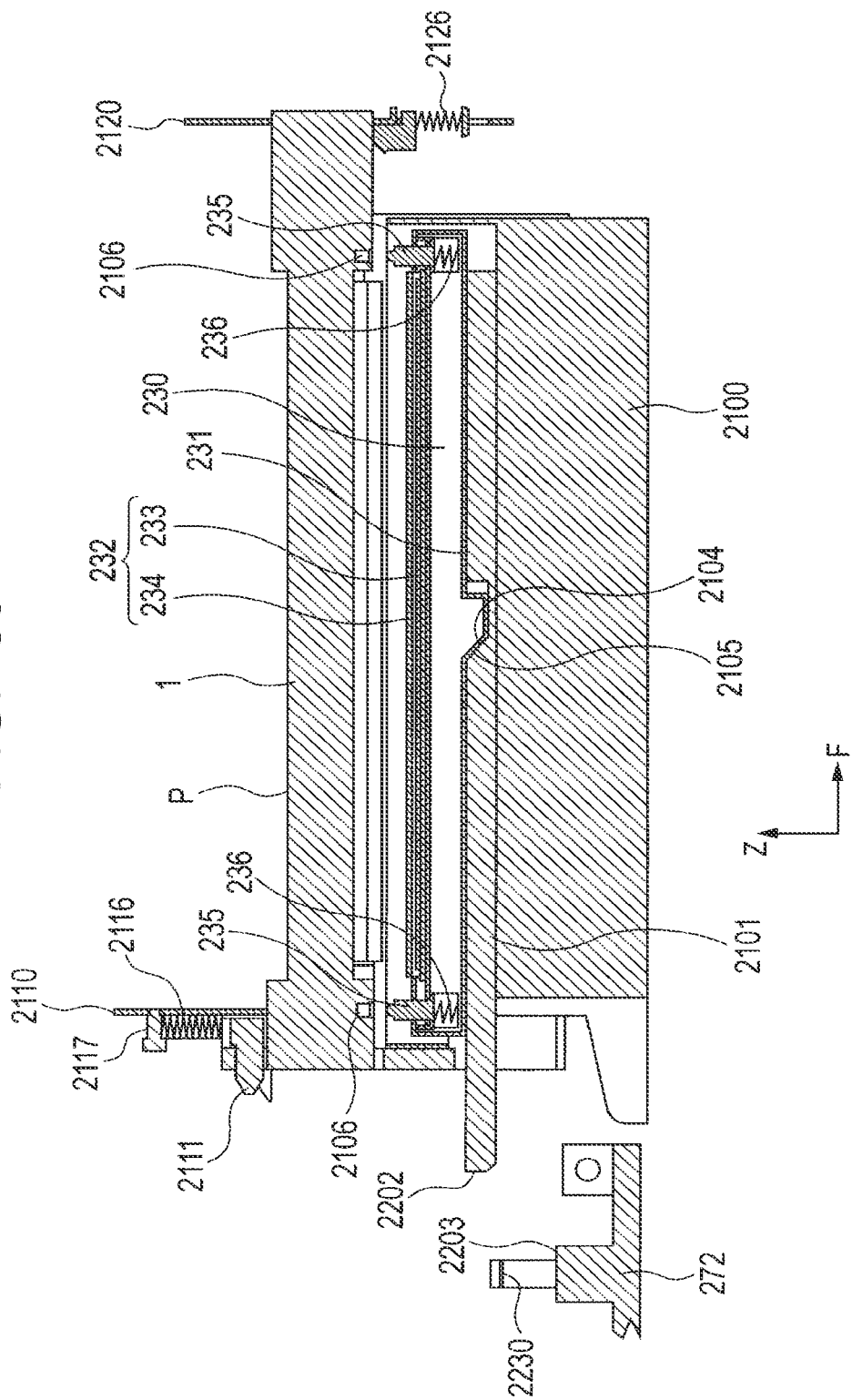
FIG. 30 is a partial sectional view of the image forming apparatus when the cartridge is mounted or removed.

When the cartridge P is further inserted in the F direction, as shown in FIG. 30, the pulled-up portion 2113 rides on the pull-up surface 2114 of the pull-up member 2111. At the same time, the pushed-up portion 2123 also rides on the push-up member 2121. As such, the cartridge P presses and rides on the pull-up member 2111 and the push-up member 2121. Thus, the cartridge P is moved upward by biasing forces of a pull-up spring 2116 of the pull-up member 2111 and a push-up spring 2126 of the push-up member 2121.

Then, as shown in FIG. 30, positioned portions 213a and 213b abut against abutment portion 2112a and 2112b of a front plate 2110 and abutment portions 2122a and 2122b of a rear plate 2120. Thus, the position of the cartridge P is determined in a vertical direction (Z direction) and a direction vertically perpendicular to a cartridge insertion direction (F direction) (see FIG. 22).

At the same time, a part of the cartridge P abuts against the rear plate 2120 in the cartridge insertion direction (F direction) to determine the position of the cartridge P in the cartridge insertion direction (F direction).

As described above, the cartridge P reaches and is positioned in the image forming position.

The inner openable and closable member 272 includes a cam pressing portion 2203 that abuts against and presses a pressed surface 2202 of an LED unit push-up cam 2101. An engaging portion 2230 is provided at a tip of the cam pressing portion 2203.

Figure 32A:
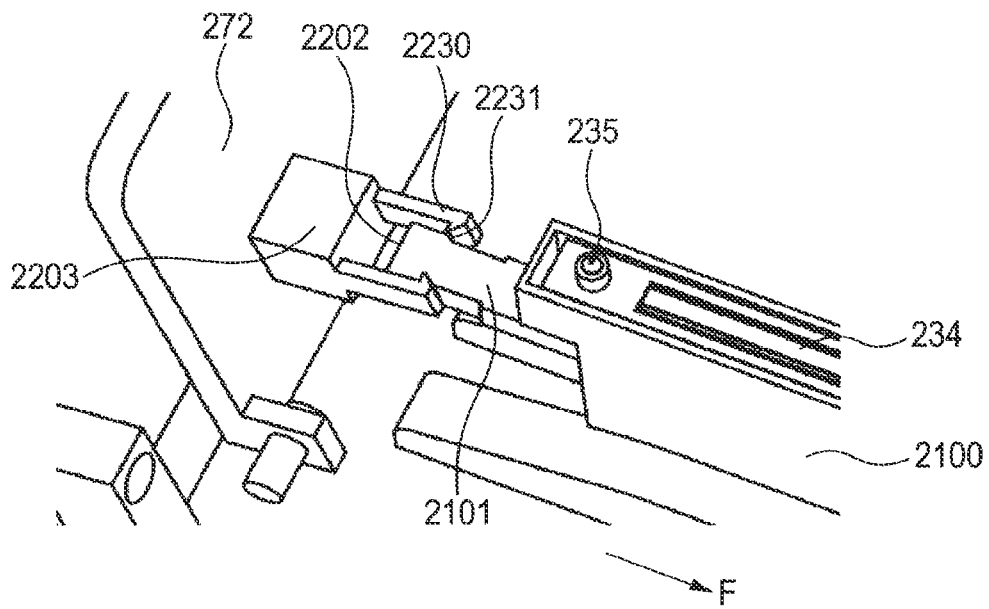
FIGS. 32A and 32B are perspective views of an inner openable and closable member and a part of the image forming apparatus around a cartridge guide, seen obliquely from above.
Figure 32B:
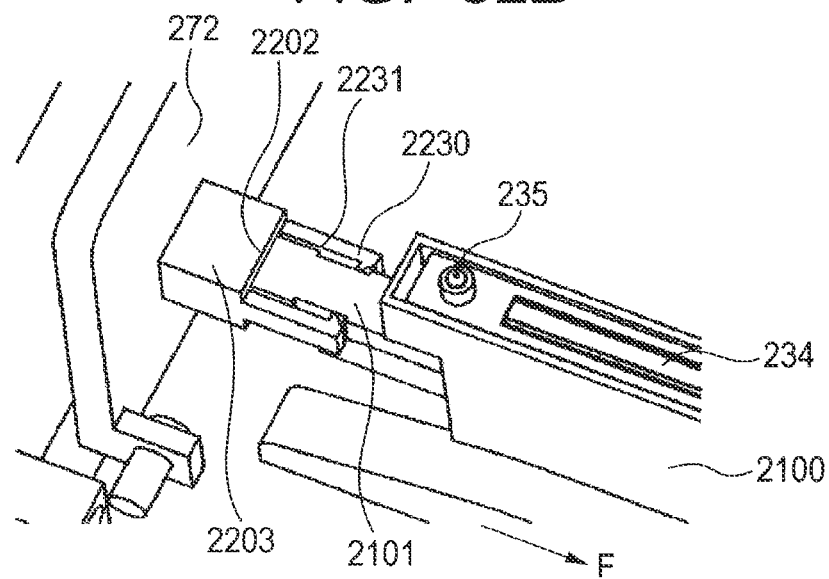

FIGS. 32A and 32B illustrate a part of the image forming apparatus 200 around the inner openable and closable member 272 and the cartridge guide 2100 seen from above. When the openable and closable member 270 is closed, as shown in FIG. 32A, an engaging portion 2230 of the cam pressing portion 2203 of the inner openable and closable member 272 engages an inner openable and closable member engaging portion 2231 of the LED unit push-up cam 2101.

When the openable and closable member 270 is further closed, as shown in FIG. 32B, the cam pressing portion 2203 abuts against the pressed surface 2202 to move the LED unit push-up cam 2101 in the F direction.

Figure 31:
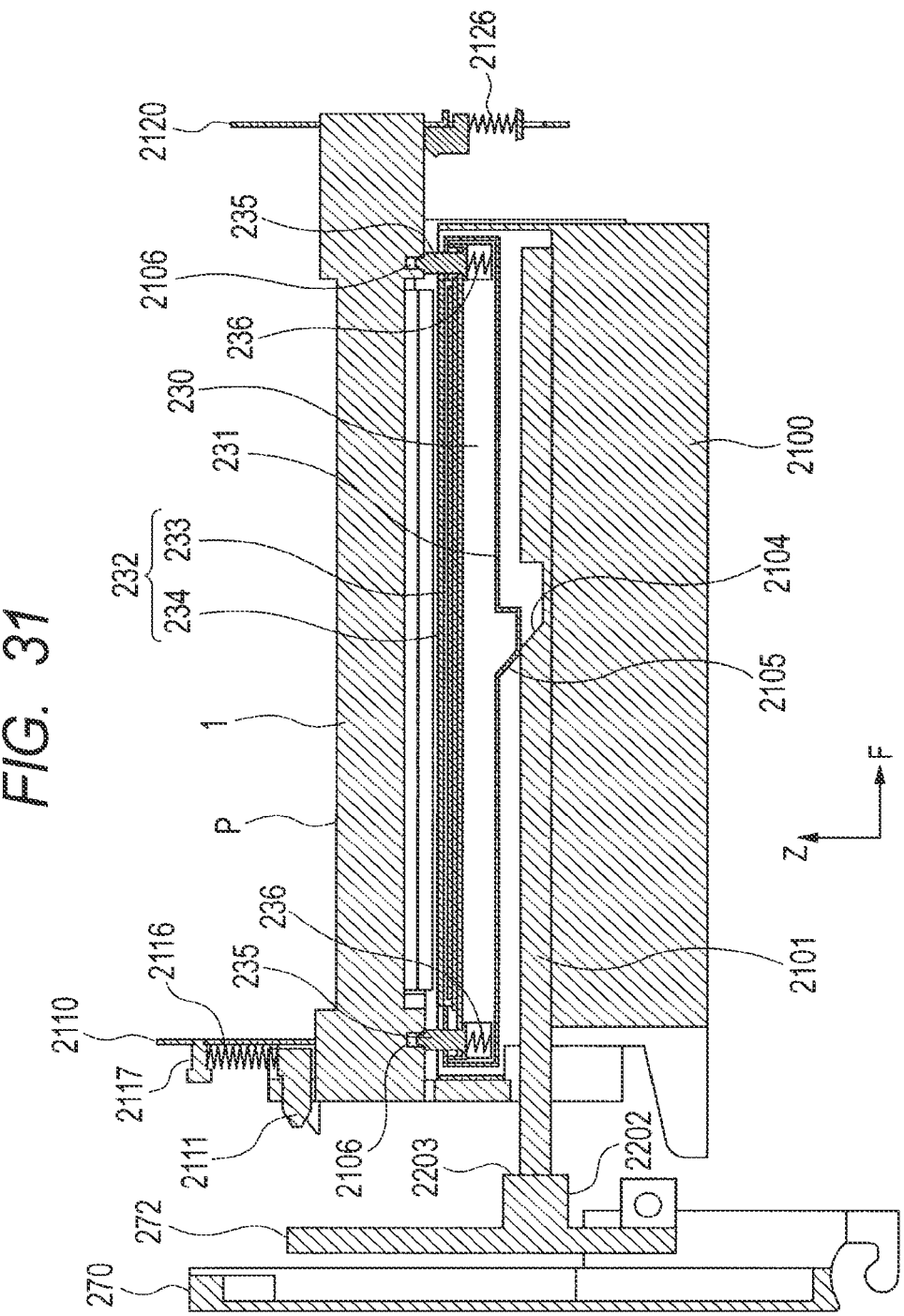
FIG. 31 is a partial sectional view of the image forming apparatus when the cartridge is mounted.

As described above, the LED unit push-up cam 2101 is moved in the F direction, and thus as in the first embodiment, the LED unit 230 is moved upward, and a cartridge push-up member 235 fits in a fitting hole 2106 in the cartridge P. Thus, as shown in FIG. 31, an LED head 232 is positioned in the exposure position.

When the cartridge P is removed from the main body 200, the openable and closable member 270 is opened to open the inner openable and closable member 272. At this time, the LED unit push-up cam 2101 including the inner openable and closable member engaging portion 2231 that engages the engaging portion 2230 of the cam pressing portion 2203 of the inner openable and closable member 272 is moved in the direction opposite to the F direction in conjunction with the operation of opening the inner openable and closable member 272. The LED unit 230 is moved downward to move the LED head 232 from the exposure position to the retracted position as in Embodiment 3. The cartridge P is drawn in the direction opposite to the F direction in this state, and thus the cartridge P can be removed from the main body 200.

<Operation Force in Mounting the Cartridge P to the Main Body 200>

Next, an operation force required for inserting the cartridge P into the main body 200 to close the openable and closable member 270, positioning the cartridge P in the image forming position, and positioning the LED head 232 in the exposure position.

The operation force required in insertion of the cartridge P reaches a peak between when the cartridge P presses the pull-up member 2111 and the push-up member 2121 and when the cartridge P pushes down and rides on the members. The operation force required for closing the openable and closable member 270 reaches a peak while the cam pressing portion 2203 is pressing the pressed surface 2202 to move the LED unit push-up cam 2101 in the F direction, and the cam surface 2104 is pushing up the cam surface 2105 of the LED unit 230.

Thus, in this embodiment, the cartridge P is moved upward to the image forming position in conjunction with insertion of the cartridge P, and then the LED unit 230 is moved upward in conjunction with closing the openable and closable member 270 to move the LED head 232 to the exposure position. Thus, as compared to a configuration in which the cartridge P is moved upward once at the same timing as upward movement of the LED unit 230 and positioned in the image forming position, the maximum value of the required operation force can be reduced. This reduces an operation force required for mounting the cartridge P to improve usability.

Embodiment 5

Next, Embodiment 5 will be described. This embodiment is different from Embodiment 3 in that a guide member 251 that guides insertion of a cartridge P can be drawn from a main body 200 according to mounting and removal of the cartridge P. In this embodiment, a case where the guide member 251 is configured to be drawable as a cartridge placement member on which the cartridge P is placed is described.

In the description of this embodiment, the same components as in Embodiment 3 are denoted by the same reference numerals and descriptions thereof will be omitted, and different points will be described.

<Drawing Configuration of Guide Member 251>

Figure 33:
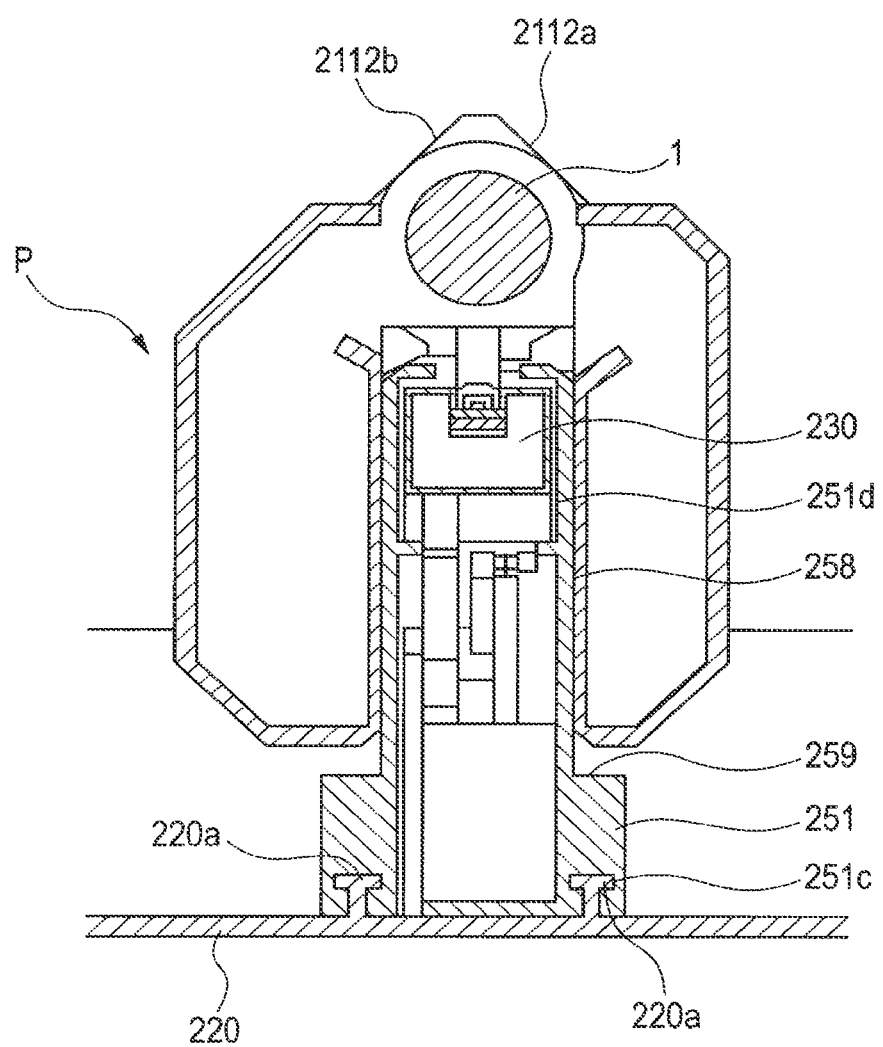
FIG. 33 is a sectional view of the cartridge and therearound in the image forming apparatus seen in an axial direction of a photosensitive drum.
Figure 34:
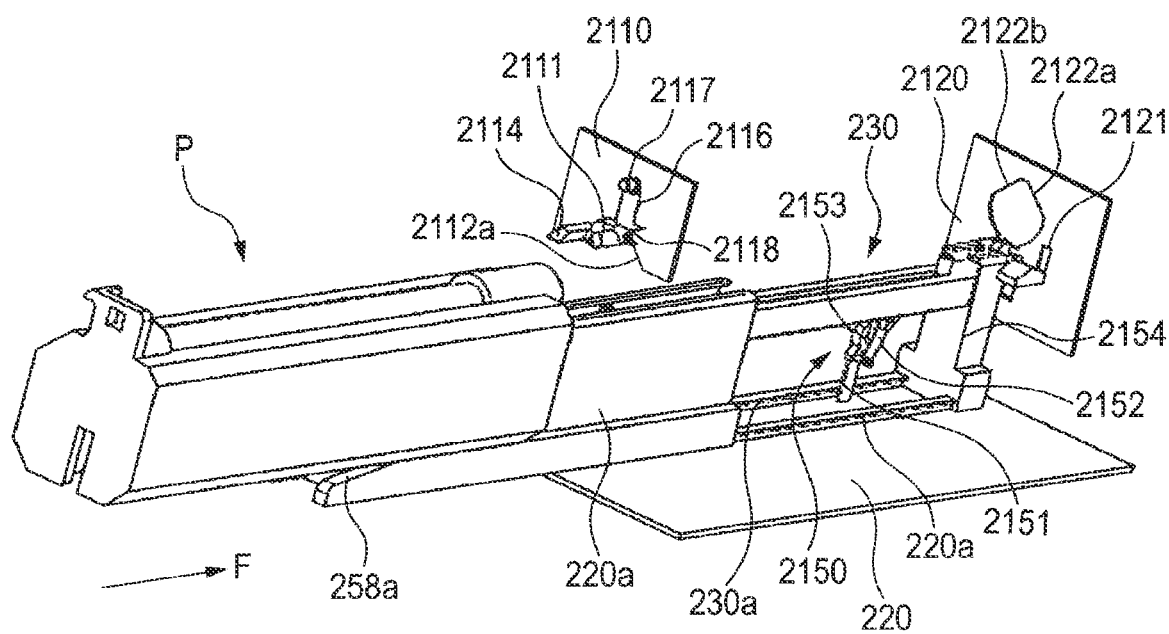
FIG. 34 is a partial perspective view of the image forming apparatus in which the cartridge is placed on a guide member drawn from a main body.

A drawing configuration of the guide member 251 will be described. FIG. 33 is a sectional view of the cartridge P and therearound in the image forming apparatus 200 of this embodiment seen in an axial direction of a photosensitive drum 1. FIG. 34 is a partial perspective view of the image forming apparatus 200 in a state where the cartridge P is placed on the guide member 251 drawn from the main body. An exterior portion of the image forming apparatus 200 is not shown.

The guide member 251 is a thin plate member that is long in a front/rear direction and protrudes upward, and is provided along a rail 220a provided on an upper surface frame 220 corresponding to a rail groove 251c so as to be movable in the axial direction of the photosensitive drum 1. The guide member 251 includes a lateral direction restriction wall (region that can abut against the cartridge P) 258 that guides the cartridge P in the left and right direction, and a vertical direction restriction wall 259 that guides the cartridge P in a vertical direction. The vertical direction restriction wall 259 is provided on both left and right sides of the guide member 251 in the axial direction (longitudinal direction of the guide member 251) of the photosensitive drum 1. On the side of an opening portion 271 (front side) of the guide member 251, a grip 264 (FIG. 35) gripped by a user for drawing the guide member 251 toward the opening portion 271 is provided.

The LED unit 230 is placed inside the guide member 251. The LED unit 230 is held by an LED holding rail 251d formed inside the guide member 251, and an LED holding casing 2154 secured to an upper surface frame 220. The LED unit 230 is not drawn but is secured and held in the main body 200 even if the guide member 251 is drawn.

Figure 35:
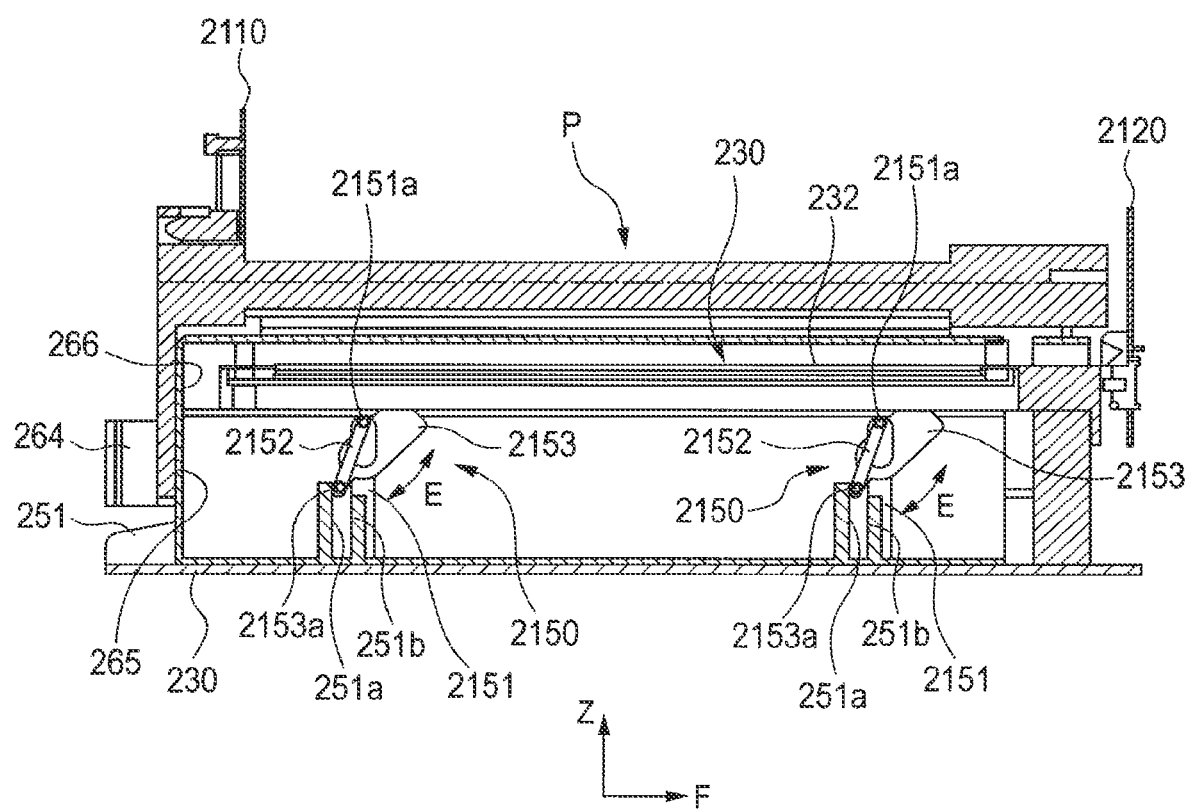
FIG. 35 is a partial sectional view of the image forming apparatus when the cartridge is mounted or removed.

FIG. 35 is a sectional view taken in the axial direction of the photosensitive drum 1. In this embodiment, an LED unit push-up mechanism 2150 including a push-up cam 2153 is provided as a mechanism for vertically moving the LED unit 230 and moving an LED head 232 between the retracted position and the exposure position. Two LED unit push-up mechanisms 2150 are provided apart from each other in the axial direction of the photosensitive drum 1.

The LED unit push-up mechanism 2150 will be described. Two push-up cams 2153 are provided in one LED unit 230, one on an upstream side and the other on a downstream side in the F direction. The push-up cam 2153 is held rotatably in the arrow E direction by a cam holding member 2151 secured to the upper surface frame 220. A toggle spring 2152 extends between the push-up cam 2153 and the cam holding member 2151. One end of the toggle spring 2152 is supported by an extending portion 2151a of the cam holding member 2151. The other end is supported by an extending portion 2153a provided below the push-up cam 2153. With such a configuration, the push-up cam 2153 serves as a toggle mechanism.

<Mounting of Cartridge P to Main Body>

Mounting of the cartridge P to the image forming apparatus 200 will be described. In mounting the cartridge, the guide member 251 corresponding to the cartridge P to be mounted is drawn toward the opening portion 271 (front side). In this state, the cartridge P is placed on the guide member 251 so that the guide member 251 enters a space between a cleaner unit 217 and a developing unit 214 of the cartridge P. In this state, the vertical direction restriction wall 259 is brought into contact with a bottom surface of the cartridge P.

With the guide member 251 being drawn toward the opening portion 271, the guide member 251 is secured in a state of being urged in a drawing direction from the main body 200 by a toggle mechanism (not shown). Thus, even if the cartridge is inserted in the F direction, the guide member 251 is held in a state of being drawn toward the opening portion 271 against a friction force between the cartridge P and the guide member 251, and only the cartridge P slides on the guide member 251 and is moved in the F direction. At this time, a slope portion 258a (FIG. 34) is longitudinally formed on left and right sides of an upper portion of the guide member 251 so as to facilitate insertion of the cartridge P.

When the cartridge P is inserted so that an abutment surface 266 of the cartridge P abuts against an abutment surface 265 of the guide member 251, the abutment surface 266 of the cartridge P presses the abutment surface 265 of the guide member 251. This releases urging of the guide member 251 of the toggle mechanism in a drawing direction from the main body 200. Thus, the cartridge P and the guide member 251 are then integrally inserted into the main body in the F direction.

Figure 36A:
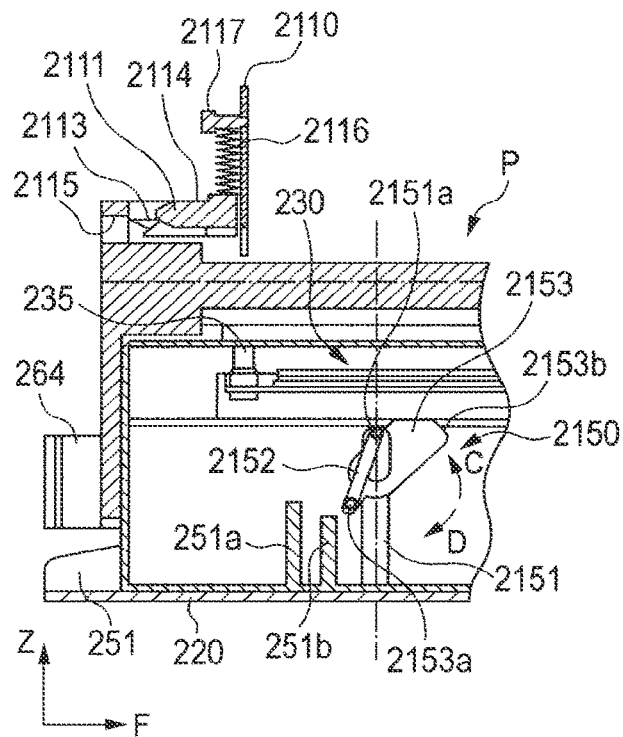
FIGS. 36A, 36B, 36C and 36D are partial sectional views of the image forming apparatus when the cartridge is mounted or removed.
Figure 36B:
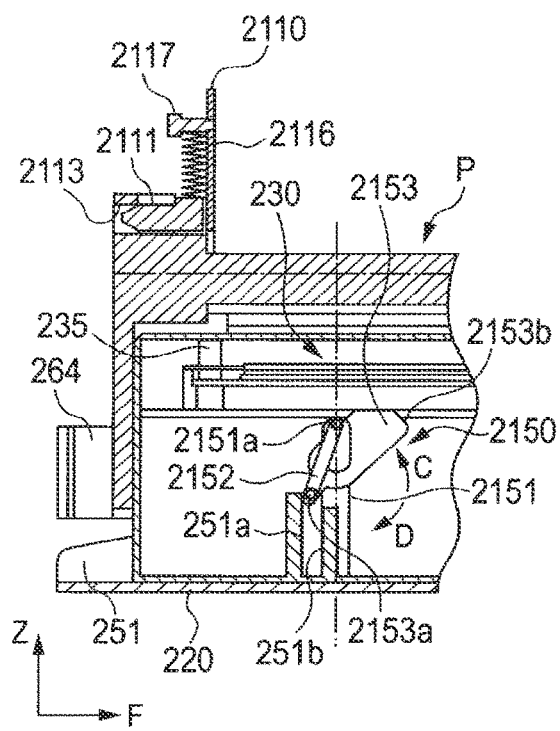

As shown in FIG. 36A, the pulled-up portion 2113 provided in the cartridge P abuts against the pull-up member 2111. At the same time, the pushed-up portion 2123 of the cartridge P abuts against the push-up member 2121. As shown in FIG. 36B, when the cartridge P is pressed in the F direction as in Embodiment 3, the cartridge P rides on the pull-up member 2111 and the push-up member 2121 and is moved in the Z direction by a predetermined amount. At this time, as in Embodiment 3, the cartridge P has not abut against the abutment portions 2112a and 2112b and the abutment portions 2122a and 2122b. In this state, the cam 2153 is urged by the toggle spring 2152 so as to be rotated in an arrow D direction.

In FIGS. 36A to 36D, the push-up member 2121 of the rear plate 2120 is not shown. The push-up cam 2153 on the downstream side in the F direction operates in the same manner as that on the upstream side in the F direction, and thus illustration and descriptions thereof will be omitted.

Further, when the cartridge P is inserted in the F direction, as shown in FIG. 36B, the cam abutment surface 251a provided on the guide member 251 abuts against the push-up cam 2153. The abutment surface 251a is moved with the movement of the guide 251 in the F direction, the push-up cam 2153 is pressed, and the push-up cam 2153 is rotated in the arrow C direction against the biasing force of the toggle spring 2152. At this time, the cam surface 2153b provided on the push-up cam 2153 presses a bottom surface of the LED unit 230, and moves the LED unit 230 upward.

Figure 36C:
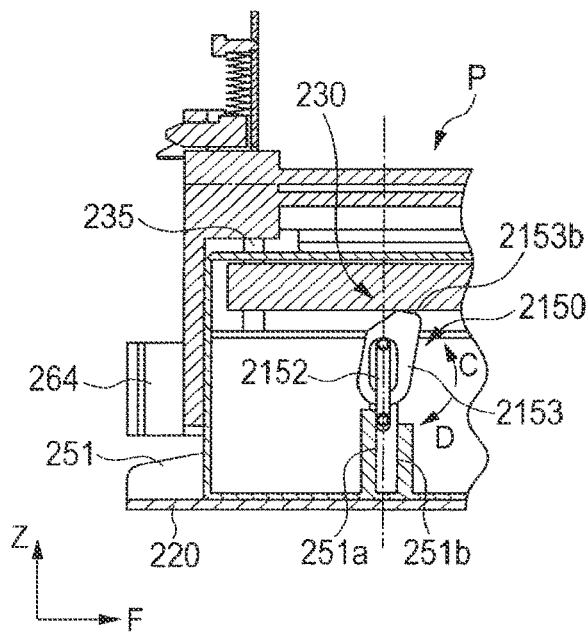
Figure 36D:
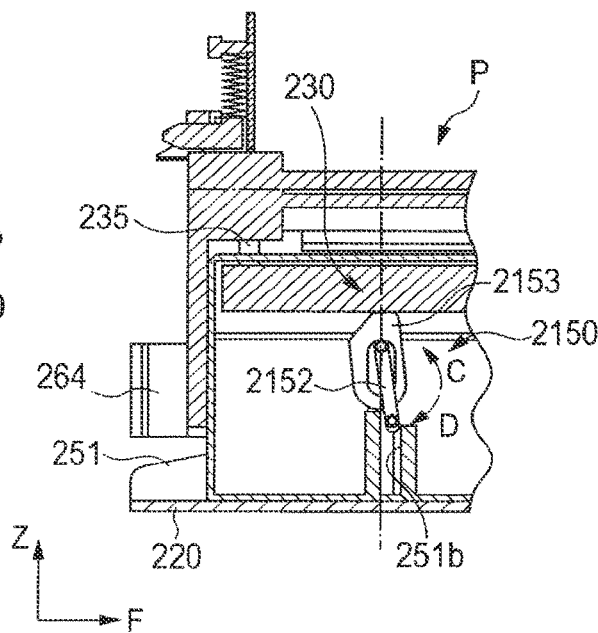

When the cartridge P is further inserted, as shown in FIG. 36C, the extending portion 2153a of the toggle spring 2152 reaches a neutral position shown by the dash-single-dot line. When the extending portion 2153a goes beyond the neutral position, the toggle spring 2152 urges the push-up cam 2153 in the arrow C direction, the push-up cam 2153 is further rotated in the arrow C direction, and the LED unit 230 is further moved upward. As shown in FIG. 36D, the cartridge P is pressed by the cartridge push-up member 235 provided on the LED unit 230 and moved upward, and the positioned portions 213a and 213b abut against the abutment portions 2112a and 2112b of the front plate 2110, and the abutment portions 2122a and 2122b of the rear plate 2120. Thus, the cartridge P is positioned in the vertical direction (Z direction) and the direction vertically perpendicular to the cartridge insertion direction (F direction).

The guide member 251 pressed by the cartridge P abuts against a stopper portion (not shown) provided on a side plate 2120 in the F direction to prevent the cartridge P and the guide member 251 from being further inserted and moved. At this time, the push-up cam 2153 abuts against the LED unit 230 at a portion vertically upward of a rotation center of the push-up cam 2153, and is arranged in the vertical direction. Thus, the reaction force to rotate the push-up cam 2153 is directed to the rotation center of the push-up cam 2153 by self-weight or the like of the LED unit 230, and thus the push-up cam 2153 is not rotated and held in this state.

At the same time, the cartridge pressing member 235 fits in the fitting hole (not shown) in the cartridge P to position the LED head 232 in the main scanning direction (F direction) and the sub scan direction (direction perpendicular to the F and Z directions) of the cartridge P. As such, the LED head 232 reaches the exposure position and is positioned. The LED head 232 is positioned in the exposure position, and thus the cartridge P reaches the image forming position and is positioned.

A resultant force of pressing forces of the pull-up member 2111, the push-up member 2121 and the cartridge pressing member 235 of the LED unit 230 causes a sufficient pressing force to position the cartridge P in the image forming position and transfer the toner image to the intermediate transfer belt 241.

<Removal of Cartridge P from Main Body>

Drawing and removing the cartridge P from the main body 200 will be described. As shown in FIG. 36D, with the cartridge P being mounted to the main body 200 and being in the image forming position, the grip 264 is held to draw the guide member 251 in the direction opposite to the F direction. Then, the cam abutment surface 251b provided on the guide member 251 abuts against the push-up cam 2153 to rotate the push-up cam 2153 in the arrow D direction. At this time, the LED unit 230 is moved down along the cam surface 2153b. Thus, the cartridge pressing member 235 is withdrawn from the fitting hole in the cartridge P, and the LED head 232 is moved from the exposure position to the retracted position. At the same time, the cartridge P is also moved downward by a predetermined amount and retracted from the image forming position.

When the guide member 251 is further drawn, as shown in FIG. 36C, the extending portion 2153a of the toggle spring 2152 goes beyond a neutral position of the toggle mechanism, and the push-up cam 2153 is urged in the arrow D direction by the toggle spring 2152. Then, when the guide member 251 is drawn to the position shown in FIG. 36B, rotation of the push-up cam 2153 is restricted by a detent (not shown).

When the guide member 251 is further drawn, the abutment surface 266 is pressed against the abutment surface 265 of the guide member 251, the cartridge P drawn integrally with the guide member 251 is disengaged from the pull-up member 2111 and the push-up member 2121, and moved downward by a predetermined amount. As such, the guide member 251 is drawn toward the opening portion 271 to draw the cartridge P, and thus the cartridge P can be removed from the main body 200.

As such, in this embodiment, as in Embodiment 3, the timing when the cartridge P presses the pull-up member 2111 and the push-up member 2121 is different from the timing when the cartridge P presses the push-up cam 2153 in insertion of the cartridge P. Thus, the timings of the peak of the operation forces in insertion of the cartridge are shifted.

Specifically, in this embodiment, the cartridge P is moved upward by a predetermined amount, and then the LED unit 230 is moved upward, and the cartridge P is moved upward in a plurality of separate times to reach the image forming position. Thus, as compared to a configuration in which the cartridge P is moved upward once at the same timing as upward movement of the LED unit 230 and moved to the image forming position, the maximum value of the operation force required in insertion of the cartridge can be reduced to improve usability.

In this embodiment, with the guide member 251 being drawn from the main body 200 toward the opening 271, the center of gravity of the cartridge P is placed outside of the main body 200 in the longitudinal direction (axial direction of the photosensitive drum 1) of the cartridge P.

Thus, the user can grip a portion corresponding to the center of gravity of the cartridge P in the longitudinal direction of the cartridge P. Thus, as compared to a case where the user grips an end of the cartridge P in the longitudinal direction to insert or remove the cartridge P into or from the main body 200, the cartridge can be held and operated without application of the moment of the center of gravity of the cartridge P for good usability.

Other Embodiments

In Embodiments 4 and 5, the replacement of cartridge P having a side-oriented configuration in which the cartridge P is inserted into the axial direction of the photosensitive drum 1 and thus mounted to or removed from the main body 200 has been described. However, the cartridge P may be applied to a configuration in which the cartridge P is drawn in a direction different from an arrangement direction of the cartridge P and the LED unit 230 and a direction perpendicular to the axial direction of the photosensitive drum 1 (for example, Japanese Patent Application Laid-Open No. 2009-128506).

Also in such a configuration, in mounting and removal of the cartridge P, the cartridge P and the LED unit 230 are moved in the arrangement direction of the cartridge P and the LED unit 230. Thus, in this configuration, timing when the cartridge P is moved in the arrangement direction of the cartridge P and the LED unit 230 is different from timing when the LED unit 230 is moved in the arrangement direction of the cartridge P and the LED unit 230. Such a configuration can reduce a maximum value of a required operation force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-126812, filed Jun. 2, 2010, Japanese Patent Application No. 2011-114806, filed May 23, 2011 and Japanese Patent Application No. 2011-091240, filed Apr. 15, 2011, which are hereby incorporated by reference herein in their entirety.

What is claimed is:

1. An image forming apparatus on which a plurality of cartridges, each of which includes a photosensitive drum to be driven to rotate, are mountable, the image forming apparatus comprising:

a plurality of mounting portions, each of the plurality of mounting portions being configured such that a cartridge of the plurality of cartridges is mountable on a corresponding mounting portion of the mounting portions by inserting the cartridge of the plurality of cartridges to the corresponding mounting portion of the mounting portions in a direction of a rotational axis of the photosensitive drum included in the cartridge;

a plurality of LED units, each of the LED units corresponding to one of the plurality of mounting portions, each of the LED units including an LED array configured to expose the photosensitive drum included in the cartridge, which has been mounted on the corresponding mounting portion, of the plurality of cartridges; and a plurality of positioning mechanisms, each of the positioning mechanisms corresponding to one of the plurality of the LED units and each of positioning mechanisms including:

a spring configured to act on the corresponding LED unit so as to position the LED unit with respect to the cartridge on the corresponding mounting portion by contraction of the spring; and a cam mechanism configured to move the corresponding LED unit toward the photosensitive drum and press the spring so as to contract the spring in association with a movement of the cartridge in a mounting operation of the cartridge to the corresponding mounting portion.

2. The image forming apparatus according to claim 1, further comprising a plurality of guide portions, each of which is configured to guide a cartridge of the plurality of cartridges so that the cartridge is moved in a direction of a rotational axis of the photosensitive drum of the cartridge such that the cartridge is mounted on a mounting portion of the plurality of mounting portions.

3. The image forming apparatus according to claim 1, further comprising:

a main body in which the plurality of mounting portions are provided, the main body including an opening portion through which the plurality of cartridges pass when mounting the plurality of cartridges, the opening portion being formed in a side surface of the main body; and an openable and closable member pivotably provided on the main body to open and close the opening portion.

4. An image forming apparatus on which a plurality of cartridges, each of which includes a photosensitive drum to be driven to rotate, are mountable, the image forming apparatus comprising:

a plurality of mounting portions, each of the plurality of mounting portions being configured such that a cartridge of the plurality of cartridges is mountable on a corresponding mounting portion of the mounting portions by inserting the cartridge of the plurality of cartridges to the corresponding mounting portion of the mounting portions in a direction of a rotational axis of the photosensitive drum included in the cartridge;

a plurality of LED units, each of the LED units corresponding to one of the plurality of mounting portions, each of the LED units including an LED array configured to expose the photosensitive drum included in the cartridge, which has been mounted on the corresponding mounting portion, of the plurality of cartridges; and a plurality of positioning mechanisms, each of the positioning mechanisms corresponding to one of the plurality of the LED units and each of positioning mechanisms including:

a pair of springs configured to act on the corresponding LED unit so as to position the LED unit with respect to the cartridge on the corresponding mounting portion by contraction of the pair of springs; and a cam mechanism configured to move the corresponding LED unit toward the photosensitive drum and press the pair of springs so as to contract the pair of springs in association with a movement of the cartridge in a mounting operation of the cartridge to the corresponding mounting portion.

5. The image forming apparatus according to claim 4, wherein the LED array is disposed between one spring of the pair of springs disposed at one end of the corresponding LED unit in a longitudinal direction of the corresponding LED unit and another spring of the pair of springs disposed at the other end of the corresponding LED unit in a longitudinal direction of the corresponding LED unit.

6. The image forming apparatus according to claim 4, further comprising a plurality of guide portions, each of which is configured to guide a cartridge of the plurality of cartridges so that the cartridge is moved in a direction of a rotational axis of the photosensitive drum of the cartridge such that the cartridge is mounted on a mounting portion of the plurality of mounting portions.

7. The image forming apparatus according to claim 4, further comprising:

a main body in which the plurality of mounting portions are provided, the main body including an opening portion through which the plurality of cartridges pass when mounting the plurality of cartridges, the opening portion being formed in a side surface of the main body; and an openable and closable member pivotably provided on the main body to open and close the opening portion.

\* \* \* \* \*